(12) United States Patent
Sato

(10) Patent No.: US 9,838,716 B2
(45) Date of Patent: Dec. 5, 2017

(54) IMAGE PROCESSING APPARATUS AND IMAGE PROCESSING METHOD

(71) Applicant: Saturn Licensing LLC, New York, NY (US)

(72) Inventor: Kazushi Sato, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 84 days.

(21) Appl. No.: 14/397,565

(22) PCT Filed: Mar. 14, 2014

(86) PCT No.: PCT/JP2014/056935
§ 371 (c)(1),
(2) Date: Oct. 28, 2014

(87) PCT Pub. No.: WO2014/162849
PCT Pub. Date: Oct. 9, 2014

(65) Prior Publication Data
US 2015/0103901 A1    Apr. 16, 2015

(30) Foreign Application Priority Data

Apr. 5, 2013 (JP) .................. 2013-079140
Dec. 27, 2013 (JP) .................. 2013-273228

(51) Int. Cl.
*H04N 19/50* (2014.01)
*H04N 19/70* (2014.01)
(Continued)

(52) U.S. Cl.
CPC ........... *H04N 19/70* (2014.11); *H04N 19/117* (2014.11); *H04N 19/186* (2014.11); *H04N 19/33* (2014.11);
(Continued)

(58) Field of Classification Search
CPC ........ H04N 19/70; H04N 19/44; H04N 19/61; H04N 19/33; H04N 19/463; H04N 19/186; H04N 19/117
(Continued)

(56) References Cited

U.S. PATENT DOCUMENTS

2009/0175338 A1\* 7/2009 Segall .................. G06T 7/2013
375/240.14
2014/0198846 A1\* 7/2014 Guo ...................... H04N 19/30
375/240.12

FOREIGN PATENT DOCUMENTS

JP    2011-509536    3/2011
WO   WO2012/036467   3/2012

OTHER PUBLICATIONS

Kerofsky et al. "Color Gamut Scalable Video Coding: New Results". JCTVC-L0334. Jan. 2013.\*
(Continued)

*Primary Examiner* — Zhihan Zhou
(74) *Attorney, Agent, or Firm* — Paratus Law Group, PLLC

(57) ABSTRACT

Provided is an image processing apparatus including a decoding section configured to decode a difference from a previous value of a prediction parameter used when an image of a second layer having a different color gamut from a first layer is predicted from an image of the first layer, and a prediction section configured to predict the image of the second layer from the image of the first layer using the prediction parameter calculated using the difference decoded by the decoding section.

21 Claims, 41 Drawing Sheets

(51) Int. Cl.
   *H04N 19/61* (2014.01)
   *H04N 19/117* (2014.01)
   *H04N 19/463* (2014.01)
   *H04N 19/186* (2014.01)
   *H04N 19/33* (2014.01)
   *H04N 19/44* (2014.01)

(52) U.S. Cl.
   CPC .......... *H04N 19/463* (2014.11); *H04N 19/61* (2014.11); *H04N 19/44* (2014.11)

(58) Field of Classification Search
   USPC .................................................. 375/240.12
   See application file for complete search history.

(56) References Cited

OTHER PUBLICATIONS

Kerofsky et al. "Color Gamut Scalable Video Coding: New Results". JCTVC-K0241. Oct. 2012.*

Kerofsky, et al., Color Gamut Scalable Video Coding: New Results, Joint Collaborative Team on Video Coding (JCT-VC) of ITU-T SG 16 WP2 and ISO/IEC JTC 1/SC 29/WG 11, Jan. 14-23, 2013, p. 1-18, 12$^{th}$ Meeting, Geneva, Switzerland.

Li, et al., Non-SCE4: Weighted Prediction Based Color Gamut Scalability, Joint Collaborative Team on Video Coding (JCT-VC) of ITU-T SG 16 WP2 and ISO/IEC JTC 1/SC 29/WG 11, Oct. 23-Nov. 1, 2013, p. 1-5, 15$^{th}$ Meeting, Geneva, Switzerland.

He, et al., Non-SCE4/AHG14: Combined bit-depth and color gamut conversion with 3D LUT for SHVC color gamut scalability, Joint Collaborative Team on Video Coding (JCT-VC) of ITU-T SG 16 WP2 and ISO/IEC JTC 1/SC 29/WG 11, Oct. 23-Nov. 1, 2013, p. 1-7, 15$^{th}$ Meeting, Geneva, Switzerland.

Chen, et al., Description of scalable video coding technology proposal by Qualcomm (configuration 2), Joint Collaborative Team on Video Coding (JCT-VC) of ITU-T SG 16 WP2 and ISO/IEC JTC1/SC29/WG11, Oct. 10-19, 2012, p. 1-21, 11$^{th}$ Meeting, Shanghai, China.

Bross, et al., High Efficiency Video Coding (HEVC) text specification draft 10 (for FDIS & Consent), Joint Collaborative Team on Video Coding (JCT-VC) of ITU-T SG 16 WP2 and ISO/IEC JTC 1/SC 29/WG 11, Jan. 14-23, 2013, p. i-300, 12$^{th}$ Meeting, Geneva, Switzerland.

Dec. 18, 2015, European Search Report for related EP Application No. 14778912.7-1908.

Kerofsky, et al., Color Gamut Scalable Video Coding, Joint Collaborative Team on Video Coding (JCT-VC) of ITU-T SG16 WP3 and ISO/IEC JTC1/SC29/WG11, Oct. 10-19, 2012, pp. 1-11, 11$^{th}$ Meeting, Shanghai, China.

Kerofsky, et al., Color Gamut Scalable Video Coding, 2013 Data Compression Conference, Mar. 22, 2013, pp. 211-220, IEEE Computer Society.

Auyeung, Non-SCE4: Picture and region adaptive gain-offset prediction for color space scalability, Joint Collaborative Team on Video Coding (JCT-VC) of ITU-T SG 16 WP 3 and ISO/IEC JTC 1/SC 29/WG 11, Oct. 23-Nov. 1, 2013, pp. 1-7, 15$^{th}$ Meeting, Geneva, Switzerland.

Leonardo Chiariglione, Report of 103$^{nd}$ meeting, International Organisation for Standardisation ISO/IEC JTC 1/SC 29/WG 11 Coding of Moving Pictures and Audio, ISO/IEC JTC 1/SC 29/WG 11 N13252, Jan. 2013, pp. 1-512, Geneva, CH.

* cited by examiner

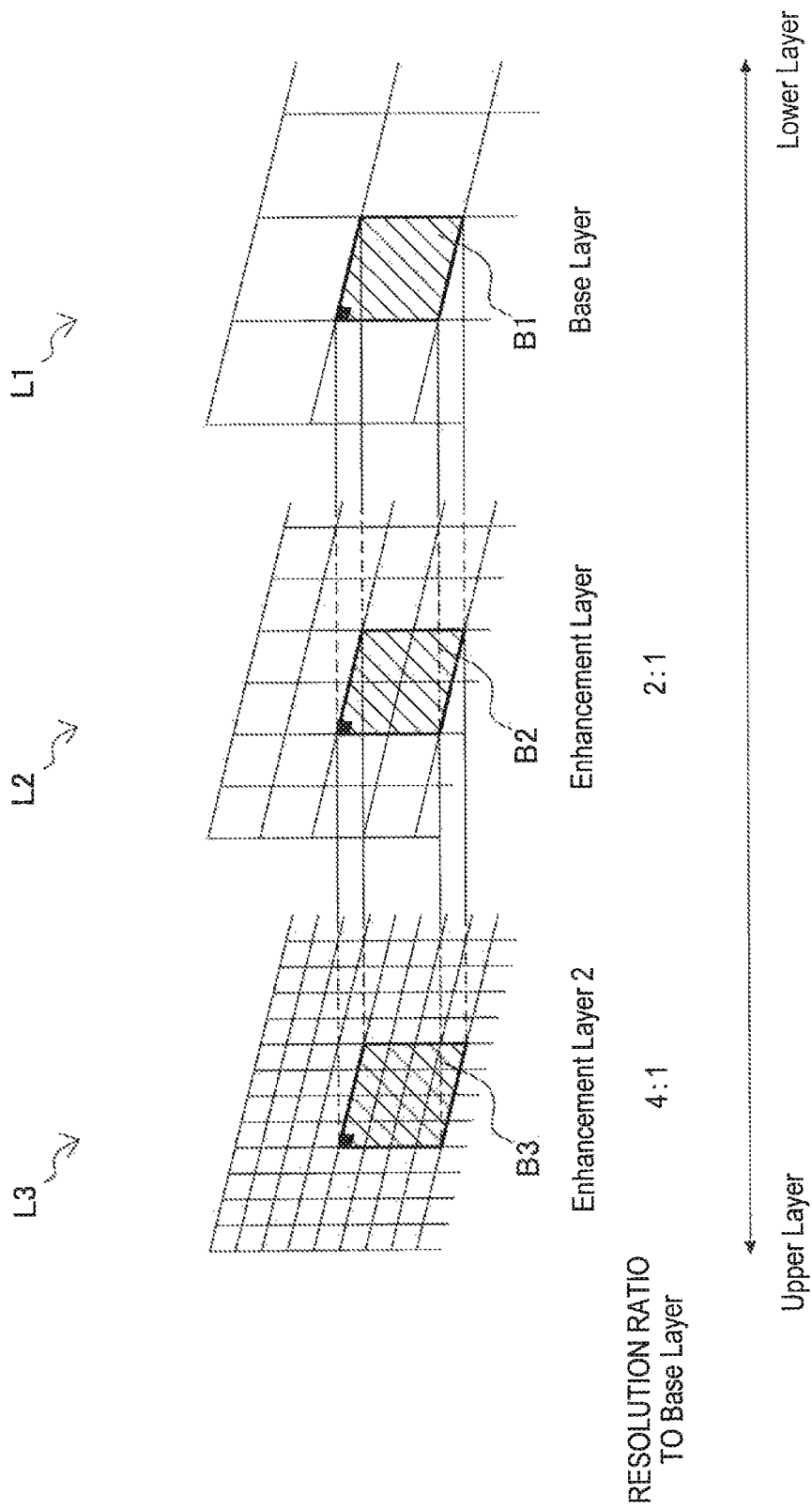

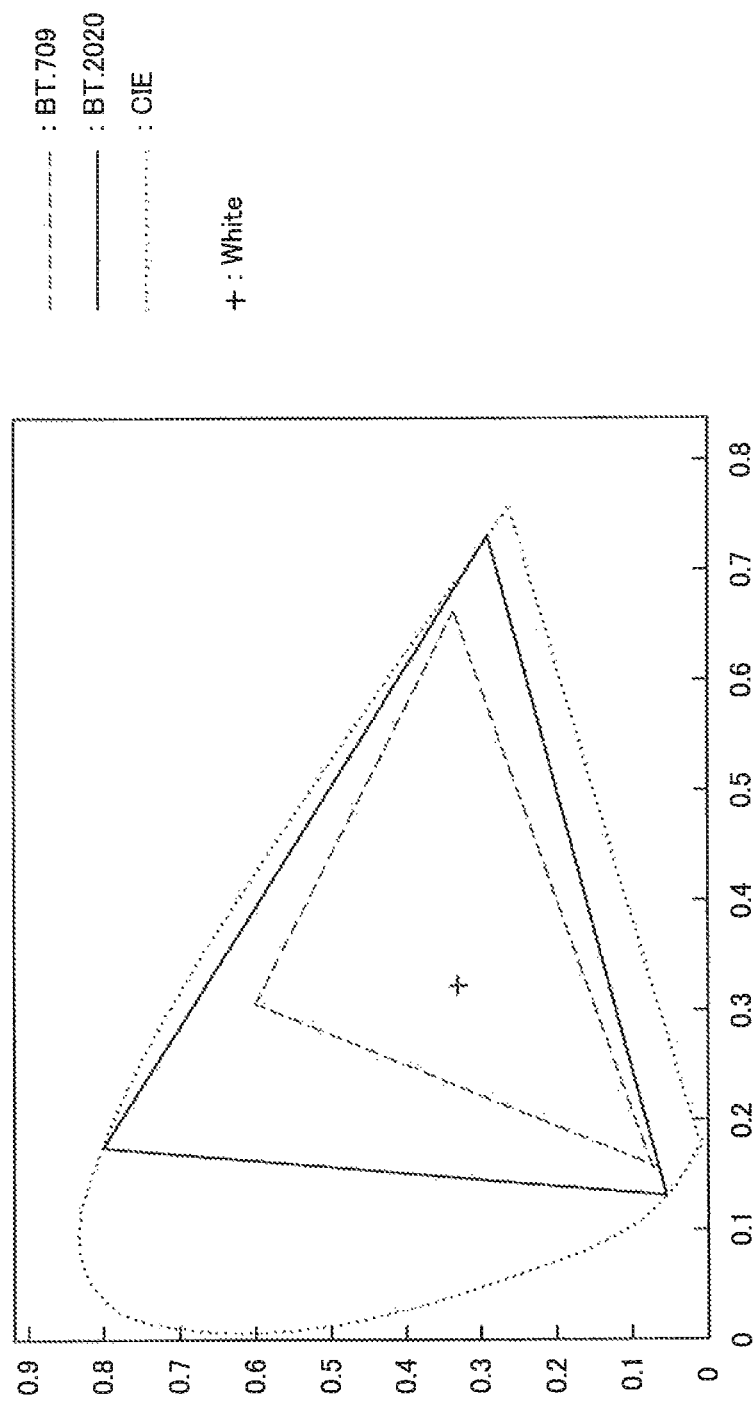

FIG.3A
| PREDICTION MODE (color_prediction_model) | REMARK |
|---|---|
| 0 | BIT SHIFT |
| 1 | FIXED GAIN AND OFFSET |
| 2 | ADAPTIVE GAIN AND OFFSET |
FIG.3B
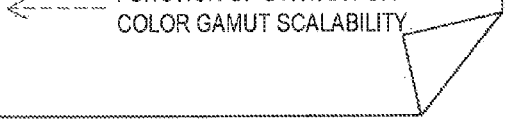
FIG.3C
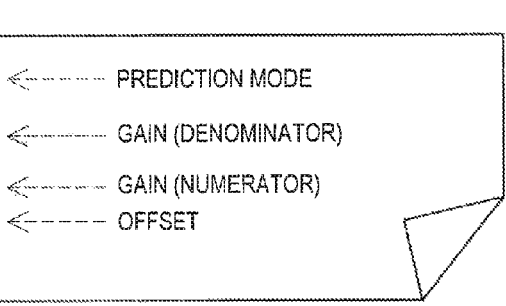

FIG.8

```
01 |  color_gamut_prediction_flag              <---- EXTENDED FLAG
02 |  if( color_gamut_prediction_flag ) {
03 |      color_prediction_model                <---- PREDICTION MODE
04 |      if( color_prediction_model == 2 ) {
05 |          luma_gain_color_gamut_flag
06 |          if( chroma_format_idc != 0 ) {
07 |              chroma_gain_color_gamut_flag
08 |          }
09 |          if( luma_gain_color_gamut_flag) {     GAIN DENOMINATOR DIFFERENCE
10 |              delta_luma_log2_gain_denom    <---- (Luma)
11 |              delta_luma_gain_color_gamut   <---- GAIN NUMERATOR DIFFERENCE (Luma)
12 |              delta_luma_offset_color_gamut <---- OFFSET DIFFERENCE (Luma)
13 |          }
14 |          if( chroma_gain_color_gamut_flag) {
15 |              delta_chroma_log2_gain_denom  <---- GAIN DENOMINATOR DIFFERENCE (Chroma)
16 |              for( j = 0; j < 2; j++ ) {
17 |                  delta_chroma_gain_color_gamut[j]   <---- GAIN NUMERATOR DIFFERENCE (Chroma)
18 |                  delta_chroma_offset_color_gamut[j] <---- OFFSET DIFFERENCE (Chroma)
19 |              }
20 |          }
21 |      }
22 |  }
```

PPS or Slice Header

FIG.9

| PREVIOUS PREDICTION MODE | BASES OF DIFFERENCES | | |
|---|---|---|---|
| | BIT SHIFT | FIXED PARAMETER | ADAPTIVE PARAMETER |
| GAIN | $2^{n_{shift}}$ | $g_{i\_fixed}$ | $g_{i\_prev}$ |
| OFFSET | ZERO | $o_{i\_fixed}$ | $o_{i\_prev}$ |

Slice Header

FIG.14

```
01 |    pred_weight_table( ) {
02 |        luma_log2_weight_denom
-- |        inter_layer_pred_flag                          <- - - - - ADDITIONAL FLAG
03 |        if( chroma_format_idc != 0 )
04 |            delta_chroma_log2_weight_denom
05 |        for( i = 0; i <= num_ref_idx_l0_active_minus1; i++ )
06 |            luma_weight_l0_flag[ i ]
07 |        if( chroma_format_idc != 0 )
08 |            for( i = 0; i <= num_ref_idx_l0_active_minus1; i++ )
09 |                chroma_weight_l0_flag[ i ]
10 |        for( i = 0; i <= num_ref_idx_l0_active_minus1; i++ ) {
11 |            if( luma_weight_l0_flag[ i ] ) {
12 |                delta_luma_weight_l0[ i ]
13 |                luma_offset_l0[ i ]
-- |                if(inter_layer_pred_flag)                       BOUNDARY INFORMATION FOR
-- |                    delta_pix_value_luma[ i ]         <- - - - - LUMINANCE
14 |            }                                                   (ADJUSTMENT VALUE)
15 |            if( chroma_weight_l0_flag[ i ] )
16 |                for( j = 0; j < 2; j++ ) {
17 |                    delta_chroma_weight_l0[ i ][ j ]
18 |                    delta_chroma_offset_l0[ i ][ j ]
-- |                    if(inter_layer_pred_flag)                   BOUNDARY INFORMATION FOR
-- |                        delta_pix_value_chroma[ i ][ j ] <- - - - COLOR DIFFERENCE
19 |                }                                               (ADJUSTMENT VALUE)
20 |        }

38 |    }
39 |  }
```

Slice Header

Slice Header

- Image Size: Different
- Color Gamut: Different
- Bit Depth: Different

- Image Size: Same
- Color Gamut: Different
- Bit Depth: Different

- Image Size: Different
- Color Gamut: Same
- Bit Depth: Different

- Image Size: Different
- Color Gamut: Different
- Bit Depth: Different

BIT SHIFT CONTROL FLAG="1": SIMULTANEOUSLY WITH WEIGHTED PREDICTION

FIG.19

```
01 |   pred_weight_table( ) {
-- |      if( nuh_layer_id != 0 ) {
-- |         weighted_prediction_and_bit_shift_luma_flag      <- - - - CONTROL FLAG (Luma)
-- |         weighted_prediction_and_bit_shift_chroma_flag    <- - - - CONTROL FLAG (Chroma)
-- |      }
02 |      luma_log2_weight_denom
03 |      if( chroma_format_idc != 0 )
04 |         delta_chroma_log2_weight_denom
05 |      for( i = 0; i <= num_ref_idx_l0_active_minus1; i++ )
06 |         luma_weight_l0_flag[ i ]
07 |      if( chroma_format_idc != 0 )
08 |         for( i = 0; i <= num_ref_idx_l0_active_minus1; i++ )
09 |            chroma_weight_l0_flag[ i ]
10 |      for( i = 0; i <= num_ref_idx_l0_active_minus1; i++ ) {
11 |         if( luma_weight_l0_flag[ i ] ) {
12 |            delta_luma_weight_l0[ i ]
13 |            luma_offset_l0[ i ]
14 |         }
15 |         if( chroma_weight_l0_flag[ i ] )
16 |            for( j = 0; j < 2; j++ ) {
17 |               delta_chroma_weight_l0[ i ][ j ]
18 |               delta_chroma_offset_l0[ i ][ j ]
19 |            }

38 |      }
39 |   }
```

Slice Header

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2014/056935 (filed on Mar. 14, 2014) under 35 U.S.C. §371, which claims priority to Japanese Patent Application Nos. 2013-079140 (filed on Apr. 5, 2013) and 2013-273228 (filed on Dec. 27, 2013), which are all hereby incorporated by reference in their entirety.

TECHNICAL FIELD

The present disclosure relates to an image processing apparatus and an image processing method.

BACKGROUND ART

The standardization of an image coding scheme called HEVC (High Efficiency Video Coding) by JCTVC (Joint Collaboration Team-Video Coding), which is a joint standardization organization of ITU-T and ISO/IEC, is currently under way for the purpose of improving coding efficiency more than H. 264/AVC (see, for example, Non-Patent Literature 1 below).

HEVC provides not only coding of a single layer but also scalable video coding, as in known image coding schemes such as MPEG2 and AVC (Advanced Video Coding). An HEVC scalable video coding technology is also called SHVC (Scalable HEVC) (for example, see Non-Patent Literature 2 below).

Incidentally, scalable video coding is generally a technology that hierarchically encodes a layer transmitting a rough image signal and a layer transmitting a fine image signal. Typical attributes hierarchized in the scalable video coding mainly include the following three:

Space scalability: Spatial resolutions or image sizes are hierarchized.
Time scalability: Frame rates are hierarchized.
SNR (Signal to Noise Ratio) scalability: SN ratios are hierarchized.

Further, though not yet adopted in the standard, the bit depth scalability and chroma format scalability are also discussed.

In Non-Patent Literature 3, color gamut scalability in which color gamuts are hierarchized is discussed. For example, in high definition (HD) televisions, an image size of 1920×1080 pixels, a color gamut of ITU-R BT.709, and a bit depth of 8 bits are generally used. On the other hand, in ultra high definition (UHD) televisions, use of an image size of 4000×2000 pixels or 8000×4000 pixels, a color gamut of ITU-R BT.2020, and a bit depth of 10 or 12 bits is being investigated. In general, for conversion of a color gamut, it is necessary to perform matrix calculation on 3-dimensional pixel vectors. However, from the viewpoint of approximating a relation between BT.709 and BT.2020 to a linear relation independent for each color component, Non-Patent Literature 3 proposes predicting a pixel value of an enhancement layer from a pixel value of a base layer by a simple method when BT.709 is used in the base layer and BT.2020 is used in the enhancement layer.

CITATION LIST

Non-Patent Literature

Non-Patent Literature 1: "High Efficiency Video Coding (HEVC) text specification draft 10 (for FDIS & Consent)" by Benjamin Bross, Woo-Jin Han, Gary J. Sullivan, Jens-Rainer Ohm, Gary J. Sullivan, Ye-Kui Wang, and Thomas Wiegand, (JCTVC-L1003 v4, Jan. 14 to 23, 2013)

Non-Patent Literature 2: "Description of scalable video coding technology proposal by Qualcomm (configuration 2)" by Jianle Chen, el. al, (JCTVC-K0036, Oct. 10 to 19, 2012)

Non-Patent Literature 3: "Color Gamut Scalable Video Coding: New Results" by Louis Kerofsky, el. al, (JCTVC-L0334, Jan. 14 to 23, 2013)

SUMMARY OF INVENTION

Technical Problem

In the method proposed in Non-Patent Literature 3, however, since a gain and an offset of each color component are encoded for each picture in an adaptive parameter mode in which high prediction precision can be achieved, an encoding amount increases. In a bit shift mode and a fixed parameter mode, no additional encoding parameter occurs, but prediction precision slightly deteriorates.

Accordingly, it is desirable to provide a new structure capable of suppressing an increase in an encoding amount while achieving high prediction precision in color gamut scalability.

Solution to Problem

According to an embodiment of the present disclosure, there is provided an image processing apparatus including a decoding section configured to decode a difference from a previous value of a prediction parameter used when an image of a second layer having a different color gamut from a first layer is predicted from an image of the first layer, and a prediction section configured to predict the image of the second layer from the image of the first layer using the prediction parameter calculated using the difference decoded by the decoding section.

The image processing apparatus mentioned above may be typically realized as an image decoding device that decodes an image.

According to an embodiment of the present disclosure, there is provided an image processing method including decoding a difference from a previous value of a prediction parameter used when an image of a second layer having a different color gamut from a first layer is predicted from an image of the first layer, and predicting the image of the second layer from the image of the first layer using the prediction parameter calculated using the decoded difference.

According to an embodiment of the present disclosure, there is provided an image processing apparatus including a prediction section configured to predict an image of a second layer from an image of a first layer referred to when the image of the second layer having a different color gamut from the first layer is decoded, and an encoding section configured to encode a difference from a previous value of a prediction parameter used by the prediction section.

The image processing apparatus mentioned above may be typically realized as an image encoding device that encodes an image.

According to an embodiment of the present disclosure, there is provided an image processing method including predicting an image of a second layer from an image of a first layer referred to when the image of the second layer having a different color gamut from the first layer is decoded, and encoding a difference from a previous value of a prediction parameter used to predict the image of the second layer.

Advantageous Effects of Invention

According to the technology in the present disclosure, it is possible to suppress an increase in an encoding amount while achieving high prediction precision in the color gamut scalability.

BRIEF DESCRIPTION OF DRAWINGS

FIG. 1 is an explanatory view illustrating scalable video coding.

FIG. 2 is an explanatory view illustrating color gamuts expressed by BT.709 and BT.2020.

FIG. 3A is a table showing a prediction mode for color gamut prediction proposed by JCTVC-L0334.

FIG. 3B is a first explanatory view illustrating the syntax of prediction parameters proposed by JCTVC-L0334.

FIG. 3C is a second explanatory view illustrating the syntax of prediction parameters proposed by JCTVC-L0334.

FIG. 8 is an explanatory view illustrating an example of a syntax of encoding parameters for color gamut prediction.

FIG. 9 is an explanatory view illustrating parameter values which are a basis for gain and offset differences.

FIG. 14 is an explanatory view illustrating an example of a syntax according to the method described with reference to FIG. 12.

FIG. 19 is an explanatory view illustrating an example of a syntax according to the method described with reference to FIGS. 18A to 18C.

DESCRIPTION OF EMBODIMENTS

Figure 4:
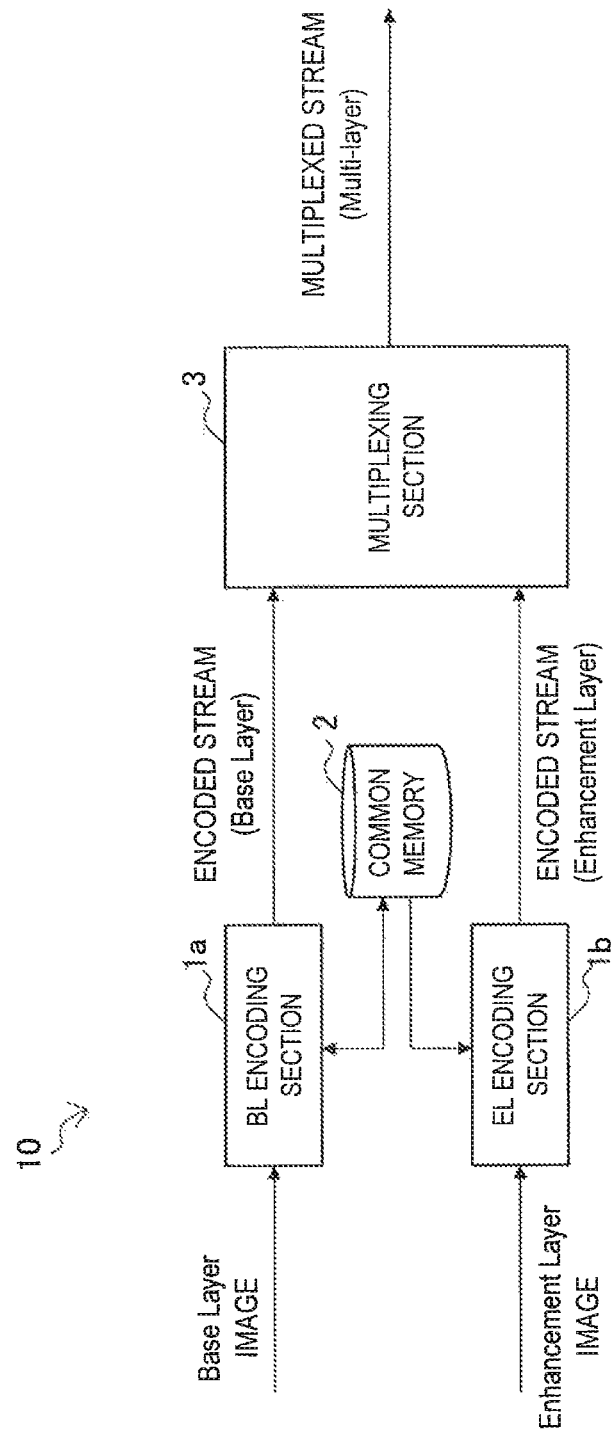
FIG. 4 is a block diagram showing a schematic configuration of an image encoding device according to an embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Overview
   1-1. Scalable Video Coding
   1-2. Color Gamut Scalability
   1-3. Basic Configuration Example of Encoder
   1-4. Basic Configuration Example of Decoder
2. Configuration Example of EL Encoding Section in an Embodiment
   2-1. Overall Configuration
   2-2. Detailed Configuration of Color Gamut Prediction Section
   2-3. Example of Syntax
3. Process Flow for Encoding According to an Embodiment
   3-1. Schematic Flow
   3-2. Color Gamut Prediction Process
4. Configuration Example of EL Decoding Section in an Embodiment
   4-1. Overall Configuration
   4-2. Detailed Configuration of Color Gamut Prediction Section
5. Process Flow for Decoding According to an Embodiment
   5-1. Schematic Flow
   5-2. Color Gamut Prediction Process
6. Example Application
6-1. Application to Various Products
6-2. Various Uses of Scalable Video Coding
6-3. Others
7. Conclusion

1. OVERVIEW

[1-1. Scalable Video Coding]

In the scalable video coding, a plurality of layers, each containing a series of images, is encoded. A base layer is a layer encoded first to represent roughest images. An encoded stream of the base layer may be independently decoded without decoding encoded streams of other layers. Layers other than the base layer are layers called enhancement layer representing finer images. Encoded streams of enhancement layers are encoded by using information contained in the encoded stream of the base layer. Therefore, to reproduce an image of an enhancement layer, encoded streams of both of the base layer and the enhancement layer are decoded. The number of layers handled in the scalable video coding may be any number equal to 2 or greater. When three layers or more are encoded, the lowest layer is the base layer and the remaining layers are enhancement layers. For an encoded stream of a higher enhancement layer, information contained in encoded streams of a lower enhancement layer and the base layer may be used for encoding and decoding.

FIG. 1 shows three layers L1, L2, and L3 subjected to scalable video coding. The layer L1 is a base layer and the layers L2 and L3 are enhancement layers. A space resolution ratio of the layer L2 to the layer L1 is 2:1 and a space resolution ratio of the layer L3 to the layer L1 is 4:1. The resolution ratios herein are merely examples. For example, a resolution ratio of a non-integer such as 1.5:1 may be used. A block B1 of the layer L1 is a processing unit of an encoding process in a picture of the base layer. A block B2 of the layer L2 is a processing unit of an encoding process in a picture of the enhancement layer to which a common scene to the block B1 is projected. The block B2 corresponds to the block B1 of the layer L1. A block B3 of the layer L3 is a processing unit of an encoding process in a picture of the enhancement layer higher than the layers to which the common scene to the blocks B1 and B2 is projected. The block B3 corresponds to the block B1 of the layer L1 and the block B2 of the layer L2.

[1-2. Color Gamut Scalability]

In the layer structure exemplified in FIG. 1, textures of images are similar between the layers to which the common scene is projected. That is, the textures of the block B1 in the layer L1, the block B2 in the layer L2, and the block B3 in the layer L3 are similar. Accordingly, for example, when pixels of the block B2 or B3 are predicted using the block B1 as a reference block or pixels of the block B3 are predicted using the block B2 as a reference block, there is a probability of high prediction precision being obtained. Such prediction between the layers is referred to as inter layer prediction. Non-Patent Literature 2 proposes several methods for the inter layer prediction. In the methods, a decoded image (reconstructed image) of a base layer is used as a reference image to predict a decoded image of an enhancement layer in intra BL prediction. In intra residual prediction and inter residual prediction, a prediction error (residual) image of the base layer is used as a reference image to predict a prediction error image of an enhancement layer.

Here, for example, an image of the layer L1 is assumed to be an HD television image and an image of the layer L2 is assumed to be a UHD television image. FIG. 2 is an explanatory view illustrating color gamuts expressed by BT.709 and BT.2020. Referring to FIG. 2, a color gamut graph in which a 3-dimensional color space is mapped to a 2-dimensional plane using a predetermined restraint condition is shown. The cross mark in the graph indicates a position to which white is mapped. A dashed line in the graph indicates a color range expressed by BT.709. A solid line in the graph indicates a color range expressed by BT.2020. A dotted line in the graph indicates a color range which can be identified by human sight. As understood from FIG. 2, BT.2020 can express a greater variety of colors than BT.709. When each pixel of the layer L1 is expressed by BT.709 and each pixel of the layer L2 is expressed by BT.2020, resolution conversion (that is, up-sampling) or color gamut conversion is performed on the reference image (the image of the Layer 1) at the time of the inter layer prediction. In general, the color gamut conversion is performed by multiplying a 3-dimensional pixel vector by a conversion matrix of 3 rows and 3 columns. As described in Non-Patent Literature 3, a relation between BT.709 and BT.2020 can be approximated to a linear relation independent for each color component. Therefore, Non-Patent Literature 3 proposes a simplified method of reducing calculation complexity and time necessary for the color gamut conversion.

FIG. 3A is a table showing a prediction mode for color gamut prediction proposed by Non-Patent Literature 3. Referring to FIG. 3A, a prediction mode number is one of "0," "1," and "2," i.e., there are three kinds of candidates of prediction modes. When the prediction mode number="0," pixel values ($Y_{2020}$, $U_{2020}$, $V_{2020}$) of BT.2020 are predicted from pixel values ($Y_{709}$, $U_{709}$, $V_{709}$) of BT.709 of color components by bit shift (bit increment), as in the following equations (1) to (3). Such a prediction mode is referred to as a bit shift mode in the present specification.

[Math 1]

$$Y_{2010} = Y_{709} << 2 \quad (1)$$

$$U_{2010} = U_{709} << 2 \quad (2)$$

$$V_{2010} = V_{709} << 2 \quad (3)$$

When the prediction mode number="1" or "2," pixel values of BT.2020 are predicted from pixel values of BT.709 of color components by linear conversion using a gain $g_i$ and an offset $o_i$ (where i=1, 2, 3), as in the following equations (4) to (6).

[Math 2]

$$Y_{2010} = g_1 \cdot Y_{709} + o_1 \quad (4)$$

$$U_{2010} = g_2 \cdot U_{709} + o_2 \quad (5)$$

$$V_{2010} = g_3 \cdot V_{709} + o_3 \quad (6)$$

When the prediction mode number="1," fixed values specified in advance as the values of a gain and an offset are used. The prediction mode in which the prediction mode number="1" is referred to as a fixed parameter mode in the present specification. When the prediction mode number="2," variable values adaptively designated as the values of a gain and an offset are used. The prediction mode in which the prediction mode number="2" is referred to as an adaptive parameter mode in the present specification. When the adaptive parameter mode is selected, six kinds of prediction parameters (three gains and three offsets) are additionally encoded as prediction parameters.

FIGS. 3B and 3C are explanatory views illustrating the syntax of prediction parameters proposed in Non-Patent Literature 3. Here, "pps_extension_flag" in the 1st line of FIG. 3B is a flag that indicates whether Picture Parameter Set (PPS) includes a syntax extended for color gamut prediction. In addition, "color_pred_data( )" in the 5th line of FIG. 3B is a function of a syntax for color gamut scalability and its content is shown in FIG. 3C. Here, "color_prediction_model" in the 1st line of FIG. 3C is a parameter that indicates a selected prediction mode and takes one value among "0," "1," and "2" exemplified in FIG. 3A. In the case of the adaptive parameter mode ("color_prediction_model=2"), the number of bits ("numFractionBits") corresponding to a denominator of a gain in the 3rd line, a numerator ("color_ prediction_gain[I]" of a gain for an i-th color component in the 5th line, and an offset ("color_prediction_offset[I]") for the i-th color component in the 6th line are designated.

Of the three prediction modes, the adaptive parameter mode is a mode in which highest prediction precision can be expected. However, when the above-described prediction parameters are encoded for each picture in the adaptive parameter mode, an encoding amount increases. Accordingly, in embodiments to be described below, structures configured to efficiently encode the prediction parameters in color gamut scalability in order to suppress an increase in the encoding amount will be described.

[1-3. Basic Configuration Example of Encoder]

FIG. 4 is a block diagram showing a schematic configuration of an image encoding device 10 according to an embodiment supporting scalable video coding. Referring to FIG. 4, the image encoding device 10 includes a base layer (BL) encoding section 1a, an enhancement layer (EL) encoding section 1b, a common memory 2, and a multiplexing section 3.

The BL encoding section 1a encodes a base layer image to generate an encoded stream of the base layer. The EL encoding section 1b encodes an enhancement layer image to generate an encoded stream of an enhancement layer. The common memory 2 stores information commonly used between layers. The multiplexing section 3 multiplexes an encoded stream of the base layer generated by the BL encoding section 1a and an encoded stream of at least one enhancement layer generated by the EL encoding section 1b to generate a multilayer multiplexed stream.

[1-4. Basic Configuration Example of Decoder]

Figure 5:
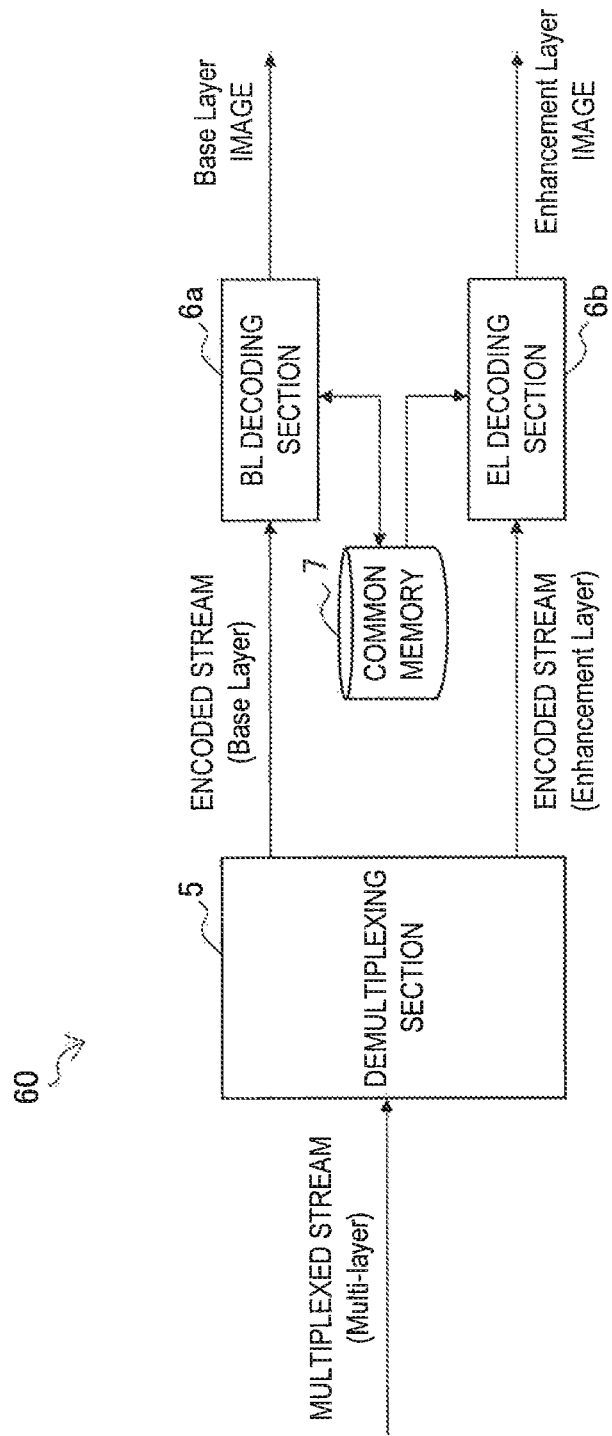
FIG. 5 is a block diagram showing a schematic configuration of an image decoding device according to an embodiment.

FIG. 5 is a block diagram showing a schematic configuration of an image decoding device 60 according to an embodiment supporting scalable video coding. Referring to FIG. 5, the image decoding device 60 includes a demultiplexing section 5, a base layer (BL) decoding section 6a, an enhancement layer (EL) decoding section 6b, and a common memory 7.

The demultiplexing section 5 demultiplexes a multilayer multiplexed stream into an encoded stream of the base layer and an encoded stream of at least one enhancement layer. The BL decoding section 6a decodes a base layer image from an encoded stream of the base layer. The EL decoding section 6b decodes an enhancement layer image from an encoded stream of an enhancement layer. The common memory 7 stores information commonly used between layers.

In the image encoding device 10 illustrated in FIG. 4, the configuration of the BL encoding section 1a to encode the base layer and that of the EL encoding section 1b to encode an enhancement layer are similar to each other. Some parameters and images generated or acquired by the BL encoding section 1a may be buffered by using the common memory 2 and reused by the EL encoding section 1b. In the next section, such a configuration of the EL encoding section 1b will be described in detail.

Similarly, in the image decoding device 60 illustrated in FIG. 5, the configuration of the BL decoding section 6a to decode the base layer and that of the EL decoding section 6b to decode an enhancement layer are similar to each other. Some parameters and images generated or acquired by the BL decoding section 6a may be buffered by using the common memory 7 and reused by the EL decoding section 6b. Further in the next section, such a configuration of the EL decoding section 6b will be described in detail.

2. CONFIGURATION EXAMPLE OF EL ENCODING SECTION IN AN EMBODIMENT

[2-1. Overall Configuration]

Figure 6:
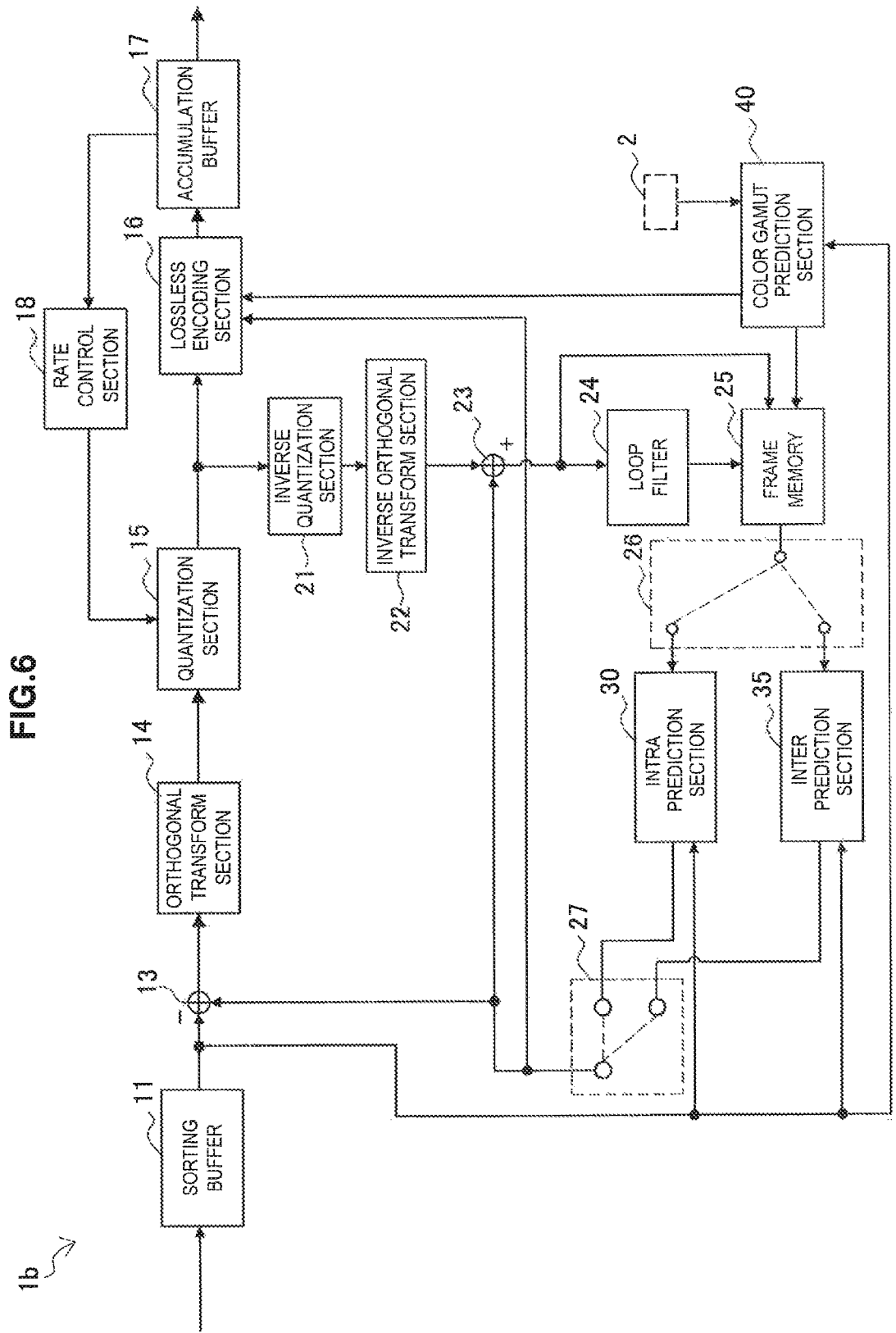
FIG. 6 is a block diagram showing an example of the configuration of an EL encoding section illustrated in FIG. 4.

FIG. 6 is a block diagram showing an example of the configuration of the EL encoding section 1b illustrated in FIG. 4. Referring to FIG. 6, the EL encoding section 1b includes a sorting buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, a frame memory 25, selectors 26 and 27, an intra prediction section 30, an inter prediction section 35, and a color gamut prediction section 40.

The sorting buffer 11 sorts the images included in the series of image data. After sorting the images according to a GOP (Group of Pictures) structure according to the encoding process, the sorting buffer 11 outputs the image data which has been sorted to the subtraction section 13, the intra prediction section 30, the inter prediction section 35, and the color gamut prediction section 40.

The image data input from the sorting buffer 11 and predicted image data input by the intra prediction section 30 or the inter prediction section 35 described later are supplied to the subtraction section 13. The subtraction section 13 calculates predicted error data which is a difference between the image data input from the sorting buffer 11 and the predicted image data and outputs the calculated 16 predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. In HEVC, an orthogonal transform is performed for each block called a transform unit (TU). The TU is a block formed by dividing a coding unit (CU). The orthogonal transform section 14 outputs transform coefficient data acquired by the orthogonal transform process to the quantization section 15.

The quantization section 15 is supplied with the transform coefficient data input from the orthogonal transform section 14 and a rate control signal from the rate control section 18 to be described below. The quantization section 15 quantizes the transform coefficient data in a quantization step determined according to the rate control signal. The quantization section 15 outputs the quantized transform coefficient data (hereinafter referred to as quantized data) to the lossless encoding section 16 and the inverse quantization section 21.

The lossless encoding section 16 performs a lossless encoding process on the quantized data input from the quantization section 15 to generate an encoded stream of an enhancement layer. The lossless encoding section 16 encodes various parameters referred to when the encoded stream is decoded and inserts the encoded parameters into a header region of the encoded stream. The parameters encoded by the lossless encoding section 16 can include information regarding intra prediction and information regarding inter prediction to be described below. Prediction parameters related to color gamut prediction can further be encoded. Then, the lossless encoding section 16 outputs the generated encoded stream to the accumulation buffer 17.

The accumulation buffer 17 temporarily accumulates an encoded stream input from the lossless encoding section 16 using a storage medium such as a semiconductor memory. Then, the accumulation buffer 17 outputs the accumulated encoded stream to a transmission section (not shown) (for example, a communication interface or an interface to peripheral devices) at a rate in accordance with the band of a transmission path.

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21, the inverse orthogonal transform section 22, and the addition section 23 form a local decoder. In the quantization step used by the quantization section 15, the inverse quantization section 21 performs inverse quantization on the quantized data of an enhancement layer to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the predicted error data. As in the orthogonal transform, the inverse orthogonal transform is performed for each TU. Then, the inverse orthogonal transform section 22 outputs the restored predicted error data to the addition section 23.

The addition section 23 adds the restored predicted error data input from the inverse orthogonal transform section 22 and the predicted image data input from the intra prediction section 30 or the inter prediction section 35 to thereby generate decoded image data (reconstructed image of the enhancement layer). Then, the addition section 23 outputs the generated decoded image data to the loop filter 24 and the frame memory 25.

The loop filter 24 includes a filter group for the purpose of improving image quality. A deblock filter (DF) is a filter that reduces block distortion occurring when an image is encoded. A sample adaptive offset (SAO) filter is a filter that adds an adaptively determined offset value to each pixel value. An adaptive loop filter (ALF) is a filter that minimizes an error between an image subjected to the SAO and an original image. The loop filter 24 filters the decoded image data input from the addition section 23 and outputs the filtered decoded image data to the frame memory 25.

The frame memory 25 stores the decoded image data of the enhancement layer input from the addition section 23, the filtered decoded image data of the enhancement layer input from the loop filter 24, and reference image data of the base layer input from the color gamut prediction section 40 using a storage medium.

The selector 26 reads the decoded image data before the filtering used for the intra prediction from the frame memory 25 and supplies the read decoded image data as reference image data to the intra prediction section 30. Further, the selector 26 reads the filtered decoded image data used for the inter prediction from the frame memory 25 and supplies the read decoded image data as reference image data to the inter prediction section 35. When inter layer prediction is performed by the intra prediction section 30 or the inter prediction section 35, the selector 26 supplies the reference image data of the base layer to the intra prediction section 30 or the inter prediction section 35.

In the intra prediction mode, the selector 27 outputs predicted image data as a result of intra prediction output from the intra prediction section 30 to the subtraction section 13 and also outputs information about the intra prediction to the lossless encoding section 16. Further, in the inter prediction mode, the selector 27 outputs predicted image data as a result of inter prediction output from the inter prediction section 35 to the subtraction section 13 and also outputs information about the inter prediction to the lossless encoding section 16. The selector 27 switches the inter prediction mode and the intra prediction mode in accordance with the magnitude of a cost function value.

The intra prediction section 30 performs an intra prediction process on each prediction unit (PU) of HEVC based on the original image data and the decoded image data of the enhancement layer. For example, the intra prediction section 30 evaluates a prediction result according to each candidate mode in a prediction mode set using a predetermined cost function. Next, the intra prediction section 30 selects a prediction mode in which a cost function value is the minimum, i.e., a prediction mode in which a compression ratio is the highest, as an optimum prediction mode. The intra prediction section 30 generates predicted image data of the enhancement layer according to the optimum prediction mode. The intra prediction section 30 may include intra BL prediction which is a kind of inter layer prediction in the prediction mode set in the enhancement layer. In the intra BL prediction, a co-located block in the base layer corresponding to a prediction target block of the enhancement layer is used as a reference block, and a predicted image is generated based on a decoded image of the reference block. The intra prediction section 30 may include intra residual prediction which is a kind of inter layer prediction. In the intra residual prediction, a predicted error of intra prediction is predicted based on the predicted error image of the reference block which is the co-located block in the base layer, and a predicted image for which the predicted error has been predicted and added is generated. The intra prediction section 30 outputs information regarding the intra prediction including prediction mode information indicating the selected optimum prediction mode, the cost function value, and the predicted image data to the selector 27.

The inter prediction section 35 performs an inter prediction process on each prediction unit (PU) of HEVC based on the original image data and the decoded image data of the enhancement layer. For example, the inter prediction section 35 evaluates a prediction result according to each candidate mode in a prediction mode set using a predetermined cost function. Next, the inter prediction section 35 selects a prediction mode in which a cost function value is the minimum, i.e., a prediction mode in which a compression ratio is the highest, as an optimum prediction mode. The inter prediction section 35 generates predicted image data of the enhancement layer according to the optimum prediction mode. The inter prediction section 35 may include inter residual prediction which is a kind of inter layer prediction. In the inter residual prediction, a predicted error of intra prediction is predicted based on the predicted error image of the reference block which is the co-located block in the base layer, and a predicted image for which the predicted error has been predicted and added is generated. The intra prediction section 35 outputs information regarding the intra prediction including prediction mode information and motion information indicating the selected optimum prediction mode, the cost function value, and the predicted image data to the selector 27.

The color gamut prediction section 40 up-samples the image (the decoded image or the predicted error image) of the base layer buffered in the common memory 2 according to a resolution ratio between the base layer and the enhancement layer. When the image of the enhancement layer has a different color gamut from the image of the base layer, the color gamut prediction section 40 converts the color gamut of the up-sampled image of the base layer into the same color gamut as the image of the enhancement layer. In the embodiment, on the assumption of a linear relation independent for each color component between the color gamuts of the base layer and the enhancement layer, the color gamut prediction section 40 converts the color gamut by approximately predicting the image of the enhancement layer from the image of the base layer. The image of the base layer of which the color gamut is converted by the color gamut prediction section 40 can be stored in the frame memory 25 to be used as a reference image in the inter layer prediction by the intra prediction section 30 or the inter prediction section 35. The color gamut prediction section 40 generates several parameters to be used to predict the color gamut. The parameters generated by the color gamut prediction section 40 include, for example, prediction mode parameters indicating a prediction mode. When the adaptive parameter mode is selected as the prediction mode, the parameters generated by the color gamut prediction section 40 include prediction parameters of each color component, i.e., a gain and an offset. Further, the color gamut prediction section 40 calculates a difference from a previous value of the prediction parameter and outputs the calculated difference to the lossless encoding section 16. The prediction mode parameters and the differences of the prediction parameters can be encoded by the lossless encoding section 16.

[2-2. Detailed Configuration of Color Gamut Prediction Section]

Figure 7:
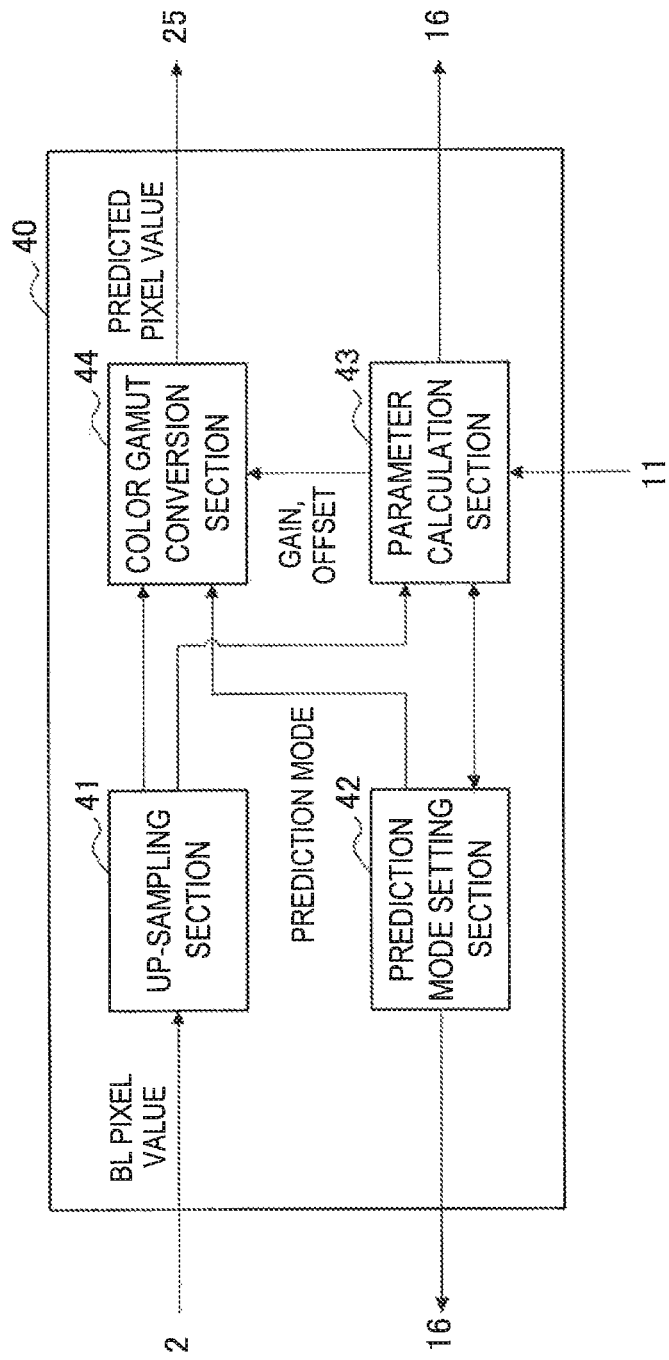
FIG. 7 is a block diagram showing an example of the configuration of a color gamut prediction section illustrated in FIG. 6.

FIG. 7 is a block diagram showing an example of the configuration of the color gamut prediction section 40 illustrated in FIG. 6. Referring to FIG. 7, the color gamut prediction section 40 includes an up-sampling section 41, a prediction mode setting section 42, a parameter calculation section 43, and a color gamut conversion section 44.

(1) Up-Sampling Section

The up-sampling section 41 up-samples the image of the base layer acquired from the common memory 2 according to a resolution ratio between the base layer and the enhancement layer. More specifically, the up-sampling section 41 calculates an interpolated pixel value of each of interpolated pixels sequentially scanned according to the resolution ratio by filtering the image of the base layer with a predefined filter coefficient. Thus, a space resolution of the image of the base layer used as the reference block can be increased up to the same resolution as that of the enhancement layer. The up-sampling section 41 outputs the image after the up-sampling to the parameter calculation section 43 and the color gamut conversion section 44.

(2) Prediction Mode Setting Section

The prediction mode setting section 42 sets a prediction mode which is predefined or dynamically selected among candidates of the prediction mode for the color gamut prediction in the color gamut prediction section 40. The candidates of the prediction mode can include the bit shift mode, the fixed parameter mode, and the adaptive parameter mode described above. In an embodiment, the prediction mode setting section 42 can set an optimum prediction mode for each picture. In another embodiment, the prediction mode setting section 42 can set an optimum prediction mode for each slice. One picture can have one or more slices. In still another embodiment, the prediction mode setting section 42 can set a prediction mode for each sequence and maintain the same prediction mode throughout a plurality of pictures and a plurality of slices in one sequence. The prediction mode setting section 42 may evaluate encoding efficiency or prediction precision of each candidate of the prediction mode and select an optimum prediction mode. The prediction mode setting section 42 outputs a prediction mode parameter indicating the set prediction mode to the lossless encoding section 16.

(3) Parameter Calculation Section

When the adaptive parameter mode is set by the prediction mode setting section 42 or the encoding efficiency or the prediction precision of the adaptive parameter mode is evaluated by the prediction mode setting section 42, the parameter calculation section 43 calculates prediction parameters to be used in the adaptive parameter mode. The prediction parameters include the gain $g_i$ and the offset $o_i$ (where i=1, 2, 3) expressed in equations (4) to (6). Here, the subscript i means each of three kinds of color components. The gain $g_i$ is a coefficient by which a pixel value of the base layer is multiplied. The offset $o_i$ is a numeral value added to a product of the pixel value of the base layer and the gain $g_i$. For example, the parameter calculation section 43 can calculate a gain and an offset by which the image of the base layer after the up-sampling input from the up-sampling section 41 is the closest to the original image input from the sorting buffer 11 for each color component.

When the adaptive parameter mode is set as the prediction mode by the prediction mode setting section 42, the parameter calculation section 43 calculates differences from the previous values of the gain and the offset Here, when the gain and the offset are calculated for each picture, the previous value may be, for example, a value calculated for the previous picture. When the gain and the offset are calculated for each slice, the previous value may be a value calculated for the slice (co-located slice) at the same position as that of the previous picture. When the bit shift mode is set in the previous picture or in the slice at the same position as that of the previous picture, the parameter calculation section 43 can use the values of the gain and the offset corresponding to a bit shift amount as bases of the differences. When the fixed parameter mode is set in the previous picture or in the slice at the same position as that of the previous picture, the parameter calculation section 43 can use the values of the gain and the offset which are predefined and fixed as bases of the differences. The parameter calculation section 43 outputs the calculated differences of the gain and the offset to the lossless encoding section 16. The value of the gain can include a fractional value. Thus, the prediction mode setting section 42 may decompose the value of the gain into its denominator and its numerator, calculate each difference between the denominator and the numerator, and output each difference to the lossless encoding section 16. The prediction mode setting section 42 may restrict the value of the denominator of the gain to only an integral power of 2 to improve the encoding efficiency and reduce the calculation cost. In this case, a binary logarithm of the value of the denominator may be used as a prediction parameter.

(4) Color Gamut Conversion Section

The color gamut conversion section 44 converts the color gamut of the image of the base layer after the up-sampling input from the up-sampling section 41 into the same color gamut as that of the image of the enhancement layer according to the prediction mode set by the prediction mode setting section 42. For example, when the bit shift mode is set, the color gamut conversion section 44 calculates the predicted pixel value by shifting the pixel value of the base layer after the up-sampling to the left by a predetermined bit shift amount $n_{shift}$ according to equations (1) to (3). The bit shift amount $n_{shift}$ may be 2 or 4 at a time of conversion from an an HD television image into an UHD television image, for example. When the fixed parameter mode is set, the color gamut conversion section 44 calculates the predicted pixel value by multiplying the pixel value of the base layer after the up-sampling by the fixed gain and further adding the fixed offset according to equations (4) to (6). When the adaptive parameter mode is set, the color gamut conversion section 44 calculates the predicted pixel value using the gain and the offset calculated adaptively by the parameter calculation section 43 instead of the fixed gain and the offset. Thus, a reference image for the inter layer prediction is generated. The color gamut conversion section 44 stores the reference image (the image of the base layer of which the color gamut is converted) for the inter layer prediction generated in this way in the frame memory 25.

[2-3. Example of Syntax]

(1) Basic Example

The prediction mode parameters output from the prediction mode setting section 42 and the differences of the prediction parameters (the gain and the offset of each color component) output from the parameter calculation section 43 can be encoded by the lossless encoding section 16 shown in FIG. 6 and can be inserted into the encoded stream of the enhancement layer. FIG. 8 is an explanatory view illustrating an example of a syntax of the encoding parameters for color gamut prediction.

For example, the syntax shown in FIG. 8 may be included in a PPS or may be included in a slice header. Here, "color_gamut_prediction_flag" in the 1st line of the syntax is a flag that indicates whether the PPS or the slice header includes a syntax extended for the color gamut prediction. In addition, "color_prediction_model" in the 3rd line is a prediction mode parameter that indicates a prediction mode set by the prediction mode setting section 42. As described with reference to FIG. 3A, when the prediction mode parameter is equal to "0," the prediction mode is the bit shift mode. When the prediction mode parameter is equal to "1," the prediction mode is the fixed parameter mode. When the prediction mode parameter is equal to "2," the prediction mode is the adaptive parameter mode. The prediction mode is not limited to these examples, but other kinds of prediction modes may be used. The prediction parameters after the 5th line are encoded when the prediction mode parameter indicates the adaptive parameter mode. Here, "delta_luma_log 2_gain_denom" in the 10th line is a difference between the binary logarithm of the value of the denominator of a gain of a luminance component a previous value thereof. In addition, "delta_luma_gain_color_gamut" in the 11th line is a difference between the value of the numerator of the gain of the luminance component and a previous value thereof. In addition, "delta_luma_offset_color_gamut" in the 12th line is a difference between the value of the offset of the luminance component and a previous value thereof. When "luma_gain_color_gamut_flag" in the 5th line indicates zero, the differences of the prediction parameters of the luminance component may not be encoded. In this case, the previous values of the prediction parameters may also be used in the latest picture or slice without change (that is, zero difference). In addition, "delta_chroma_log 2_gain_denom" in the 15th line is a difference between the binary logarithm of the value of the denominator of the gain of a color difference component and a previous value thereof. The example in which the common denominator is used for two color difference components has been shown in FIG. 8. However, denominators may be separately used for two color difference components, or the denominator of the gain of the luminance component and the denominator of the gain of the color difference component may be common. In addition, "delta_chroma_gain_color_gamut[j]" in the 17th line is a difference between the value of the numerator of the gain of a j-th (where j=1, 2) color difference component and a previous value thereof. In addition, "delta_chroma_ gain_color_gamut[j]" in the 18th line is a difference between the value of the numerator of the offset of a j-th (where j=1, 2) color difference component and a previous value thereof. When "chroma_gain_color_gamut_flag" in the 7th line indicates zero, the differences of the prediction parameters of the color difference component may not be encoded. In this case, the previous values of the prediction parameters may also be used in the latest picture or slice without change (that is, zero difference).

In the example of FIG. 8, the prediction mode parameter "color_prediction_model" is encoded for each PPS or slice header. In this case, even when the prediction mode parameter of the latest picture or slice indicates the adaptive parameter mode, the prediction mode parameter may not be said to indicate the adaptive parameter mode for the previous picture or the slice at the same position as that of the previous picture which is a basis of the difference. For example, when the previous prediction mode parameter indicates the bit shift mode, the difference parameters to which "delta_" is prefixed in the syntax of FIG. 8 each indicate a difference calculated by subtracting a parameter value corresponding to a bit shift amount from a latest value (gain or offset) of the prediction parameter. For example, when a bit shift amount $n_{shift}$ is equal to 2, the value of a corresponding gain is "$2^2=4$." The value of a corresponding offset may be zero irrespective of the bit shift amount $n_{shift}$. When the previous prediction mode parameter indicates the fixed parameter mode, the difference parameters in the syntax of FIG. 8 each indicate a difference calculated by subtracting a fixed parameter value (gain $g_{i\_fixed}$ or offset $o_{i\_fixed}$) from a latest value (gain or offset) of the prediction parameter. The gain $g_{i\_fixed}$ and the offset $o_{i\_fixed}$ are not encoded and are stored in advance in an encoder and a decoder. When the previous prediction mode parameter indicates the adaptive parameter mode, the difference parameters in the syntax of FIG. 8 each indicate a difference calculated by subtracting a previous parameter value (gain $g_{i\_prev}$ or offset $o_{i\_prev}$) from a latest value (gain or offset) of the prediction parameter. FIG. 9 shows the bases of the differences of the gain and the offset described herein in a table format. When the previous value is not present in the beginning or the like of a sequence, the basis of the difference may be zero or a fixed parameter value (gain $g_{i\_fixed}$ or offset $o_{i\_fixed}$).

(2) Encoding of Prediction Mode Parameter in Each Sequence

In FIG. 8, the extension flag "color_gamut_prediction_flag" in the 1st line and the prediction mode parameter "color_prediction_model" in the 3rd line may be encoded in each sequence and may be inserted into a sequence parameter set (SPS). In this case, the same prediction mode is maintained in one sequence. When the prediction mode is not changed in one sequence, it is not necessary to switch the basis of the difference which depends on the previous prediction mode, as exemplified in FIG. 9. Therefore, complexity of the difference calculation is alleviated and it is easy to mount a device. Further, it is also possible to reduce the encoding amount for the extension flag and the prediction mode parameter.

(3) Encoding of Prediction Parameter for Each Slice

Figure 10:
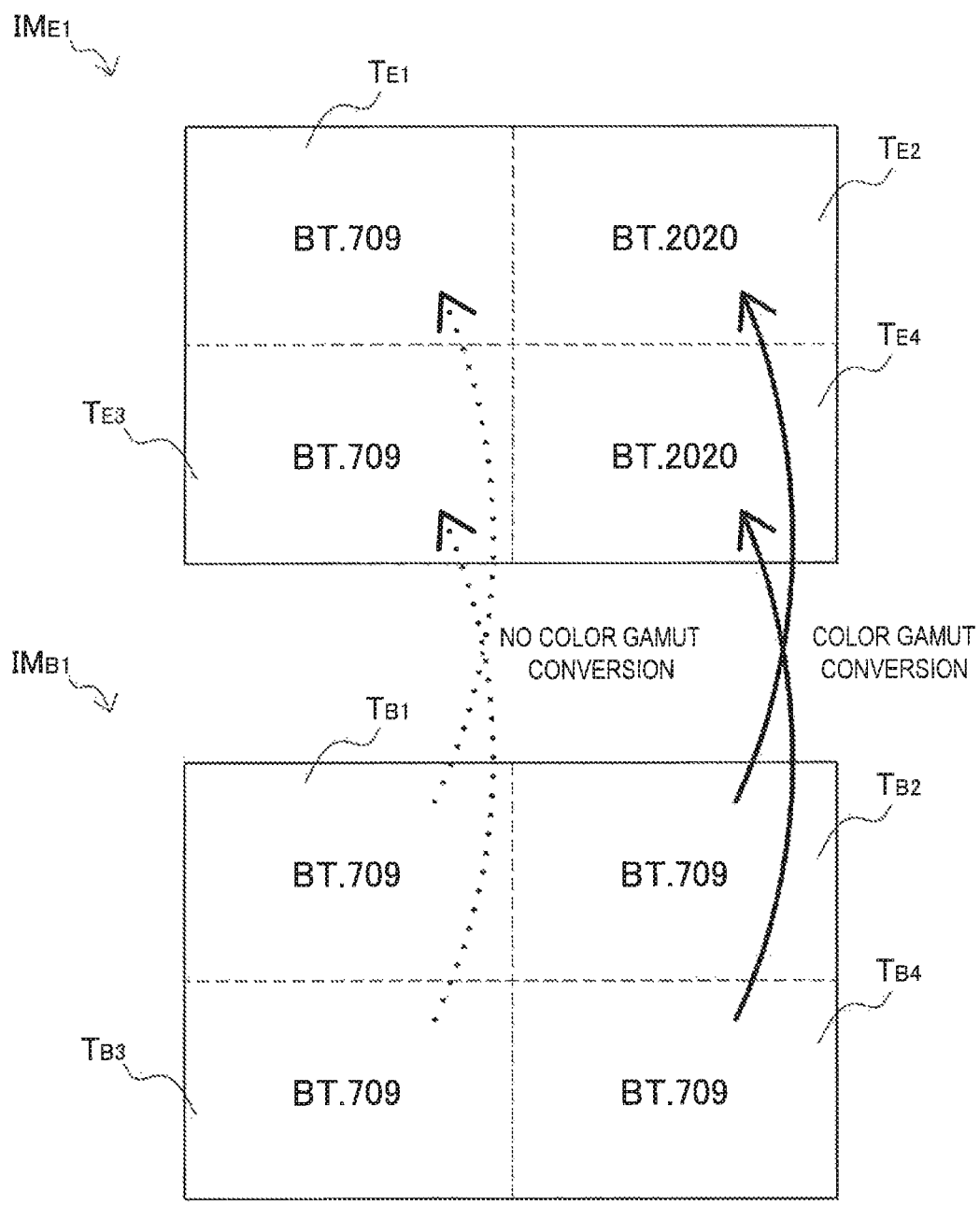
FIG. 10 is an explanatory view illustrating an example of encoding use of a gain and an offset of each slice.

As described with reference to FIGS. 3B and 3C, in the known method, the prediction mode parameter and the prediction parameter for the color gamut prediction are encoded for each picture and are inserted into the PPS. However, when a different color gamut is assumed to be used for each partial region of an image, encoding the differences of the prediction parameter and the prediction mode parameter for each slice is beneficial. For example, in the example shown in FIG. 10, a base layer image $IM_{B1}$ is divided into four tiles $T_{B1}$, $T_{B2}$, $T_{B3}$, and $T_{B4}$. An enhancement layer image $IM_{E1}$ is divided into four tiles $T_{E1}$, $T_{E2}$, $T_{E3}$, and $T_{E4}$. The four tiles show videos captured by different cameras. For example, the base layer image $IM_{B1}$ can be a low-resolution version of a combined video from the cameras installed at four spots and the enhancement layer image $IM_{E1}$ can be a high-resolution version of the same combined video. For example, BT.2020 is assumed to be used as a color gamut in the tiles $T_{E2}$ and $T_{E4}$ and BT.709 is assumed to be used as a color gamut in the other tiles of the base layer and the enhancement layer. In this case, by encoding the prediction mode parameters and the prediction parameters in the slice headers of the slices corresponding to the tiles $T_{E2}$ and $T_{E4}$ an optimum color gamut can be predicted for each tile and encoding efficiency can be improved.

(4) Reuse of Syntax for Weighted Prediction

Figure 11:
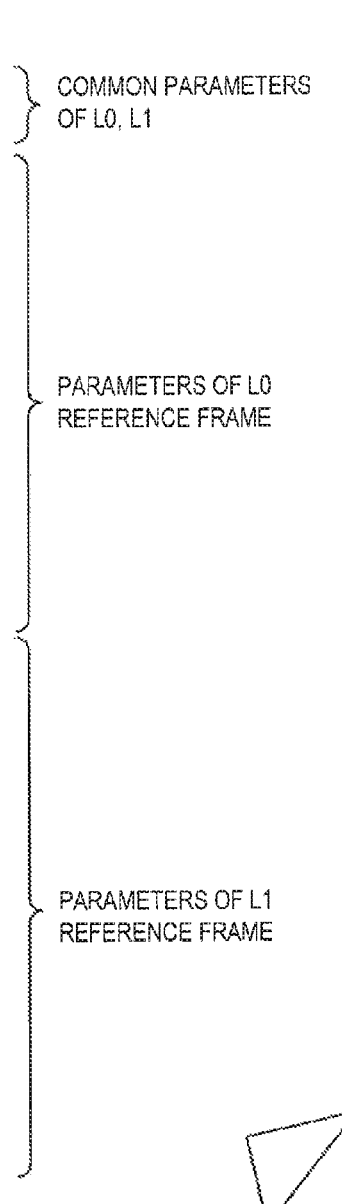
FIG. 11 is an explanatory view illustrating a known syntax of weighted-prediction associated parameters.

The syntax of the prediction parameters of the color gamut prediction exemplified in FIG. 8 is similar to the syntax of parameters associated with weighted prediction introduced in HEVC. The weighted prediction is a technology introduced to improve prediction precision of the inter prediction in a video to which effects of fade-in, fade-out, and the like are applied. FIG. 11 is an explanatory view illustrating a syntax of weighted-prediction associated parameters defined in Non-Patent Literature 1.

In FIG. 11, "luma_log 2_weight_denom" in the 2nd line and "delta_chroma_log 2_weight_denom" in the 4th line commonly specify the values of the denominators of weights of the luminance component and the color difference component, respectively, in regard to an L0 reference frame and an L1 reference frame usable in weighted prediction. The 5th to 20th lines specify the remaining weighted-prediction associated parameters in regard to the L0 reference frame. The 21st to 38th lines specify the remaining weighted-prediction associated parameters in regard to the L1 reference frame when bi-prediction is possible. The meanings of the individual parameters are described in Non-Patent Literature 1.

Table 1 below shows an example of mapping between the weighted-prediction associated parameters shown in FIG. 11 and the parameters of the color gamut prediction exemplified in FIG. 8. As understood from Table 1, of the parameters of the color gamut prediction exemplified in FIG. 8, all of the parameters excluding the extension flag "color_gamut_prediction_flag" and the prediction mode parameter "color_prediction_model" can be mapped to any parameter for weighted prediction. The roles of the individual parameters are different, for example, in that the values of the weighted-prediction associated parameters do not necessarily mean the differences from the previous values, but the types of mutually mapped parameters are the same. Since only one reference frame (base layer image) is present in the color gamut prediction, the variable "num_ref_idx_10 active_minus1" and the index i corresponding to a reference frame number are unnecessary.

TABLE 1

| WEIGHTED-PREDICTION ASSOCIATED PARAMETERS | COLOR GAMUT PREDICTION PARAMETERS |
|---|---|
| — | color_gamut_prediction_flag |
| — | color_prediction_model |
| luma_log2_weight_denom | delta_luma_log2_gain_denom |

TABLE 1-continued

| WEIGHTED-PREDICTION ASSOCIATED PARAMETERS | COLOR GAMUT PREDICTION PARAMETERS |
|---|---|
| delta_chroma_log2_weight_denom | delta_chroma_log2_gain_denom |
| num_ref_idx_l0_active_minus1 | NOT NEEDED |
| luma_weight_l0_flag[i] | luma_gain_color_gamut_flag |
| chroma_weight_l0_flag[i] | chroma_gain_color_gamut_flag |
| delta_luma_weight_l0[i] | delta_luma_gain_color_gamut |
| luma_offset_l0[i] | delta_luma_offset_color_gamut |
| deta_chroma_weight_l0[i][j] | delta_chroma_gain_color_gamut[j] |
| delta_chroma_offset_l0[i][j] | delta_chroma_offset_color_gamut[j] |

Accordingly, in an embodiment, for example, the lossless encoding section 16 may encode the differences of the prediction parameters of the color gamut prediction in the header (slice header) having the syntax common to the weighted-prediction associated parameters. Thus, it is not necessary to define a new syntax, redundancy of the syntax is reduced, and thus it is easy to ensure compatibility when the encoder and the decoder are mounted and the version is upgraded. The extension flag "color_gamut_prediction_flag" and the prediction mode parameter "color_prediction_model" can be encoded separately in the SPS, the PPS, or the slice header. A flag indicating whether any of the weighted-prediction associated parameters and the parameters for the color gamut prediction is encoded may be additionally encoded.

The effects of face-in, face-out, and the like are generally applied similarly to both of the base layer and the enhancement layer. Accordingly, to improve the encoding efficiency, reusing the weighted-prediction association parameters between the layers is beneficial. When the weighted-prediction associated parameters of the base layer are reused in the enhancement layer, the lossless encoding section 16 does not encode the weighted-prediction associated parameters unique to the enhancement layer. In this case, the syntax of FIG. 11 defined in Non-Patent Literature 1 is not used for the weighted prediction in the enhancement layer. Thus, by encoding the differences of the prediction parameters of the color gamut prediction in the same syntax, instead of the weighted-prediction associated parameters, the definition of the syntax can be efficiently utilized. In this case, the syntax (the 21st to 38th lines in FIG. 11) for the parameters of the L1 reference frame may not be used. Further, the value of the variable "num_ref_idx_10_active_minus1" corresponding to the number of reference frames (minus 1) may be considered to be zero (that is, the number of base layer images of which the color gamut is converted is 1).

In another embodiment, the weighted-prediction associated parameters may also be encoded in the enhancement layer and some of the weighted-prediction associated parameters may be reused. For example, the denominators specified by "luma_log 2_weight_denom" and "delta_chroma_log 2_weight_denom" shown in FIG. 11 may be reused as denominators of gains of the luminance component and the color difference component. In this case, the lossless encoding section 16 does not encode "delta_luma_log 2_gain_denom" and "delta_chroma_log 2_gain_denom" shown in FIG. 8. The encoding amount additionally necessary for the color gamut prediction can be reduced, and thus the encoding efficiency can be improved.

(5) Supply of Two Versions of Prediction Parameters

As described in the preceding clause, the syntax for the parameters of the L1 reference frame may not be used when the syntax of the weighted-prediction associated parameters is reused for the prediction parameters of the color gamut prediction. However, in a modification example, two versions of the prediction parameters of the color gamut prediction may be supplied by reusing both of the syntaxes for the parameters of the L0 reference frame and the L1 reference frame.

For example, the parameter calculation section 43 of the color gamut prediction section 40 calculates a first version of the gain $g_i$ and the offset $o_i$ (where i=1, 2, 3) when the adaptive parameter mode is set by the prediction mode setting section 42 or the encoding efficiency or the prediction precision of the adaptive parameter mode is evaluated. The parameter calculation section 43 also calculates a second version of the gain $g_i$ and the offset $o_i$ (where i=1, 2, 3). Then, the color gamut conversion section 44 selectively uses the first and second versions of the prediction parameters in order to predict an image of the enhancement layer, i.e., to generate a reference image for the inter layer prediction. The parameter calculation section 43 may calculate differences from the previous values in the first version of the prediction parameters and differences from the previous values in the second version of the prediction parameters. The lossless encoding section 16 encodes the differences calculated in the first version to portions for the L0 reference frame of the syntax common to the weighted-prediction associated parameters. Further, the lossless encoding section 16 encodes the differences calculated in the second version to portions for the L1 reference frame of the syntax common to the weighted-prediction associated parameters.

Hereinafter, two exemplary methods of switching the versions to be used when the image of the enhancement layer is predicted will be described.

(5-1) First Method

In a first method, the first and second versions of the prediction parameters are selectively used according to a band to which a pixel value belongs. Here, the band of the pixel value is not restrictive and can correspond to brightness in regard to a luminance component and vividness in regard to a color difference component.

Figure 12:
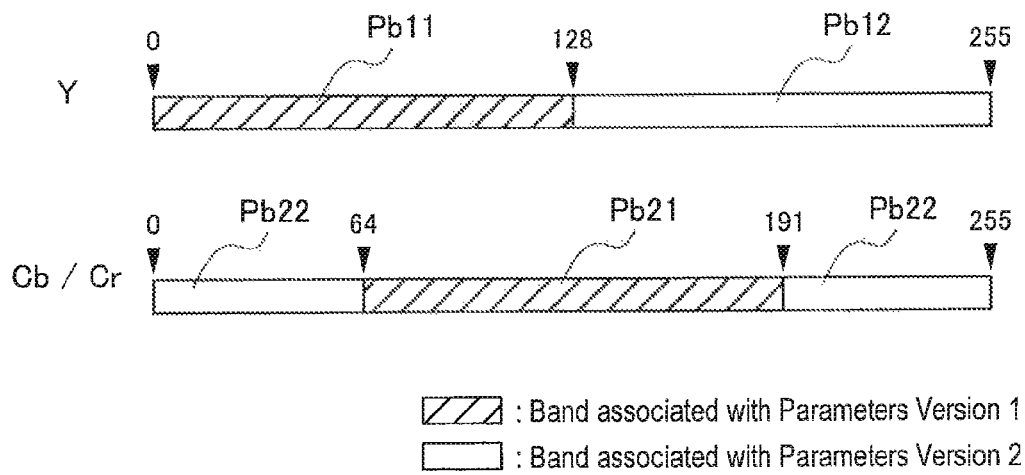
FIG. 12 is an explanatory view illustrating selective use of prediction parameters according to bands to which pixel values belong.

FIG. 12 is an explanatory view illustrating the selective use of prediction parameters according to bands to which a pixel value belongs. In FIG. 12, two bars expressing ranges of pixel values of a luminance component (Y) and a color difference component (Cb/Cr) are shown. When a bit depth is 8 bits, the ranges are 0 to 255. The range of the luminance component is partitioned into a lower band Pb11 and an upper band Pb12 using a boundary value as a reference. In the example of FIG. 12, the boundary value of the luminance component is equal to 128 (that is, the middle of the range). When the pixel value of the luminance component (for example, the pixel value of the luminance component of an up-sampled image) belongs to the band Pb11, the color gamut conversion section 44 can use the first version of the prediction parameter at the time of calculation of a predicted pixel value from this pixel value. When the pixel value of the luminance component belongs to the band Pb12, the color gamut conversion section 44 can use the second version of the prediction parameter at the time of calculation of a predicted pixel value from this pixel value. The range of the color difference component is partitioned into an inner band Pb21 and an outer band Pb22 using two boundary values as references. In the example of FIG. 12, the boundary values of the color difference component are equal to 64 and 191 (that is, the value of ¼ and the value of ¾ of the range). When the pixel value of the luminance component (for example, the pixel value of the luminance component of an up-sampled image) belongs to the band Pb21, the color gamut conversion section 44 can use the first version of the prediction parameter at the time of calculation of a predicted pixel value from this pixel value. When the pixel value of the color difference component belongs to the band Pb22, the color gamut conversion section 44 can use the second version of the prediction parameter at the time of calculation of a predicted pixel value from this pixel value.

The boundary values for the switching of the version to be used may be known in advance in both of the encoder and the decoder. The lossless encoding section 16 may further encode boundary information specifying the boundary values instead. For example, for the luminance component, the boundary information can indicate, for example, an adjustment value for the luminance component added to a reference (for example, 128 when the bit depth is 8 bits) of the middle of the range. For the color difference component, the boundary information can indicate an adjustment value for the color difference component subtracted from a first reference value equal to ¼ of the range and added to a second reference value equal to ¾ of the range.

Figure 13:
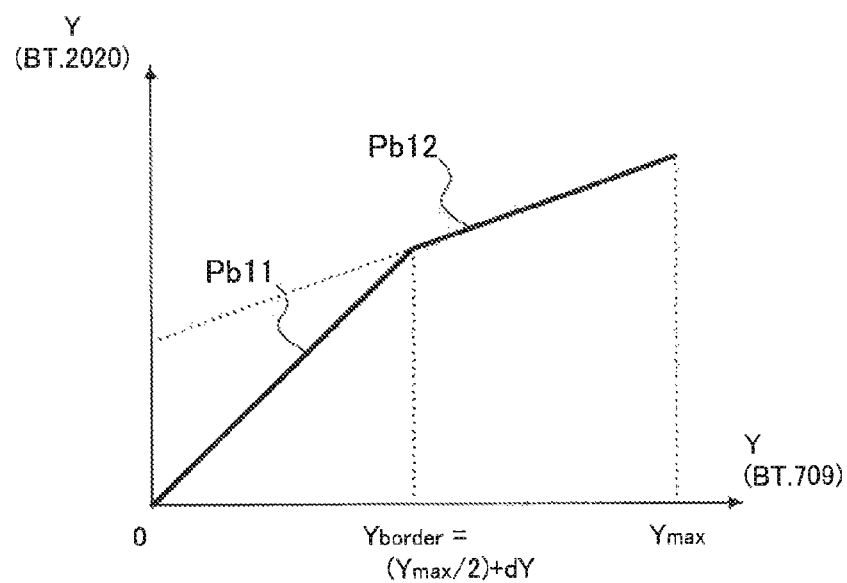
FIG. 13 is a graph simply expressing a luminance component of a prediction model realized according to a method described with reference to FIG. 12.

FIG. 13 is a graph simply expressing a luminance component of a prediction model realized according to the first method. The horizontal axis of the graph in FIG. 13 corresponds to a pixel value of the luminance component of the base layer and the pixel value is expressed with, for example, BT.709. The vertical axis corresponds to a pixel value of the luminance component of the enhancement layer and the pixel value is expressed with, for example, BT.2020. A thick line indicates a trajectory of a predicted pixel value of the enhancement layer predicted using the gain and the offset of the adaptive parameter mode from the pixel value of the base layer. The trajectory shows a polygonal line form which has different slopes and intercepts in the band Pb11 on the left side of a boundary value $Y_{border}$ on the horizontal axis and the band Pb12 on the right side thereof. When the prediction model depicting the trajectory with such a polygonal line form can be used, a prediction error of the color gamut prediction can be reduced compared to a known method in which a prediction model has a completely linear form (that is, a trajectory with a straight line form), and thus the encoding efficiency can be improved. The boundary value $Y_{border}$ may be equal to half ($Y_{max}/2$) of the maximum value $Y_{max}$ of the pixel value of the luminance component of the base layer or may be equal to a value obtained by adding an adjustment value dY to $Y_{max}/2$. Additional encoding of the adjustment value dY means that the boundary value $Y_{border}$ can be adaptively controlled. In this case, as the extension result of flexibility of the prediction model of the color gamut prediction, it is possible to further improve the prediction precision.

FIG. 14 is an explanatory view illustrating an example of a syntax according to the method described with reference to FIG. 12. Line numbers in the syntax shown in FIG. 14 correspond to the line numbers of the syntax of the weighted-prediction associated parameters shown in FIG. 11. In the syntax of the weighted-prediction associated parameters, the portion for the parameters of the L1 reference frame are not shown in the drawing for the sake of brevity of description. Referring to FIG. 14, an additional flag "inter_layer_pred_flag" is defined after the 2nd line. This flag "inter_layer_pred_flag" is set to be true when the syntax is used for the color gamut prediction parameter. A parameter "delta_pix_value_luma[i]" after the 13th line is the above-described boundary information for the luminance component. For example, the parameter "delta_pix_value_luma[i]" specifies, for the luminance component, an adjustment value of the luminance component added to the reference value of the middle of the range. A parameter "delta_pix_value_chroma[i][j]" after the 18th line is the above-described boundary information for the color difference component. For example, the parameter "delta_pix_value_chroma[i][j]" specifies, for the color difference component, an adjustment value for the color difference component subtracted from the first reference value equal to ¼ of the range and added to the second reference value equal to ¾ of the range. The additional parameters shown in FIG. 14 may be included not in the slice header but in an extension of the slice header.

(5-2) Second Method

In a second method, the first and second versions of the prediction parameters are selectively used according to an image region to which a pixel belongs. Here, the image region can correspond to an individual region which can be formed by segmenting a picture, a slice, or a tile.

Figure 15:
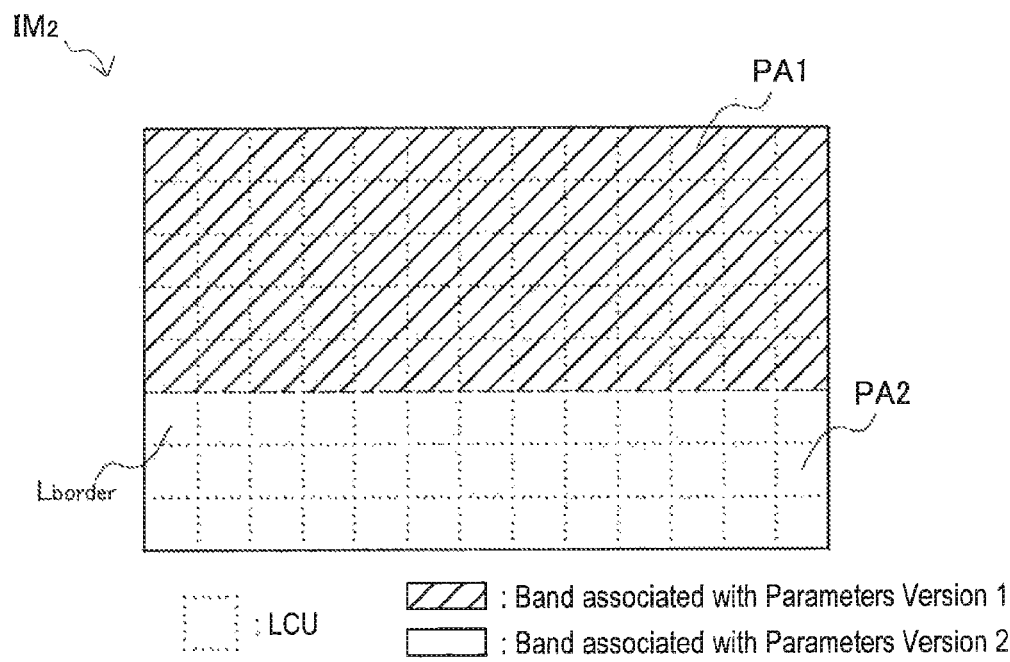
FIG. 15 is an explanatory view illustrating selective use of prediction parameters according to an image region to which pixels belong.

FIG. 15 is an explanatory view illustrating the selective use of prediction parameters according to the image region to which pixels belong. Referring to FIG. 15, an image $IM_2$ is shown. The image $IM_2$ may be, for example, an up-sampled image which can be output from the up-sampling section 41. The image $IM_2$ is segmented into an upper image region PA1 and a lower image region PA2. For example, the color gamut conversion section 44 can use the first version of the prediction parameters when a predicted pixel value of a pixel belonging to the image region PA1 is calculated, and can use the second version of the prediction parameters when a predicted pixel value of a pixel belonging to the image region PA2 is calculated.

The region boundary for the switching of the version to be used may be known in advance in both of the encoder and the decoder (for example, a boundary equally dividing a picture, a slice, or a tile into two parts). The lossless encoding section 16 may further encode boundary information specifying the region boundary instead. The boundary information may be, for example, information designating an initial LCU (LCU $L_{border}$ in the drawing) continuing after the region boundary in a raster scan order. The initial LCU continuing after the region boundary may be designated by the number of LCUs counted from a predetermined place of a picture, a slice, or a tile or may be designated by a flag included in the header of the initial LCU. In the former case, the predetermined place may be the beginning of a picture, a slice, or a tile or may be a median point (for example, a spot of exactly half of the total number of LCUs). In the latter case, the region boundary for switching of the prediction parameters between the two versions can be adaptively controlled by merely adding a 1-bit flag to the encoding parameter. In the known specification of HEVC, size information directly indicating the size of a slice is not encoded. Accordingly, normally, the decoder does not recognize the size of the slice during the decoding of the slice (before the decoding of the slice is completed). Accordingly, additionally encoding the boundary information specifying the region boundary is beneficial even when the region boundary is fixed (for example, a boundary equally dividing a slice into two parts).

Figure 16:
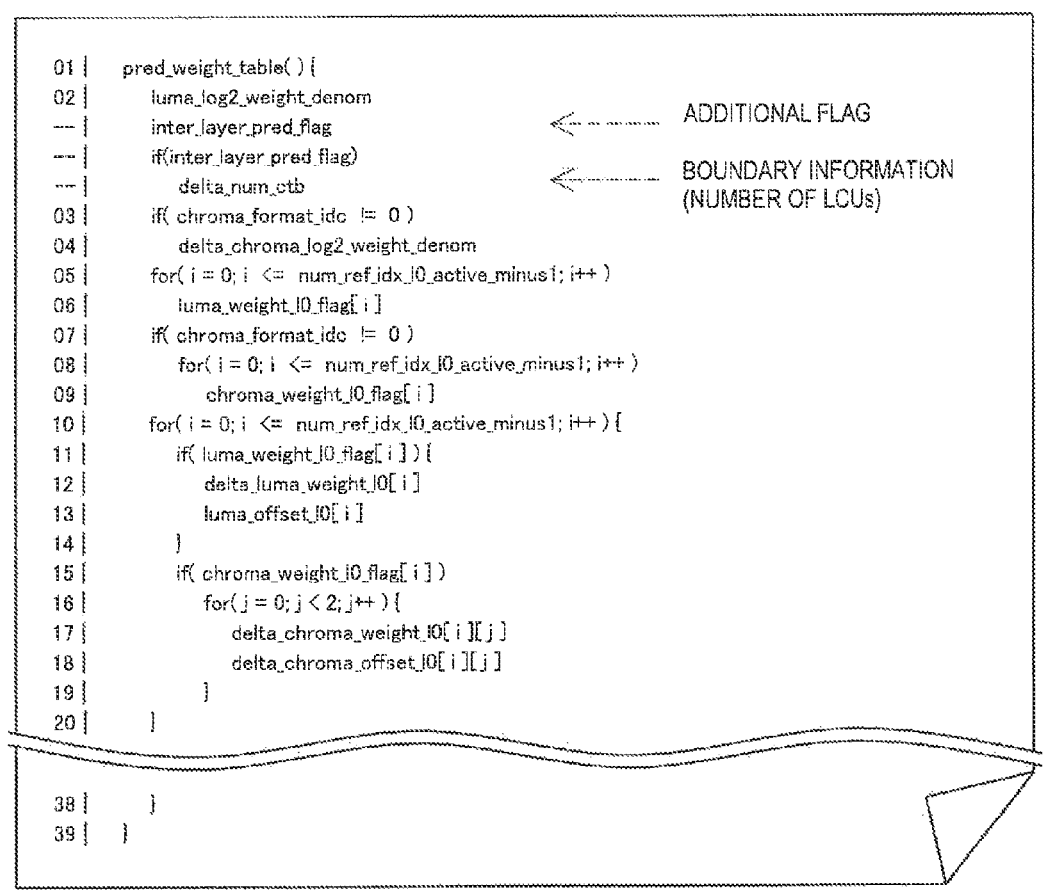
FIG. 16 is an explanatory view illustrating an example of a syntax according to a method described with reference to FIG. 15.

FIG. 16 is an explanatory view illustrating an example of a syntax according to the method described with reference to FIG. 15. Line numbers in the syntax shown in FIG. 16 correspond to the line numbers of the syntax of the weighted-prediction associated parameters shown in FIG. 11. In the syntax of the weighted-prediction associated parameters, the portion for the parameters of the L1 reference frame are not shown in the drawing for the sake of brevity of description. Referring to FIG. 16, an additional flag "inter_layer_pred_flag" similar to the one shown in FIG. 14 is defined after the 2nd line. This flag "inter_layer_pred_flag" is set to be true when the syntax is used for the color gamut prediction parameter. A parameter "delta_num_ctb" after the flag is the above-described boundary information. The parameter "delta_num_ctb" is information designating an initial LCU continuing after the region boundary in a raster scan order by the number of LCUs. When the number of LCUs is counted from the median point of a picture, a slice, or a tile, the parameter "delta_num_ctb" can indicate a positive or negative integer. The additional parameters shown in FIG. 16 may also be included not in the slice header but in an extension of the slice header.

When the prediction parameters of the different version can be used for each image region, an optimum prediction model for each image region can be applied to the color gamut prediction. For example, an optimum combination of the gain and the offset is different between a blue sky region and other regions in a landscape image. In this case, by using the gain and the offset optimized for each region to predict the color gamut prediction, a prediction error of the color gamut prediction can be reduced, and thus the encoding efficiency can be improved. Additional encoding of the boundary information specifying the region boundary means that the spot of the region boundary can be adaptively controlled. In this case, by moving the region boundary according to the content of an image, the prediction error of the color gamut prediction can be further reduced.

(5-3) Control for Each Color Component

In a modification example, a method of supplying two versions of the prediction parameters, as described in this section, may be applied to only the luminance component and may not be applied to the color difference component. In this case, to predict the color gamut of the color difference component, the prediction parameters (typically, the gain and the offset) which can be encoded to a portion for the L0 reference frame in the syntax of the weighted-prediction associated parameters and can be decoded from the portion are used irrespective of the band to which the pixel value belongs or the image region to which the pixel belongs. The parameter for the color difference component included in a portion for the L1 reference frame may be set to any value (for example, zero) which can be mapped to the shortest code term by variable-length coding (this value can be neglected in the color gamut prediction of the color difference component). In general, contribution of the color difference component to subjective image quality is less than contribution of the luminance component. Therefore, by selectively suppressing precision of the color gamut prediction of the color difference component in this way, it is possible to reduce the encoding amount of the prediction parameters with only slight image quality sacrifice.

When a chroma format indicates that the resolution of the color difference component is equal to the resolution of the luminance component, two versions of the prediction parameter may be supplied to both of the luminance component and the color difference component. When the chroma format indicates that the resolution of the color difference component is lower than the resolution of the luminance component, only one version of the prediction parameter may be supplied to the color difference component. For example, when the chroma format is 4:2:0, the resolution of the color difference component is lower than that of the luminance component in both of the vertical and horizontal directions. When the chroma format is 4:2:2, the resolution of the color difference component is lower than that of the luminance component in the horizontal direction.

In these cases, the influence of the deterioration in the prediction precision of the color gamut prediction on the encoding efficiency is smaller than that of the luminance component. Accordingly, by performing the color gamut prediction only on the color difference component more roughly in these cases, it is possible to efficiently reduce the encoding amount of the prediction parameters.

(6) Control of Timing at which Bit Shift is Performed

As described above, an image size, a color gamut, and a bit depth are different between a high definition (HD) television and an ultra high definition (UHD) television. When processes of converting the three attributes are separately performed, processing cost necessary for the entire inter layer process considerably increases. Accordingly, JCTVC-O0194 ("SCE4: Test 5.1 results on bit-depth and color-gamut scalability" by Alireza Aminlou, el. A1 on Oct. 23 to Nov. 1, 2013) proposes suppressing processing cost by inserting bit shift calculation into filter calculation of up-sampling.

Figure 17A:
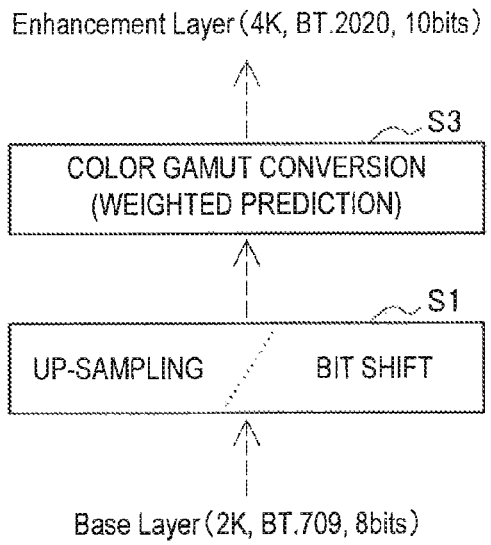
FIG. 17A is a first explanatory view illustrating a method of suppressing processing cost of inter layer prediction, which is proposed in JCTVC-O0194.
Figure 17B:
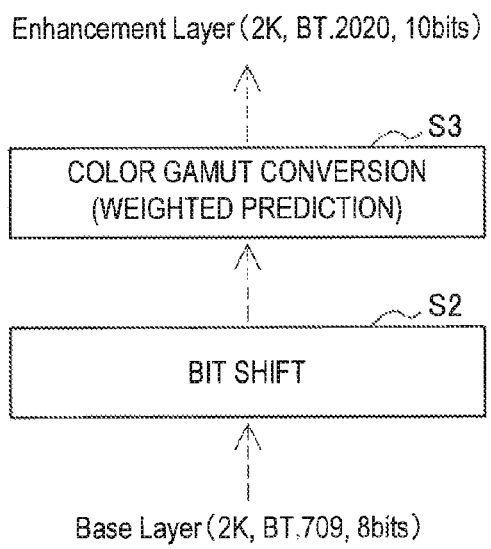
FIG. 17B is a second explanatory view illustrating a method of suppressing processing cost of inter layer prediction, which is proposed in JCTVC-O0194.
Figure 17C:
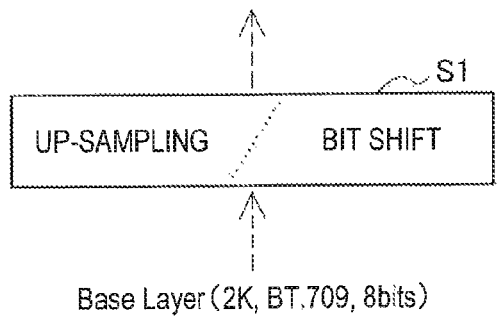
FIG. 17C is a third explanatory view illustrating a method of suppressing processing cost of inter layer prediction, which is proposed in JCTVC-O0194.

FIGS. 17A to 17C are first explanatory views illustrating a method of suppressing processing cost of the inter layer prediction, which is proposed in JCTVC-O0194. In an example of FIG. 17A, an image size of the base layer is 2K (for example, 1920×1080 pixels), a color gamut is BT.709, and a bit depth is 8 bits. An image size of the enhancement layer is 4K (for example, 3840×2160 pixels), a color gamut is BT.2020, and a bit depth is 10 bits. In the inter layer prediction, the up-sampling section 41 performs bit shift along with up-sampling (step S1). For example, in the filter calculation, addition of two terms can correspond to 1-bit left shift and addition of four terms can correspond to 2-bit left shift. Accordingly, the bit shift can be performed substantially simultaneously with the up-sampling. Thereafter, the color gamut conversion section 44 converts the color gamut of the image after the up-sampling input from the up-sampling section 41 (step S3). Here, the color gamut conversion may be linear conversion similar to the weighted prediction.

In an example of FIG. 17B, an image size of the base layer is 2K, a color gamut is BT.709, and a bit depth is 8 bits. An image size of the enhancement layer is 2K, a color gamut is BT.2020, and a bit depth is 10 bits. In the inter layer prediction, the up-sampling section 41 performs only the bit shift since the resolutions are the same between the layers (step S2). Thereafter, the color gamut conversion section 44 converts the color gamut of the image after the up-sampling input from the up-sampling section 41 (step S3).

In an example of FIG. 17C, an image size of the base layer is 2K, a color gamut is BT.709, and a bit depth is 8 bits. An image size of the enhancement layer is 4K, a color gamut is BT.709, and a bit depth is 10 bits. In the inter layer prediction, the up-sampling section 41 performs the up-sampling and the bit shift (step S1). Thereafter, the color gamut conversion section 44 does not convert the color gamut since the color gamuts are the same between the layers.

In the cases of FIGS. 17A to 17C, since the up-sampling and the bit shift are simultaneously performed, the processing cost necessary for the inter layer prediction is suppressed compared to cases in which the up-sampling and the bit shift are separately performed. On the other hand, in the case of FIG. 17B, although the color gamut conversion includes calculation similar to the bit shift, the bit shift is performed independently from the color gamut conversion. Therefore, there is a room for improvement from the viewpoint of the processing cost.

Accordingly, in an embodiment, the color gamut conversion section 44 is also assumed to be able to perform the bit shift in the calculation of the color gamut conversion. In particular, when the syntax for the weighted prediction is assumed to be reused, the calculation of the color gamut conversion can be expressed as follows.

[Math. 3]

$$X_{k,Pred} = \frac{w_k}{2^{n_k}} X_k + o_k \quad (7)$$

In equation (7), $X_k$ is a pixel value of a k-th color component after the conversion and $X_{k,pred}$ is a pixel value of the k-th color component. Further, $w_k$, $n_k$, and $o_k$ are a numerator of a weight (gain), a binary logarithm of a denominator of the weight, and an offset applied to the k-th color component. Here, when a difference in the bit depth between the layers is m bits, the calculation when the color gamut conversion section 44 performs m-bit bit shift (left shift) simultaneously with the color gamut conversion can be expressed as follows.

[Math 4]

$$X_{k,Pred} = \frac{w_k}{2^{(n_k-m)}} X_k + (o_k << m) \quad (8)$$

When the bit shift can be performed simultaneously with the up-sampling or the bit shift can be performed simultaneously with the color gamut conversion, there is a probability of timings at which the bit shift is performed being different between the encoder and the decoder (or between decoders having different implementations). For example, when the decoder performs the bit shift simultaneously with the up-sampling irrespective of the fact that the encoder performs the bit shift simultaneously with the color gamut conversion, the prediction of the inter layer prediction deteriorates. Accordingly, in the embodiment, the lossless encoding section 16 further encodes a bit shift control flag controlling a timing at which the bit shift is performed. The bit shift control flag is a control parameter indicating whether the bit shift at the time of the inter layer prediction is performed simultaneously with the color gamut conversion or performed simultaneously with the up-sampling, for example, when the bit depth of the enhancement layer is greater than the bit depth of the base layer.

Figure 18A:
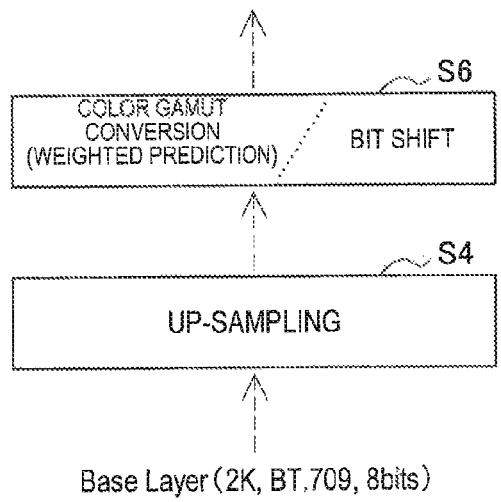
FIG. 18A is a first explanatory view illustrating a new method of suppressing the processing cost of the inter layer prediction.
Figure 18B:
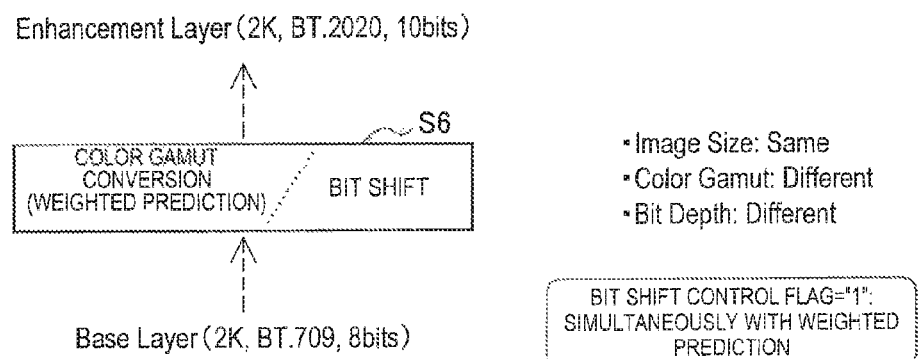
FIG. 18B is a second explanatory view illustrating a new method of suppressing the processing cost of the inter layer prediction.
Figure 18C:
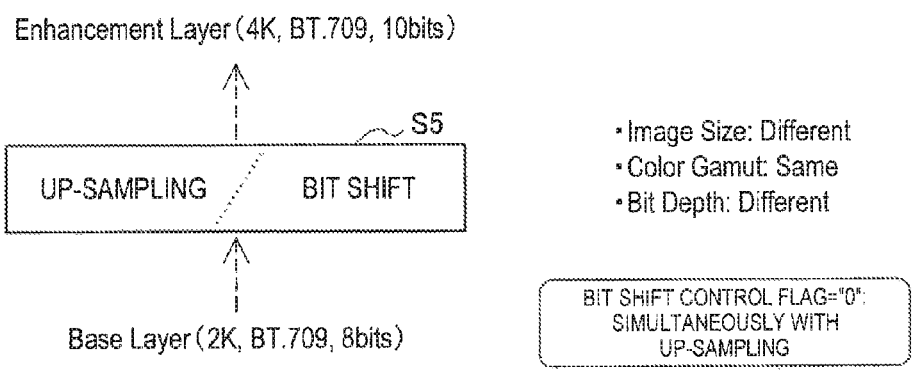
FIG. 18C is a third explanatory view illustrating a new method of suppressing the processing cost of the inter layer prediction.

FIGS. 18A to 18C are first explanatory views illustrating a new method of suppressing the processing cost of the inter layer prediction. The attributes of the base layer and the enhancement layer in an example of FIG. 18A are the same as those of FIG. 17A. However, the bit shift control flag indicates "1" (the bit shift is performed simultaneously with the weighted prediction). In this case, in the inter layer prediction, the up-sampling section 41 performs the up-sampling without performing the bit shift to improve the bit depth (step S4). Thereafter, as in the above equation (8), the color gamut conversion section 44 converts the color gamut of the image after the up-sampling input from the up-sampling section 41 and simultaneously performs the bit shift (step S6).

The attributes of the base layer and the enhancement layer in an example of FIG. 18B are the same as those of FIG. 17B. However, the bit shift control flag indicates "1" (the bit shift is performed simultaneously with the weighted prediction). In this case, in the inter layer prediction, the up-sampling section 41 performs none of the bit shift and the up-sampling. Thereafter, as in the above equation (8), the color gamut conversion section 44 converts the color gamut of the image of the base layer and simultaneously performs the bit shift (step S6).

The attributes of the base layer and the enhancement layer in an example of FIG. 18C are the same as those of FIG. 17C. However, the bit shift control flag indicates "0" (the bit shift is performed simultaneously with the up-sampling). In this case, in the inter layer prediction, the up-sampling section 41 performs the up-sampling and the bit shift (step S5). Since the color gamuts between the layers are the same, the color gamut conversion section 44 does not perform the color gamut conversion.

When FIGS. 17A to 17C are compared to FIGS. 18A to 18C, a process step is understood to be reduced by the new method particularly in regard to the second example (FIGS. 17B and 18B) in which the image size is not changed between the layers. In the new method, there is the bit shift control flag and the timing at which the bit shift is performed is adaptively switched, so that the number of process steps of the inter layer prediction can be minimized.

FIG. 19 is an explanatory view illustrating an example of a syntax according to the method described with reference to FIGS. 18A to 18C. Line numbers in the syntax shown in FIG. 19 correspond to the line numbers of the syntax of the weighted-prediction associated parameters shown in FIG. 11. In the syntax of the weighted-prediction associated parameters, the portion for the parameters of the L1 reference frame are not shown in the drawing for the sake of brevity of description. Referring to FIG. 19, two encoding parameters "weighted_prediction_and_bit_shift_luma_flag" and "weighted_prediction_and_bit_shift_chroma_flag" encoded when a layer ID is not zero (that is, the layer is the enhancement layer) are defined after the 1st line. Of the encoding parameters, the former is a bit shift control flag for controlling a timing at which the bit shift of the luminance component is performed. The latter is a bit shift control flag for controlling a timing at which the bit shift of the color difference component is performed. These flags are set to be true when the bit shift and the color gamut conversion are simultaneously performed, and are set to be false when the bit shift and the up-sampling are simultaneously performed. Since the image size and the bit depth can be defined to be different for each color component, the timing at which the bit shift is performed can be flexibly controlled in accordance with the definition of the attributes by encoding the bit shift control flags separately for the luminance component and the color difference component. Here, the present disclosure is not limited to the example herein, but a single bit shift control flag may be encoded for both of the luminance component and the color difference component. When the bit depth is the same between the layers, the encoding of the bit shift control flag may be omitted or the flag may be set to a specific value (for example, zero). Even when the syntax of FIG. 19 is used for the weighted prediction not in the inter layer prediction but in the inter prediction in the layer, the encoding of the bit shift control flag may be omitted or the flag may be set to be a specific value (for example, zero).

3. PROCESS FLOW FOR ENCODING ACCORDING TO AN EMBODIMENT

[3-1. Schematic Flow]

Figure 20:
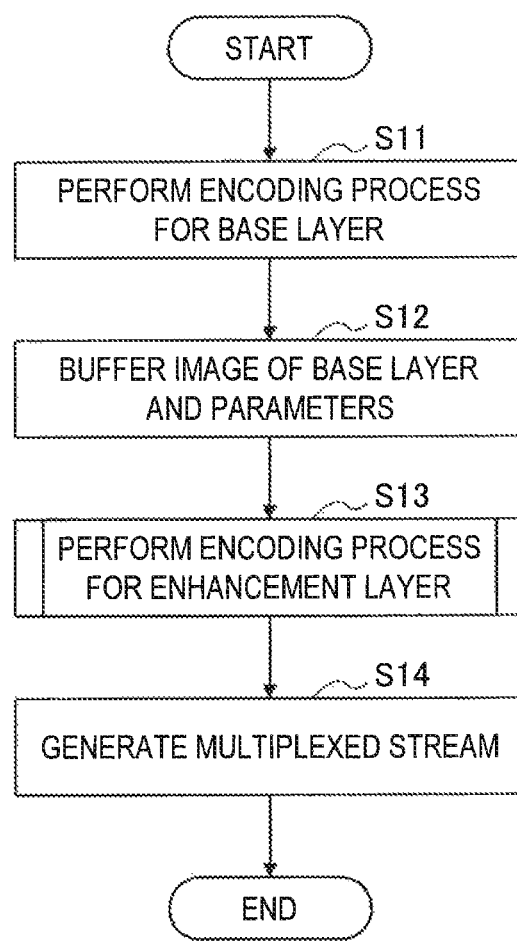
FIG. 20 is a flow chart showing an example of a schematic process flow for encoding according to an embodiment.

FIG. 20 is a flow chart showing an example of a schematic process flow for encoding according to an embodiment. For the sake of brevity of description, process steps that are not directly related to technology according to the present disclosure are omitted from FIG. 20.

Referring to FIG. 20, the BL encoding section 1a first performs an encoding process for the base layer to generate an encoded stream of the base layer (step S11).

The common memory 2 buffers an image (one or both of a decoded image and a predicted error image) of the base layer generated in the encoding process for the base layer and the parameters reused between the layers (step S12). The parameters reused between the layers may include the weighted-prediction associated parameters.

Next, the EL encoding section 1b performs an encoding process for the enhancement layer to generate an encoded stream of the enhancement layer (step S13). In the encoding process for the enhancement layer performed herein, the image of the base layer buffered by the common memory 2 is up-sampled by the color gamut prediction section 40 so that the color gamut is converted. Then, the image of the base layer after the color gamut conversion can be used as a reference image in the inter layer prediction.

Then, the multiplexing section 3 multiplexes an encoded stream of the base layer generated by the BL encoding section 1a and an encoded stream of the enhancement layer generated by the EL encoding section 1b to generate a multilayer multiplexed stream (step S14).

[3-2. Color Gamut Prediction Process]

(1) First Example

Figure 21:
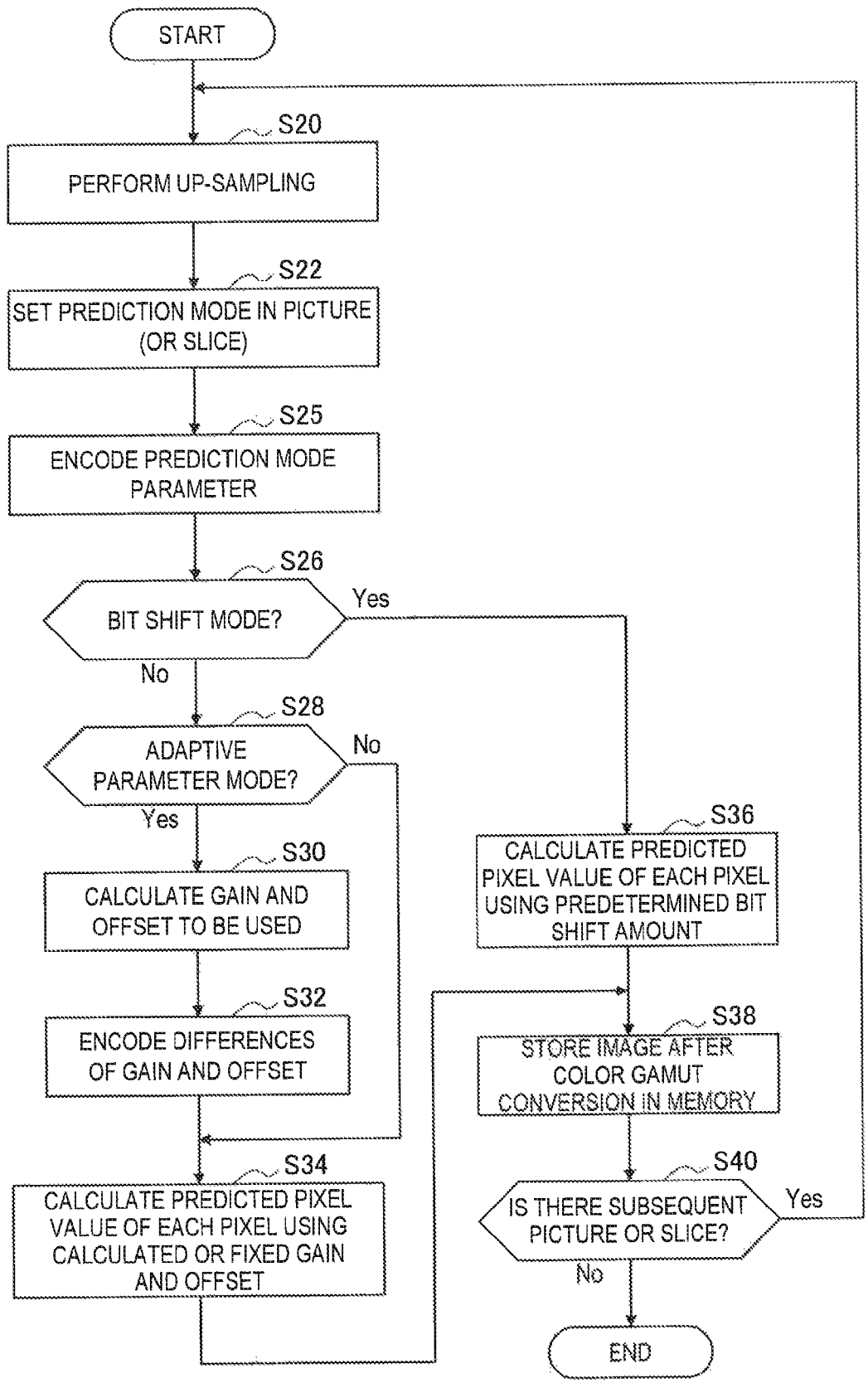
FIG. 21 is a flow chart showing a first example of the flow of a color gamut prediction process in an encoding process for an enhancement layer.

FIG. 21 is a flow chart showing a first example of the flow of a color gamut prediction process in the encoding process for the enhancement layer. The color gamut prediction process described herein is repeated for each picture or slice.

Referring to FIG. 21, the up-sampling section 41 first up-samples the image of the base layer acquired from the common memory 2 according to a resolution ratio between the base layer and the enhancement layer (step S20).

Next, the prediction mode setting section 42 sets one prediction mode among the candidates of the prediction mode for the color gamut prediction in a picture (or a slice) (step S22). The prediction mode setting section 42 may set the prediction mode defined in advance or may set the prediction mode dynamically selected based on evaluation of the encoding efficiency or the prediction precision of each candidate of the prediction mode.

Next, the lossless encoding section 16 encodes the prediction mode parameter indicating the prediction mode set by the prediction mode setting section 42 (step S25). The prediction mode parameter encoded by the lossless encoding section 16 is inserted into, for example, the PPS or the slice header.

The subsequent process is branched depending on the prediction mode set by the prediction mode setting section 42 (steps S26 and S28). For example, when the set prediction mode is the adaptive parameter mode, the parameter calculation section 43 calculates the values of an optimum gain and an optimum offset to be used for the prediction (conversion) of the color gamut (step S30). The parameter calculation section 43 calculates the differences between the calculated optimum gain and offset and the previous values thereof. Then, the lossless encoding section 16 encodes the differences of the gain and the offset calculated by the parameter calculation section 43 (step S32). The differences of the prediction parameters encoded by the lossless encoding section 16 are inserted into, for example, the PPS or the slice header.

When the set prediction mode is the adaptive parameter mode or the fixed parameter mode, the color gamut conversion section 44 calculates the predicted pixel value of each pixel by multiplying the pixel value of the base layer after the up-sampling by the adaptively calculated or fixed gain and further adding the offset according to equations (4) to (6) (step S34).

When the set prediction mode is the bit shift mode, the color gamut conversion section 44 calculates the predicted pixel value of each pixel by shifting the pixel value of the base layer after the up-sampling to the left by a predetermined bit shift amount according to equations (1) to (3) (step S36).

When all of the predicted pixel values in the picture or the slice to be processed are calculated, the color gamut conversion section 44 stores the image of the base layer after the color gamut conversion, i.e., the predicted image which is the result of the color gamut prediction, in the frame memory 25 (step S38).

Thereafter, when there is a subsequent unprocessed picture or slice, the process returns to step S20 and the above-described processes are repeated on the subsequent picture or slice (step S40).

(2) Second Example

Figure 22:
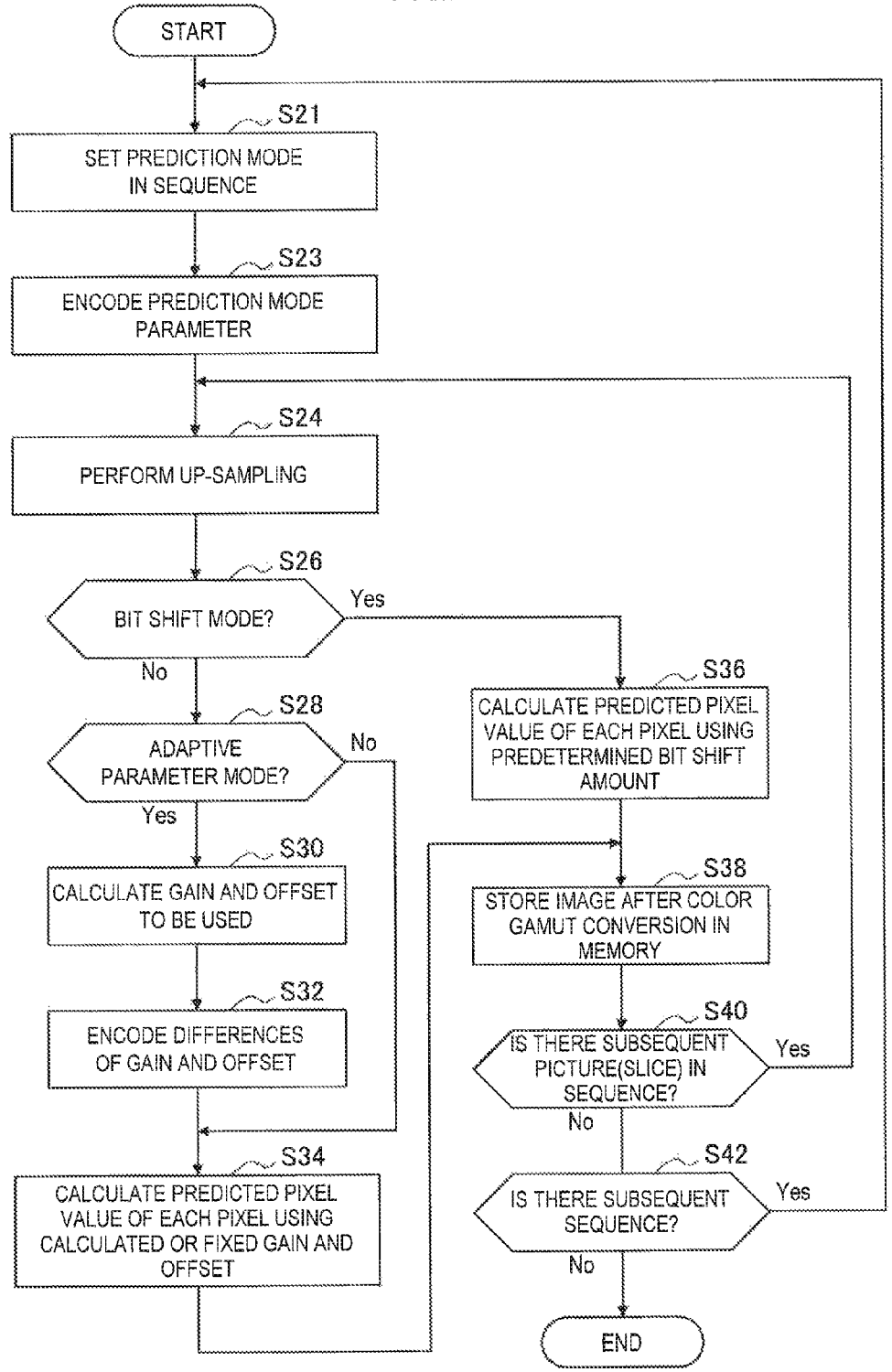
FIG. 22 is a flow chart showing a second example of the flow of a color gamut prediction process in an encoding process for an enhancement layer.

FIG. 22 is a flow chart showing a second example of the flow of a color gamut prediction process in the encoding process for the enhancement layer.

Referring to FIG. 22, the prediction mode setting section 42 first sets one prediction mode among the candidates of the prediction mode for the color gamut prediction in the sequence (step S21). Next, the lossless encoding section 16 encodes the prediction mode parameter indicating the prediction mode set by the prediction mode setting section 42 (step S23). The prediction mode parameter encoded by the lossless encoding section 16 is inserted into the SPS The processes of steps S24 to S40 are repeated for each picture or slice in the sequence.

The up-sampling section 41 first up-samples the image of the base layer acquired from the common memory 2 according to a resolution ratio between the base layer and the enhancement layer (step S24).

Further, the process is to be branched depending on the prediction mode set by the prediction mode setting section 42 (steps S26 and S28). For example, when the set prediction mode is the adaptive parameter mode, the parameter calculation section 43 calculates the values of an optimum gain and an optimum offset to be used for the prediction (conversion) of the color gamut (step S30). The parameter calculation section 43 calculates the differences between the calculated optimum gain and offset and the previous values thereof. Then, the lossless encoding section 16 encodes the differences of the gain and the offset calculated by the parameter calculation section 43 (step S32). The differences of the prediction parameters encoded by the lossless encoding section 16 are inserted into, for example, the PPS or the slice header.

When the set prediction mode is the adaptive parameter mode or the fixed parameter mode, the color gamut conversion section 44 calculates the predicted pixel value of each pixel by multiplying the pixel value of the base layer after the up-sampling by the adaptively calculated or fixed gain and further adding the offset according to equations (4) to (6) (step S34).

When the set prediction mode is the bit shift mode, the color gamut conversion section 44 calculates the predicted pixel value of each pixel by shifting the pixel value of the base layer after the up-sampling to the left by a predetermined bit shift amount according to equations (1) to (3) (step S36).

When all of the predicted pixel values in the picture or slice to be processed are calculated, the color gamut conversion section 44 stores the image of the base layer after the color gamut conversion, i.e., the predicted image which is the result of the color gamut prediction, in the frame memory 25 (step S38).

Thereafter, when there is a subsequent unprocessed picture or slice in the sequence, the process returns to step S24 and the up-sampling and the color gamut conversion are repeated on the subsequent picture or slice (step S40). When the color gamut conversion on all of the pictures or all of the slices in the sequence ends, it is further determined whether there is a subsequent sequence (step S42). When there is the subsequent sequence, the process returns to step S21 and the above-described processes are repeated on the subsequent sequence.

(3) Third Example

Figure 23:
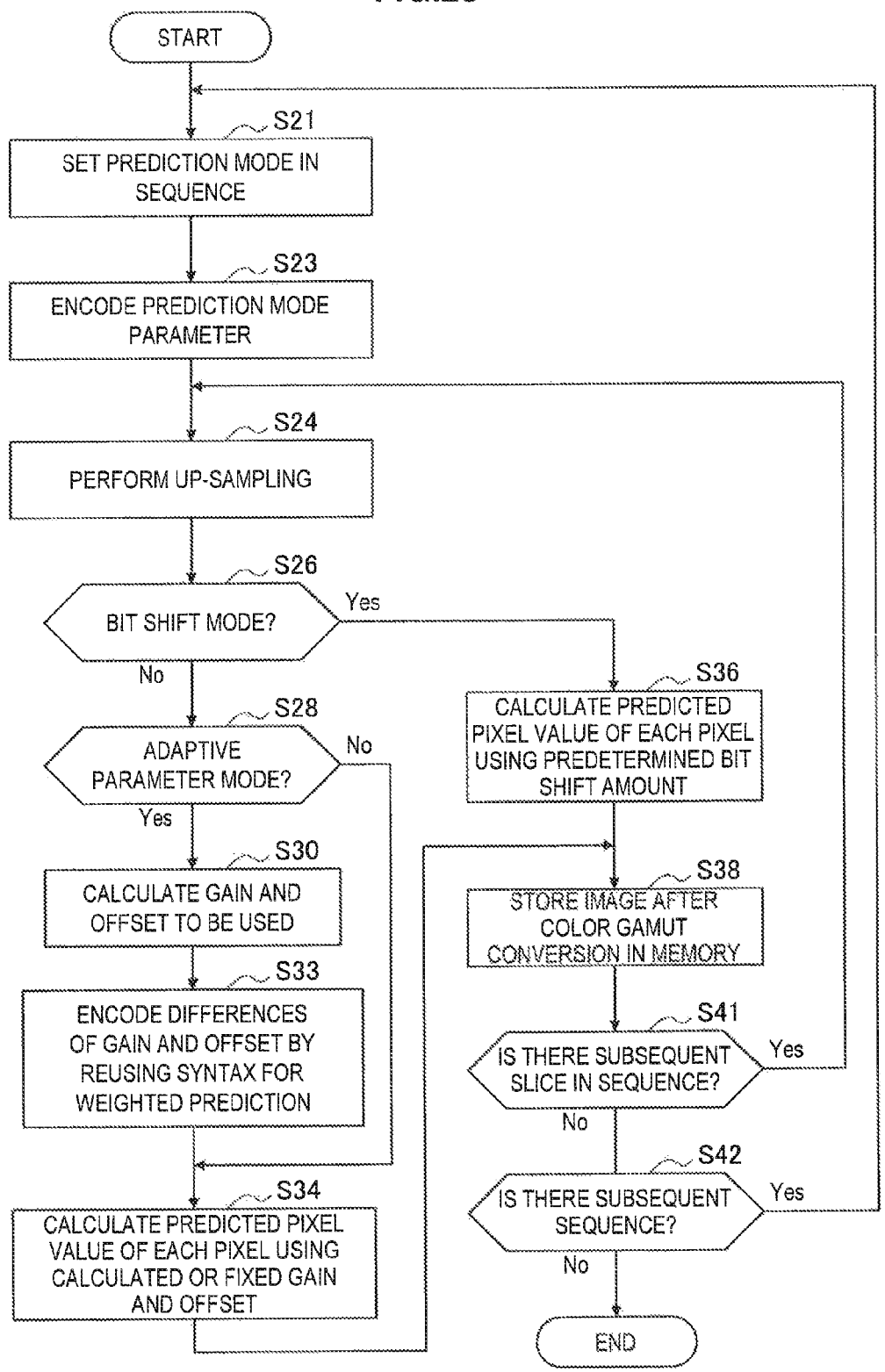
FIG. 23 is a flow chart showing a third example of the flow of a color gamut prediction process in an encoding process for an enhancement layer.

FIG. 23 is a flow chart showing a third example of the flow of a color gamut prediction process in the encoding process for the enhancement layer.

Referring to FIG. 23, the prediction mode setting section 42 first sets one prediction mode among the candidates of the prediction mode for the color gamut prediction in the sequence (step S21). Next, the lossless encoding section 16 encodes the prediction mode parameter indicating the prediction mode set by the prediction mode setting section 42 (step S23). The prediction mode parameter encoded by the lossless encoding section 16 is inserted into the SPS The processes of steps S24 to S41 are repeated for each slice in the sequence.

The up-sampling section 41 up-samples the image of the base layer acquired from the common memory 2 according to the resolution ratio between the base layer and the enhancement layer (step S24). Here, the filter calculation of the up-sampling may include or may not include the bit shift for the inter layer prediction.

Further, the process is branched depending on the prediction mode set by the prediction mode setting section 42 (steps S26 and S28). For example, when the set prediction mode is the adaptive parameter mode, the parameter calculation section 43 calculates an optimum gain and an optimum offset to be used for the prediction (conversion) of the color gamut (step S30). The parameter calculation section 43 calculates the differences between the calculated optimum gain and offset and the previous values thereof. Then, the lossless encoding section 16 encodes the calculated differences of the gain and the offset by reusing the syntax of the weighted-prediction associated parameters (step S33). The differences of the prediction parameters encoded by the lossless encoding section 16 are inserted into the slice header. When the above-described bit shift control flag is adopted in the syntax, the encoded bit shift control flag can also be inserted into the slice header herein.

When the set prediction mode is the adaptive parameter mode or the fixed parameter mode, the color gamut conversion section 44 calculates the predicted pixel value of each pixel by multiplying the pixel value of the base layer after the up-sampling by the adaptively calculated or fixed gain and further adding the offset according to equations (4) to (6) (step S34). When the bit shift is not performed in step S24, the calculation of the predicted pixel value herein may include the bit shift.

When the set prediction mode is the bit shift mode, the color gamut conversion section 44 calculates the predicted pixel value of each pixel by shifting the pixel value of the base layer after the up-sampling to the left by a predetermined bit shift amount according to equations (1) to (3) (step S36).

When all of the predicted pixel values in the picture or slice to be processed are calculated, the color gamut conversion section 44 stores the image of the base layer after the color gamut conversion, i.e., the predicted image which is the result of the color gamut prediction, in the frame memory 25 (step S38).

Thereafter, when there is a subsequent unprocessed slice in the sequence, the process returns to step S24 and the up-sampling and the color gamut conversion are repeated on the subsequent slice (step S41). When the color gamut conversion on all of the slices in the sequence ends, it is further determined whether there is a subsequent sequence (step S42). When there is the subsequent sequence, the process returns to step S21 and the above-described processes are repeated on the subsequent sequence.

(4) Fourth Example

Figure 24:
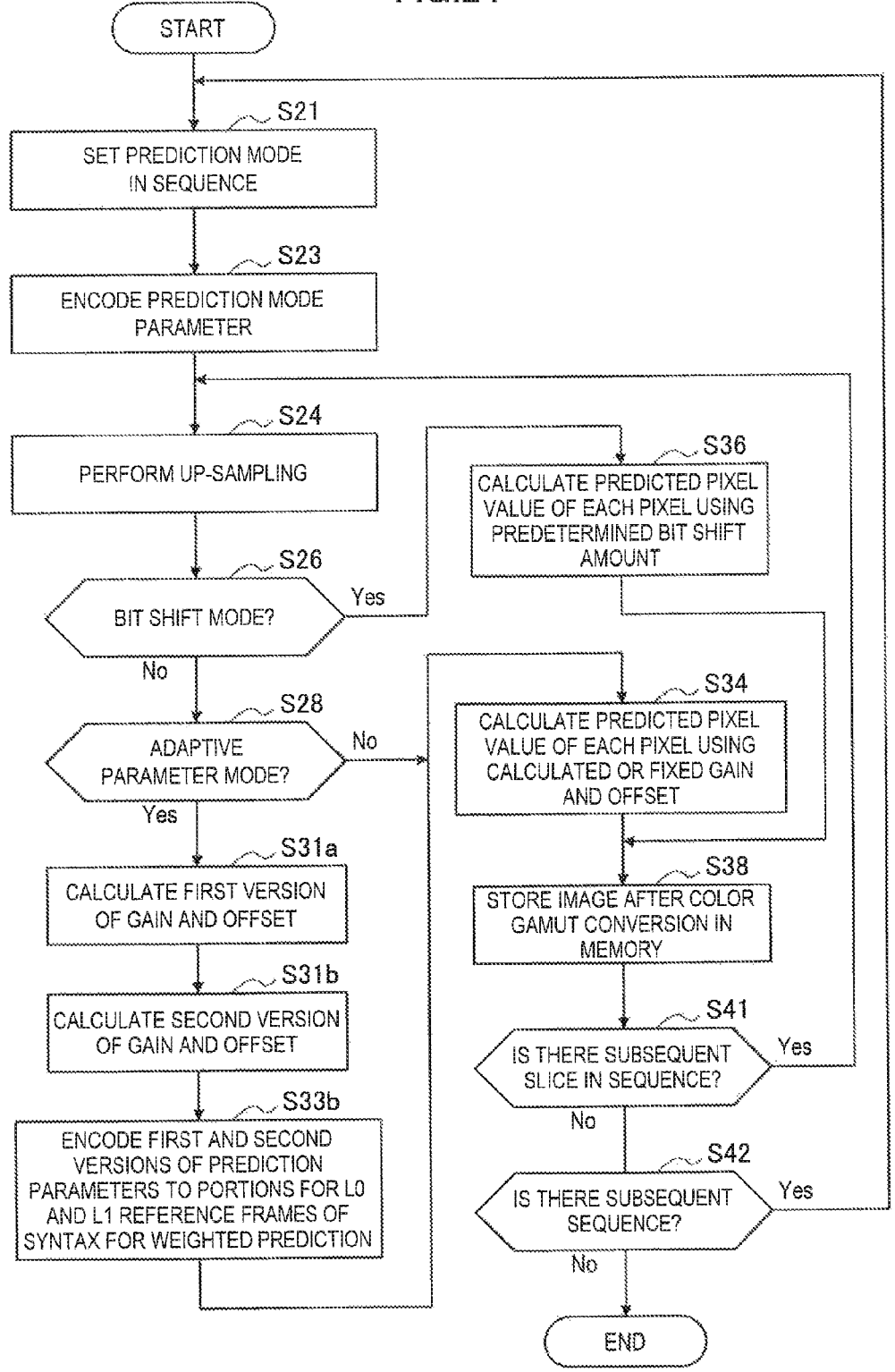
FIG. 24 is a flow chart showing a fourth example of the flow of a color gamut prediction process in an encoding process for an enhancement layer.

FIG. 24 is a flow chart showing a fourth example of the flow of a color gamut prediction process in the encoding process for the enhancement layer.

Referring to FIG. 24, the prediction mode setting section 42 first sets one prediction mode among the candidates of the prediction mode for the color gamut prediction in the sequence (step S21). Next, the lossless encoding section 16 encodes the prediction mode parameter indicating the prediction mode set by the prediction mode setting section 42 (step S23). The prediction mode parameter encoded by the lossless encoding section 16 is inserted into the SPS The processes of steps S24 to S41 are repeated for each slice in the sequence.

The up-sampling section 41 up-samples the image of the base layer acquired from the common memory 2 according to the resolution ratio between the base layer and the enhancement layer (step S24). Here, the filter calculation of the up-sampling may include or may not include the bit shift for the inter layer prediction.

Further, the process is branched depending on the prediction mode set by the prediction mode setting section 42 (steps S26 and S28). For example, when the set prediction mode is the adaptive parameter mode, the parameter calculation section 43 calculates the first version of an optimum gain and an optimum offset to be used for the prediction (conversion) of the color gamut (step S31$a$). Likewise, the parameter calculation section 43 calculates the second version of the gain and the offset (step S31$b$). The first and second versions may each include an optimum value set to be used for the first and second bands in the range of the pixel values. Instead, the first and second versions may each include an optimum value set to be used for the first and second image regions. The parameter calculation section 43 calculates the differences between the gain and the offset and the previous values thereof for each of the first and second versions. Then, the lossless encoding section 16 encodes the differences of the prediction parameters calculated for each of the first and second versions to the portion for the L0 reference frame and the portion of the L1 reference frame of the syntax of the weighted-prediction associated parameters (step S33b). The differences of the prediction parameters encoded by the lossless encoding section 16 are inserted into the slice header. When the above-described bit shift control flag is adopted in the syntax, the encoded bit shift control flag can also be inserted into the slice header herein.

The flow of the subsequent processes may be the same as that of the third example described with reference to FIG. 23 excluding the fact that the version of the prediction parameters can be switched according to the band to which the pixel value belongs or the image region to which the pixel belongs in step S34. In step S33b, the lossless encoding section 16 may additionally encode the boundary information specifying the boundary value between the bands for the switching the version of the prediction parameters or the region boundary between the image regions to, for example, the slice header or the extension of the slice header.

(5) Modification Example of Processing Order

According to the known method, in the inter layer prediction, the color gamut conversion is performed after the up-sampling (and the bit shift as necessary) is performed. The flow charts of FIGS. 21 to 24 also follow the processing orders. However, since the processing cost of the color gamut conversion is proportional to the number of pixels to be converted, the fact that the color gamut conversion is performed on the pixels increased by the up-sampling may not be said to be optimum from the viewpoint of the processing cost. Further, the fact that the color gamut conversion is performed on the pixels having the bit depth extended after the bit shift means that processing resources (for example, the number of bits necessary in a register) necessary to calculate the color gamut conversion also increase. Accordingly, in a modification example, when the space resolution (image size) of the enhancement layer is higher than the space resolution of the base layer, the color gamut prediction section 40 may predict the image of the enhancement layer by converting the color gamut of the image of the base layer and then up-sampling the converted image.

Figure 25A:
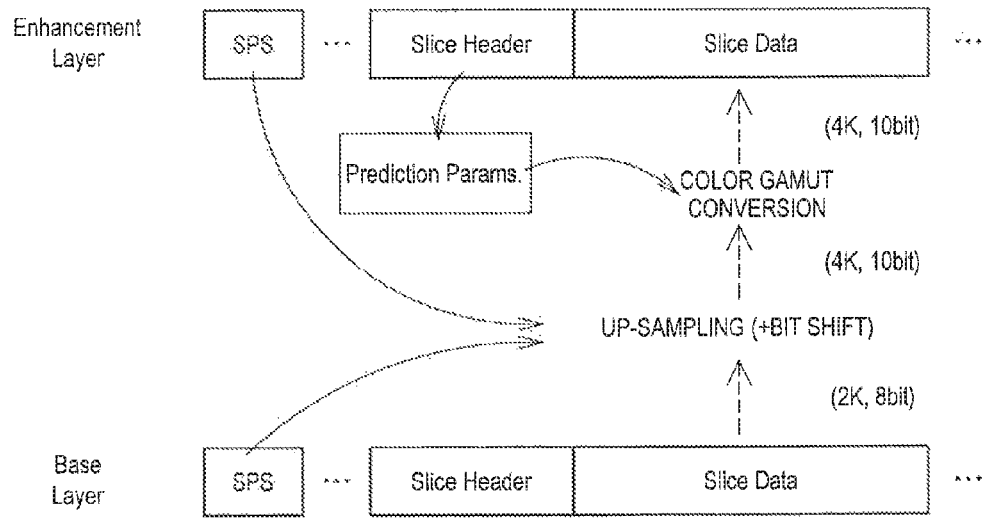
FIG. 25A is an explanatory view illustrating an example of a processing order of known inter layer prediction.

FIG. 25A is an explanatory view illustrating an example of a processing order of known inter layer prediction. In FIG. 25A, for example, two process steps which are the same as those of FIG. 17A are shown. First, the image size and the bit depth (for example, 2K/8 bits) of an image included in slice data of the base layer can be increased by the up-sampling and the bit shift (for example, to 4K/10 bits). Next, the color gamut of the image after the up-sampling is converted into the color gamut of the enhancement layer according to the prediction parameters.

Figure 25B:
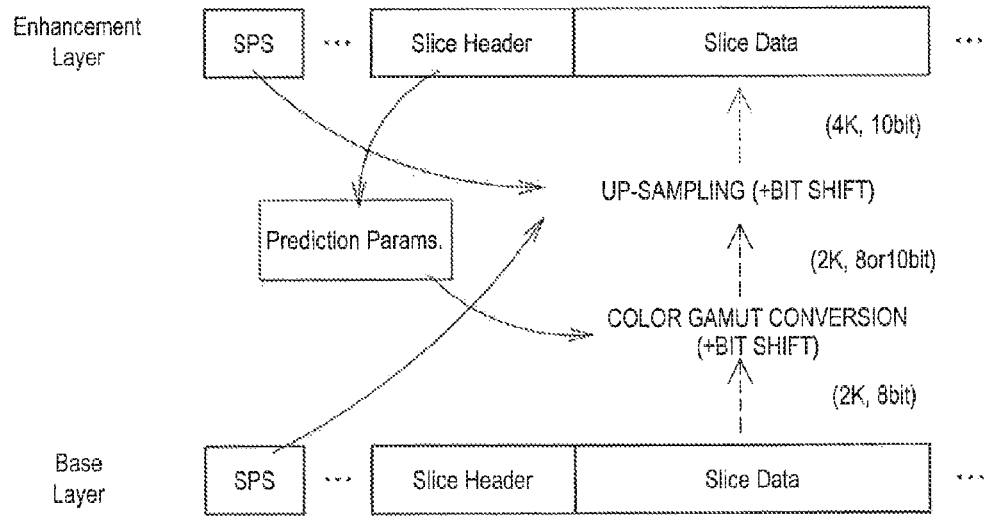
FIG. 25B is an explanatory view illustrating an example of a processing order of new inter layer prediction.

FIG. 25B is an explanatory view illustrating an example of a processing order of new inter layer prediction according to a modification example. In the modification example, the color gamut prediction section 40 first converts the color gamut of the image included in the slice data of the base layer into the color gamut of the enhancement layer according to the prediction parameters. Next, the color gamut prediction section 40 increases the image size (for example, 2K) of the image after the color gamut conversion by the up-sampling (for example, to 4K). The bit shift may be performed simultaneously with the color gamut conversion or may be performed simultaneously with the up-sampling. A timing at which the bit shift is performed may be designated by the bit shift control flag. According to the new processing order, since the bit depth and the number of pixels to be converted through the color gamut conversion are reduced compared to the case of the known processing order, the processing cost of the inter layer prediction is further suppressed.

4. CONFIGURATION EXAMPLE OF EL DECODING SECTION IN AN EMBODIMENT

[4-1. Overall Configuration]

Figure 26:
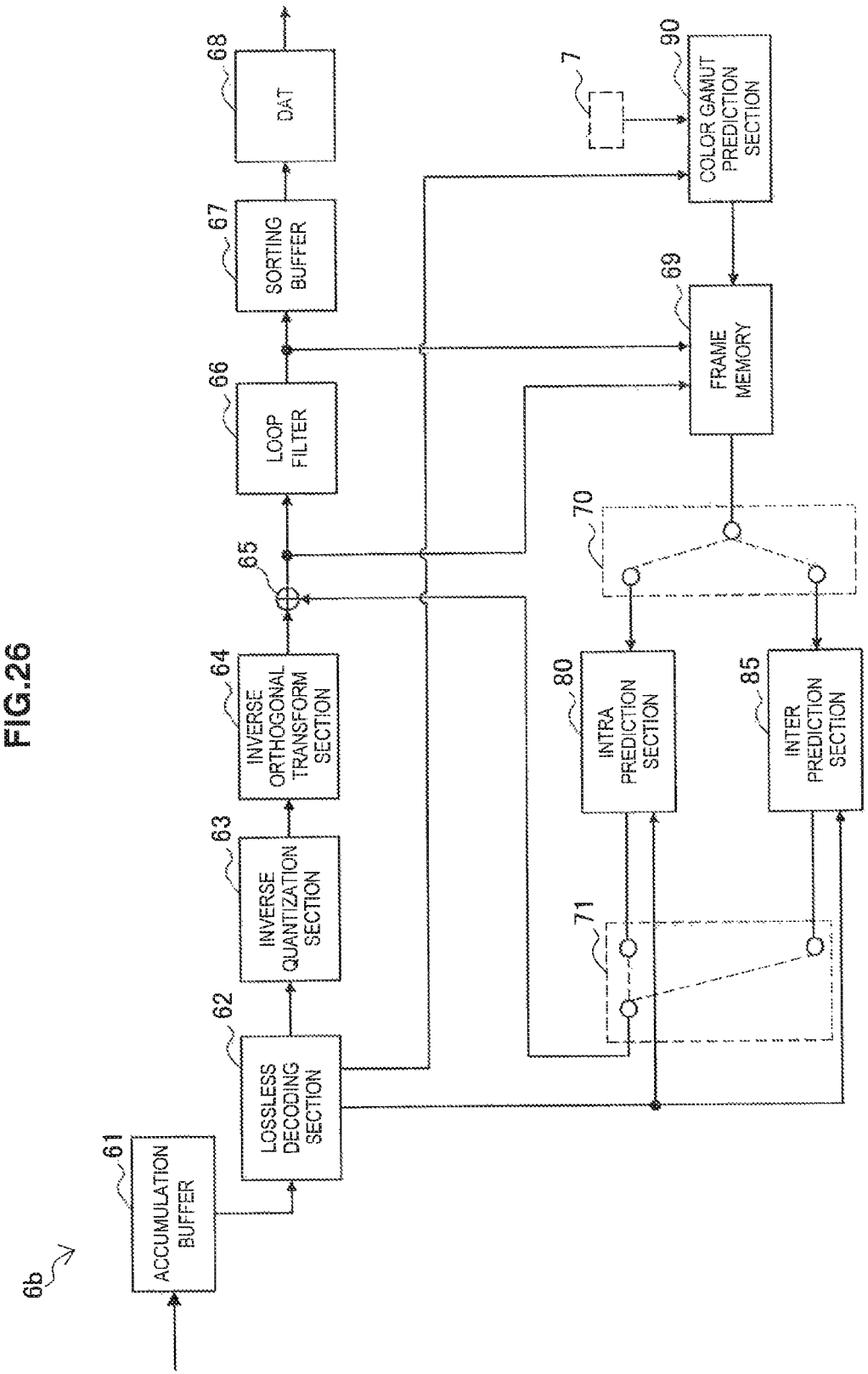
FIG. 26 is a block diagram showing an example of the configuration of an EL decoding section shown in FIG. 5.

FIG. 26 is a block diagram showing an example of the configuration of the EL decoding section 6b shown in FIG. 5. Referring to FIG. 26, the EL decoding section 6b includes an accumulation buffer 61, a lossless decoding section 62, an inverse quantization section 63, an inverse orthogonal transform section 64, an addition section 65, a loop filter 66, a sorting buffer 67, a digital-to-analog (D/A) conversion section 68, a frame memory 69, selectors 70 and 71, an intra prediction section 80, an inter prediction section 85, and a color gamut prediction section 90.

The accumulation buffer 61 temporarily accumulates the encoded stream of the enhancement layer input from the demultiplexing section 5 using a storage medium.

The lossless decoding section 62 decodes the quantized data of the enhancement layer from the encoded stream of the enhancement layer input from the accumulation buffer 61 according to the encoding scheme used at the time of the encoding. The lossless decoding section 62 decodes the information inserted into the header region of the encoded stream. The information decoded by the lossless decoding section 62 can include, for example, the information regarding the intra prediction and the information regarding the inter prediction. The parameters for the color gamut prediction can also be decoded in the enhancement layer. The lossless decoding section 62 outputs the quantized data to the inverse quantization section 63. The lossless decoding section 62 outputs the information regarding the intra prediction to the intra prediction section 80. The lossless decoding section 62 outputs the information regarding the inter prediction to the inter prediction section 85. The lossless decoding section 62 outputs the parameters for the color gamut prediction to the color gamut prediction section 90.

The inverse quantization section 63 inversely quantizes the quantized data input from the lossless decoding section 62 in the quantization step used at the time of the encoding to restore the transform coefficient data of the enhancement layer. The inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 according to the orthogonal transform scheme used at the time of the encoding to generate the predicted error data. The inverse orthogonal transform section 64 outputs the generated predicted error data to the addition section 65.

The addition section 65 adds the predicted error data input from the inverse orthogonal transform section 64 and the predicted image data input from the selector 71 to generate decoded image data. Then, the addition section 65 outputs the generated decoded image data to the loop filter 66 and the frame memory 69.

As in the loop filter 24 of the EL encoding section 1b, the loop filter 66 includes a deblock filter that reduces block distortion, a sample adaptive offset filter that adds an offset value to each pixel value, and an adaptive loop filter that minimizes an error with the original image. The loop filter 66 filters the decoded image data input from the addition section 65 and outputs the decoded image data after filtering to the sorting buffer 67 and the frame memory 69.

The sorting buffer 67 sorts the images input from the loop filter 66 to generate a chronological series of image data. Then, the sorting buffer 67 outputs the generated image data to the D/A conversion section 68.

The D/A conversion section 68 converts the image data with a digital format input from the sorting buffer 67 into an image signal with an analog format. Then, the D/A conversion section 68 displays the image of the enhancement layer by outputting the analog image signal to, for example, a display (not shown) connected to the image decoding device 60.

The frame memory 69 stores the decoded image data before the filtering input from the addition section 65, the decoded image data after the filtering input from the loop filter 66, and the reference image data of the base layer input from the color gamut prediction section 90 using a storage medium.

The selector 70 switches an output destination of the image data from the frame memory 69 between the intra prediction section 80 and the inter prediction section 85 for each block in the image according to the mode information acquired by the lossless decoding section 62. For example, when the intra prediction mode is designated, the selector 70 outputs the decoded image data before the filtering supplied from the frame memory 69 as the reference image data to the intra prediction section 80. When the inter prediction mode is designated, the selector 70 outputs the decoded image data after the filtering as the reference image data to the inter prediction section 85. When the inter layer prediction is performed in the intra prediction section 80 or the inter prediction section 85, the selector 70 supplies the reference image data of the base layer to the intra prediction section 80 or the inter prediction section 85.

The selector 71 switches an output source of the predicted image data to be supplied to the addition section 65 between the intra prediction section 80 and the inter prediction section 85 according to the mode information acquired by the lossless decoding section 62. For example, when the intra prediction mode is designated, the selector 71 supplies the predicted image data output from the intra prediction section 80 to the addition section 65. When the inter prediction mode is designated, the selector 71 supplies the predicted image data output from the inter prediction section 85 to the addition section 65.

The intra prediction section 80 performs the intra prediction process of the enhancement layer based on the information regarding the intra prediction input from the lossless decoding section 62 and the reference image data from the frame memory 69 to generate predicted image data. The intra prediction process is performed for each PU. When the intra BL prediction or the intra residual prediction is designated as the intra prediction mode, the intra prediction section 80 uses a co-located block in the base layer corresponding to a prediction target block as a reference block. In the case of the intra BL prediction, the intra prediction section 80 generates the predicted image based on the decoded image of the reference block. In the case of the intra residual prediction, the intra prediction section 80 predicts a prediction error of the intra prediction based on the predicted error image of the reference block and generates the predicted image to which the predicted prediction error is added. The intra prediction section 80 outputs the generated predicted image data of the enhancement layer to the selector 71.

The inter prediction section 85 performs an inter prediction process (motion compensation process) of the enhancement layer based on the information regarding the inter prediction input from the lossless decoding section 62 and the reference image data from the frame memory 69 to generate predicted image data. The inter prediction process is performed for each PU. When the inter residual prediction is designated as the inter prediction mode, the inter prediction section 85 uses a co-located block in the base layer corresponding to a prediction target block as a reference block. In the case of the inter residual prediction, the inter prediction section 85 predicts a prediction error of the inter prediction based on the predicted error image of the reference block and generates a predicted image to which the predicted prediction error is added. The inter prediction section 85 outputs the generated predicted image data of the enhancement layer to the selector 71.

The color gamut prediction section 90 up-samples the image (the decoded image or the predicted error image) of the base layer buffered in the common memory 7 according to a resolution ratio between the base layer and the enhancement layer. When the image of the enhancement layer has a different color gamut from the image of the base layer, the color gamut prediction section 90 converts the color gamut of the up-sampled image of the base layer into the same color gamut as the image of the enhancement layer. In the embodiment, on the assumption of a linear relation independent for each color component between the color gamuts of the base layer and the enhancement layer, the color gamut prediction section 90 converts the color gamut by approximately predicting the image of the enhancement layer from the image of the base layer. The image of the base layer of which the color gamut is converted by the color gamut prediction section 90 can be stored in the frame memory 69 to be used as a reference image in the inter layer prediction by the intra prediction section 80 or the inter prediction section 85. The color gamut prediction section 90 acquires the prediction mode parameter indicating the prediction mode for the color gamut prediction from the lossless decoding section 62. When the prediction mode parameter indicates the adaptive parameter mode, the color gamut prediction section 90 further acquires a difference from a previous value of the prediction parameter from the lossless decoding section 62. The color gamut prediction section 90 predicts an image of the enhancement layer from the image of the base layer after the up-sampling using the parameters acquired from the lossless decoding section 62.

[4-2. Detailed Configuration of Color Gamut Prediction Section]

Figure 27:
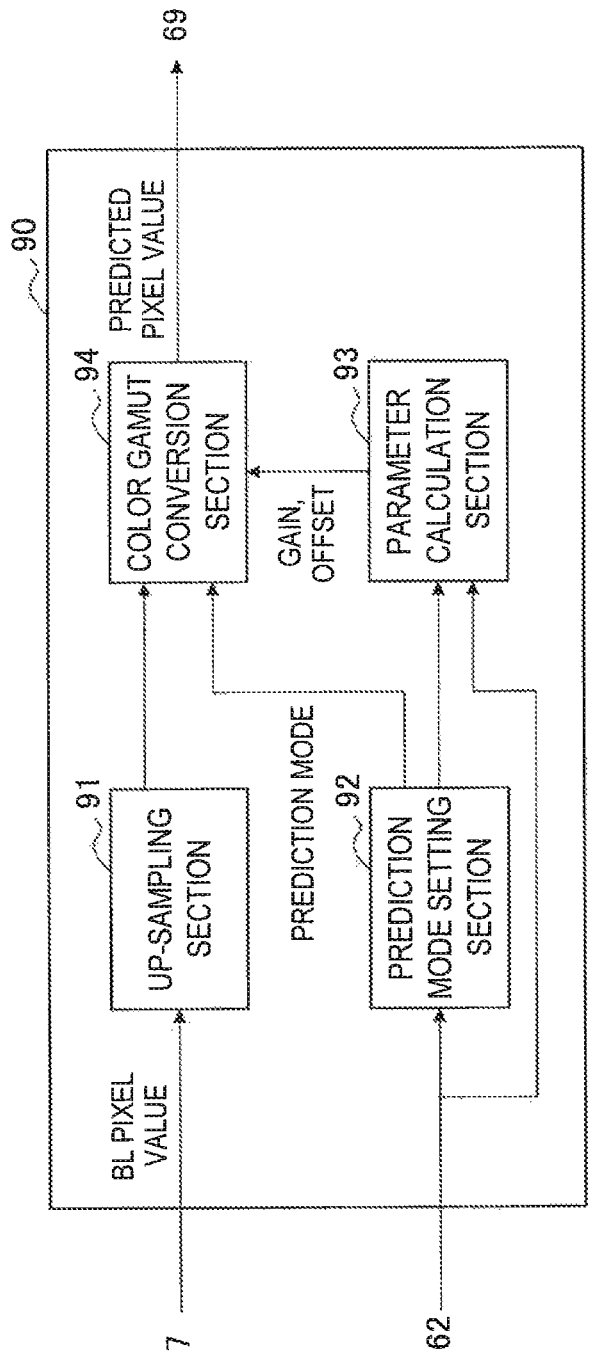
FIG. 27 is a block diagram showing an example of the configuration of a color gamut prediction section shown in FIG. 26.

FIG. 27 is a block diagram showing an example of the configuration of the color gamut prediction section 90 illustrated in FIG. 26. Referring to FIG. 27, the color gamut prediction section 90 includes an up-sampling section 91, a prediction mode setting section 92, a parameter calculation section 93, and a color gamut conversion section 94.

(1) Up-Sampling Section

The up-sampling section 91 up-samples the image of the base layer acquired from the common memory 7 according to a resolution ratio between the base layer and the enhancement layer. More specifically, the up-sampling section 91 calculates an interpolated pixel value of each of interpolated pixels sequentially scanned according to the resolution ratio by filtering the image of the base layer with a predefined filter coefficient. Thus, a space resolution of the image of the base layer used as the reference block can be increased up to the same resolution as that of the enhancement layer. The up-sampling section 91 outputs the image after the up-sampling to the color gamut conversion section 94.

(2) Prediction Mode Setting Section

The prediction mode setting section 92 sets the prediction mode indicated by the prediction mode parameter decoded by the lossless decoding section 62 among candidates of the prediction mode for the color gamut prediction in the color gamut prediction section 90. The candidates of the prediction mode can include the bit shift mode, the fixed parameter mode, and the adaptive parameter mode described above. In an embodiment, the prediction mode setting section 92 can set the prediction mode according to the prediction mode parameter decoded from the PPS. In another embodiment, the prediction mode setting section 92 can set the prediction mode according to the prediction mode parameter decoded from the slice header. In still another embodiment, the prediction mode setting section 92 can set the prediction mode according to the prediction mode parameter decoded from the SPS. When the prediction mode parameter is decoded from the SPS, the same prediction mode can be maintained in one sequence.

(3) Parameter Calculation Section

When the adaptive parameter mode is set by the prediction mode setting section 92, the parameter calculation section 93 calculates prediction parameters to be used for the color gamut prediction using the differences of the prediction parameters decoded by the lossless decoding section 62. Here, the prediction parameters include the gain $g_i$ and the offset $o_i$ (where i=1, 2, 3) expressed in equations (4) to (6).

More specifically, in the adaptive parameter mode, the parameter calculation section 93 calculates the latest values of the gain and the offset by adding the differences of the gain and the offset acquired from the lossless decoding section 62 to the previous values of the gain and the offset. Here, the previous values may be, for example, values calculated for the previous picture when the gain and the offset are calculated for each picture. When the gain and the offset are calculated for each slice, the previous values may be values calculated for the slice at the same position as the previous picture. When the latest prediction mode parameter indicates the adaptive parameter mode and the previous prediction mode parameter indicates the bit shift mode, the parameter calculation section 93 adds the differences decoded by the lossless decoding section 62 to the prediction parameter values corresponding to the bit shift amount. When the latest prediction mode parameter indicates the adaptive parameter mode and the previous prediction mode parameter indicates the fixed parameter mode, the parameter calculation section 93 adds the differences decoded by the lossless decoding section 62 to the fixed prediction parameter values defined in advance. The previous values (the bases of the differences) to which the differences of the gain and the offset are added are shown in FIG. 9. The parameter calculation section 93 outputs the calculated latest values of the gain and the offset to the color gamut conversion section 94. Since the value of the gain can include a fractional value, the differences of the denominator and the numerator of the gain can each be calculated from the decoded differences. Accordingly, the parameter calculation section 93 can calculate each of the denominator and the numerator of the gain from the decoded differences. The multiplication of the gain by the color gamut conversion section 94 can be performed through the multiplication of the numerator which is an integer and shift calculation corresponding to division by the denominator. The range of the value of the denominator of the gain may be limited only to an integral power of 2 to reduce calculation cost. In this case, the binary logarithm of the value of the denominator may be used as a prediction parameter.

(4) Color Gamut Conversion Section

The color gamut conversion section 94 converts the color gamut of the image of the base layer after the up-sampling input from the up-sampling section 91 into the same color gamut as that of the image of the enhancement layer according to the prediction mode set by the prediction mode setting section 92. For example, when the bit shift mode is set, the color gamut conversion section 94 calculates the predicted pixel value by shifting the pixel value of the base layer after the up-sampling to the left by a predetermined bit shift amount $n_{shift}$ according to equations (1) to (3). When the fixed parameter mode is set, the color gamut conversion section 94 calculates the predicted pixel value by multiplying the pixel value of the base layer after the up-sampling by the fixed gain and further adding the fixed offset according to equations (4) to (6). When the adaptive parameter mode is set, the color gamut conversion section 94 calculates the predicted pixel value using the gain and the offset calculated adaptively by the parameter calculation section 93 instead of the fixed gain and the offset. Thus, a reference image for the inter layer prediction is generated. The color gamut conversion section 94 stores the reference image (the image of the base layer of which the color gamut is converted) for the inter layer prediction generated in this way in the frame memory 69.

An example of the syntax of the differences of the prediction mode parameters and the prediction parameters (the gain and the offset of each color component) decoded by the lossless decoding section 62 is shown in FIG. 8. These parameters can be decoded from the encoded stream of the enhancement layer by the lossless decoding section 62. For example, the syntax shown in FIG. 8 may be included in the PPS or may be included in the slice header. As described above, the example in which the differences of the prediction mode parameters and the prediction parameters are decoded from the slice header is beneficial in a use in which a different color gamut is used for each partial region of the image. Further, the extension flag "color_gamut_prediction_flag" and the prediction mode parameter "color_prediction_model" may be decoded from the SPS of each sequence. In this case, the same prediction mode is maintained in one sequence.

In an embodiment, the lossless decoding section 62 may decode the differences of the prediction parameters of the color gamut prediction from the header (slice header) having the syntax common to the weighted-prediction associated parameters according to the mapping shown in Table 1. By reusing the syntax, redundancy of the syntax is reduced, and thus it is easy to ensure compatibility when the encoder and the decoder are mounted and the version is upgraded. However, the extension flag "color_gamut_prediction_flag" and the prediction mode parameter "color_prediction_model" may be separately decoded from the SPS, the PPS, or the slice header. The lossless decoding section 62 may decode the flag indicating whether one of the weighted-prediction associated parameters and the parameters for the color gamut prediction is encoded and may decode the parameter for the color gamut prediction according to the decoded flag. When the weighted-prediction associated parameters are reused between the layers, the lossless decoding section 62 may not decode the weighted-prediction associated parameters unique to the enhancement layer and can decode the differences of the prediction parameters of the color gamut prediction by the same syntax instead. In this case, the syntax (the 21st to 38th lines of FIG. 11) for the parameters of the L1 reference frame may not be used. The value of a variable "num_ref_idx_l0_active_minus1" corresponding to the numbers of reference frames (minus 1) may be seen to be zero (that is, the number of images of the base layer of which the color gamut is converted is 1).

In another embodiment, the lossless decoding section 62 may reuse some of the weighted-prediction associated parameters for the color gamut prediction. For example, the denominators specified by "luma_log 2_weight_denom" and "delta_chroma_log 2_weight_denom" shown in FIG. 11 can be reused as the denominators of the gains of the luminance component and the color difference component. In this case, the lossless decoding section 62 does not decode "delta_luma_log 2_gain_denom" and "delta_chroma_log 2_gain_denom" shown in FIG. 8.

In a modification example, the lossless decoding section 62 may decode the differences of the first version of the prediction parameters of the color gamut prediction from the portion of the L0 reference frame of the syntax common to the weighted-prediction associated parameters and may decode the differences of the second version of the prediction parameters of the color gamut prediction from the portion of the L1 reference frame of the syntax. In this case, the parameter calculation section 93 calculates the first version of the prediction parameters of the color gamut prediction using the decoded differences in regard to the first version and calculates the second version of the prediction parameters of the color gamut prediction using the decoded differences in regard to the second version. Then, the color gamut conversion section 94 selectively uses the first and second versions of the prediction parameters to predict the image of the enhancement layer, i.e., to generate the reference image for the inter layer prediction.

In the modification example, for example, the color gamut conversion section 94 may select the version to be used between the first and second versions of the prediction parameters according to the band to which the pixel value belongs. The boundary value corresponding to the boundary between the bands for switching the version to be used may be known in advance for both of the encoder and the decoder or may be adaptively set. When the boundary value is adaptively set, the color gamut conversion section 94 determines the band to which the pixel value belongs according to the boundary value specified by the boundary information further decoded by the lossless decoding section 62. Then, the color gamut conversion section 94 can select the version to be used between the first and second versions of the prediction parameters based on the determination result.

In the foregoing modification example, for example, the color gamut conversion section 94 may select the version to be used between the first and second versions of the prediction parameters instead according to the image region to which the pixel belongs. The region boundary for switching the version to be used may be known in advance for both of the encoder and the decoder or may be adaptively set. When the region boundary is adaptively set, the color gamut conversion section 94 determines the image region to which the pixel belongs according to the region boundary specified by the boundary information further decoded by the lossless decoding section 62. Then, the color gamut conversion section 94 can select the version to be used between the first and second versions of the prediction parameters based on the determination result.

According to the modification example, the prediction error of the color gamut prediction is reduced compared to the known method, and thus the encoding amount of the predicted error data is reduced. As a result, the encoding efficiency can be improved. The method of supplying two versions of the prediction parameters may be applied only to the luminance component and not to the color difference component, as described above.

In an embodiment, when the bit depth of the enhancement layer is greater than the bit depth of the base layer, the color gamut conversion section 94 is considered to be able to perform the bit shift and the color gamut conversion simultaneously at the time of the prediction of the image of the enhancement layer. The lossless decoding section 62 decodes the bit shift control flag indicating whether the bit shift at the time of the inter layer prediction is performed simultaneously with the color gamut conversion, as the control parameter of the enhancement layer. When the bit shift control flag indicates that the bit shift is performed simultaneously with the color gamut conversion, the color gamut conversion section 94 performs the bit shift simultaneously with the color gamut conversion. Otherwise, for example, the color gamut conversion section 94 performs the bit shift simultaneously with the up-sampling. Thus, a timing at which the bit shift is performed is adaptively switched, so that the number of process steps of the inter layer prediction can be minimized. As a result, the processing cost of the inter layer prediction can be suppressed compared to the known method. The lossless decoding section 62 may decode the bit shift control flag separately for the luminance component and the color difference component. In this case, more flexible control can be performed in accordance with the setting of each color component (setting of the image size and the bit depth). In general, the bit shift control flag can be decoded from the slice header, as exemplified in FIG. 19. However, the present disclosure is not limited to the example, but the bit shift control flag may be decoded from another spot such as the SPS or the PPS.

5. PROCESS FLOW FOR DECODING ACCORDING TO AN EMBODIMENT

[5-1. Schematic Flow]

Figure 28:
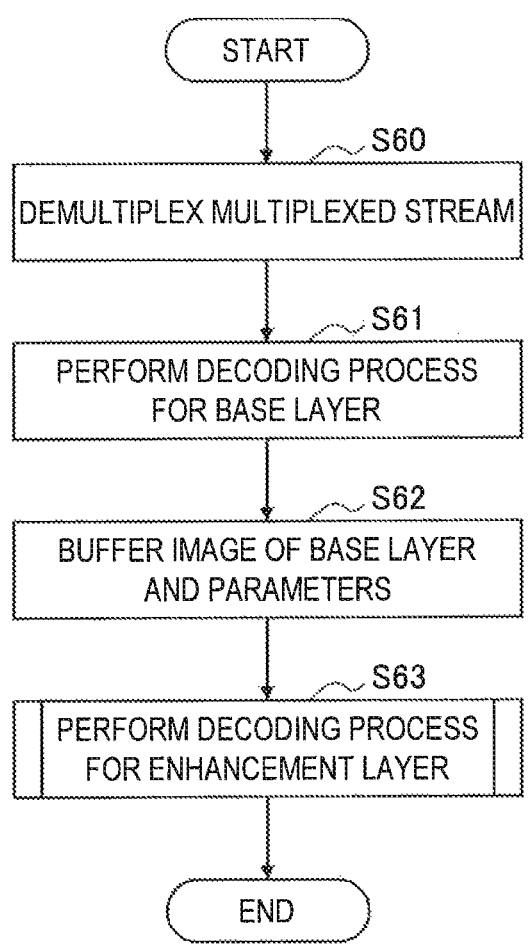
FIG. 28 is a flow chart showing an example of a schematic process flow at the time of decoding according to an embodiment.

FIG. 28 is a flow chart showing an example of a schematic process flow at the time of the decoding according to an embodiment. For the sake of brevity of description, process steps not directly relevant to the technology in the present disclosure are omitted from the drawing.

Referring to FIG. 28, the demultiplexing section 5 first demultiplexes the multilayer multiplexed stream into the encoded stream of the base layer and the encoded stream of the enhancement layer (step S60).

Next, the BL decoding section 6a performs the decoding process of the base layer to reconstruct the image of the base layer from the encoded steam of the base layer (step S61).

The common memory 7 buffers an image (one or both of a decoded image and a predicted error image) of the base layer generated in the decoding process for the base layer and the parameters reused between the layers (step S62). The parameters reused between the layers may include the weighted-prediction associated parameters.

Next, the EL decoding section 6b performs the decoding process for the enhancement layer to reconstruct the image of the enhancement layer (step S63). In the decoding process for the enhancement layer performed herein, the image of the base layer buffered by the common memory 7 is up-sampled by the color gamut prediction section 90 so that the color gamut is converted. The image of the base layer after the color gamut conversion can be used as a reference image in the inter layer prediction.

[5-2. Color Gamut Prediction Process]

(1) First Layer

Figure 29:
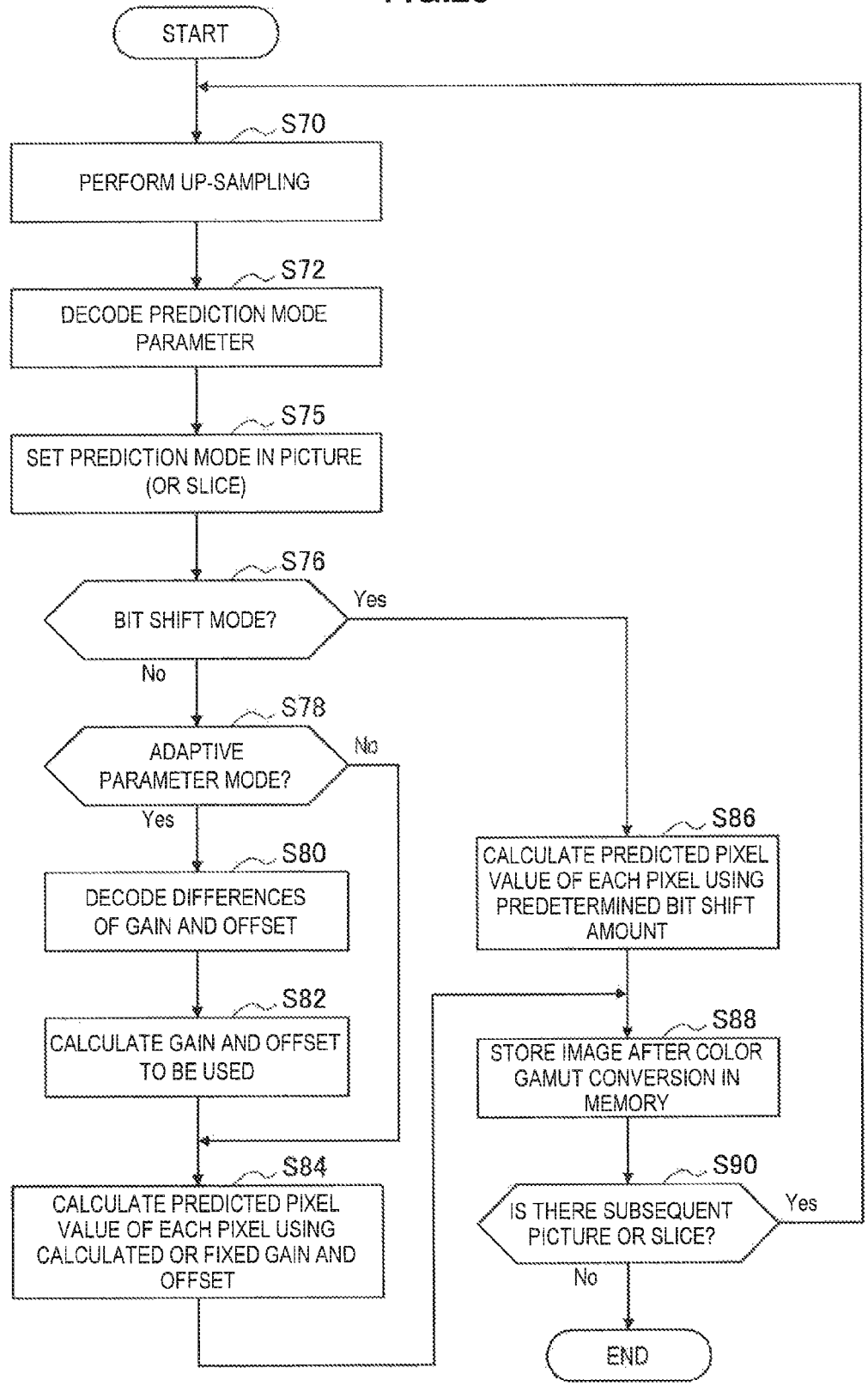
FIG. 29 is a flow chart showing a first example of the flow of a color gamut prediction process in a decoding process for an enhancement layer.

FIG. 29 is a flow chart showing a first example of the flow of a color gamut prediction process in the decoding process for the enhancement layer. The color gamut prediction process described herein is repeated for each picture or slice.

Referring to FIG. 29, the up-sampling section 91 first up-samples the image of the base layer acquired from the common memory 7 according to a resolution ratio between the base layer and the enhancement layer (step S70).

The lossless decoding section 62 decodes the prediction mode parameter indicating the prediction mode to be set for the color gamut prediction from the PPS or the slice header (step S72). Then, the prediction mode setting section 92 sets the prediction mode indicated by the decoded prediction mode parameter in the picture (or the slice) (step S75).

The subsequent process is branched depending on the prediction mode set by the prediction mode setting section 92 (steps S76 and S78). For example, when the set prediction mode is the adaptive parameter mode, the lossless decoding section 62 decodes the differences between the values of the gain and the offset and the previous values thereof from the PPS or the slice header (step S80). Then, the parameter calculation section 93 calculates the gain and the offset to be used for the latest picture or slice by adding the decoded differences of the gain and the offset to the previous values of the gain and the offset (step S82).

When the set prediction mode is the adaptive parameter mode or the fixed parameter mode, the color gamut conversion section 94 calculates the predicted pixel value of each pixel by multiplying the pixel value of the base layer after the up-sampling by the adaptively calculated or fixed gain and further adding the offset according to equations (4) to (6) (step S84).

When the set prediction mode is the bit shift mode, the color gamut conversion section 94 calculates the predicted pixel value of each pixel by shifting the pixel value of the base layer after the up-sampling to the left by a predetermined bit shift amount according to equations (1) to (3) (step S86).

When all of the predicted pixel values in the slice to be processed are calculated, the color gamut conversion section 94 stores the image of the base layer after the color gamut conversion, i.e., the predicted image which is the result of the color gamut prediction, in the frame memory 69 (step S88).

Thereafter, when there is a subsequent unprocessed picture or slice, the process returns to step S70 and the above-described processes are repeated on the subsequent picture or slice (step S90).

(2) Second Example

Figure 30:
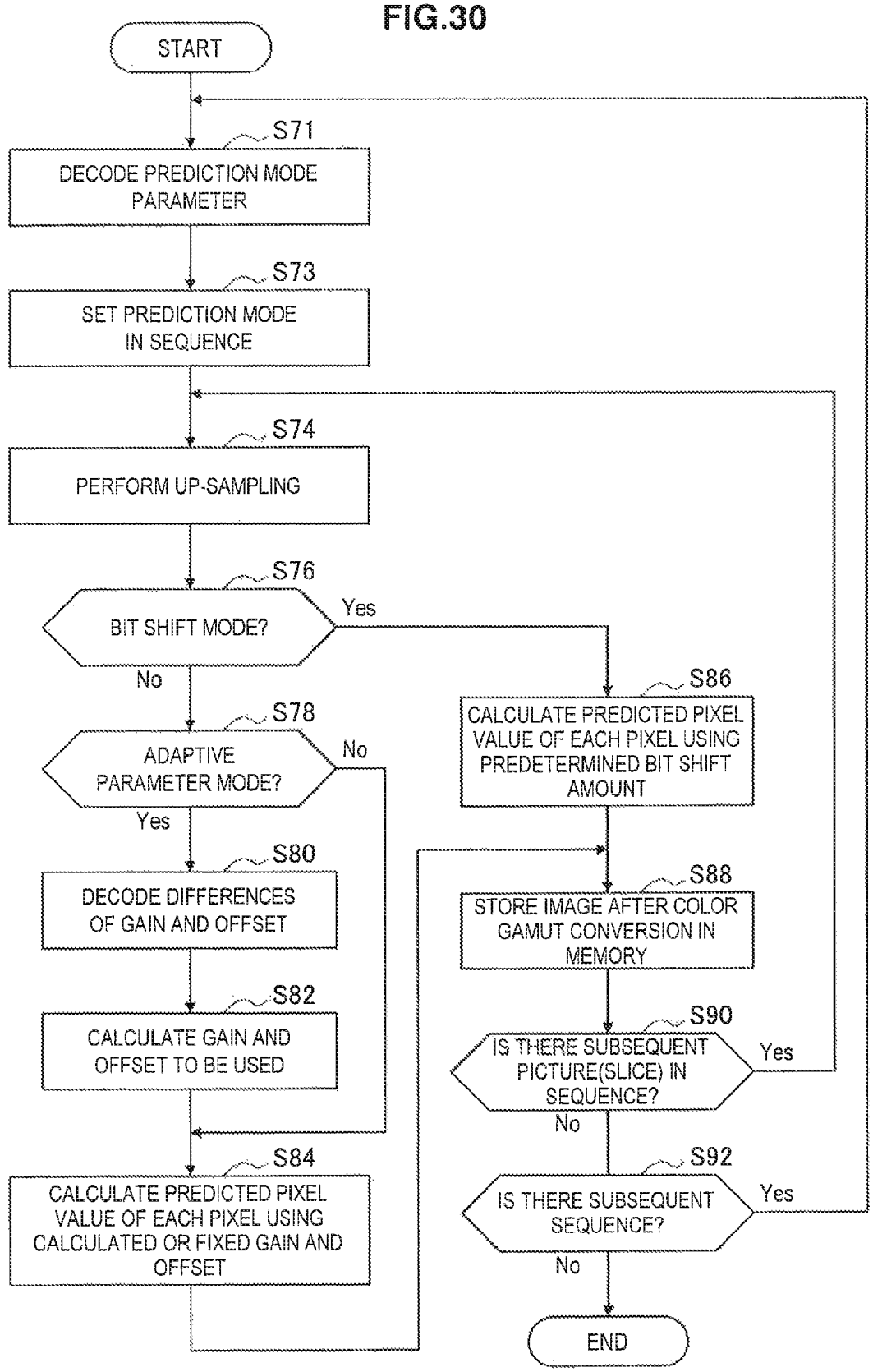
FIG. 30 is a flow chart showing a second example of the flow of a color gamut prediction process in a decoding process for an enhancement layer.

FIG. 30 is a flow chart showing a second example of the flow of a color gamut prediction process in the decoding process for the enhancement layer.

Referring to FIG. 30, the lossless decoding section 62 first decodes the prediction mode parameter indicating the prediction mode to be set for the color gamut prediction from the SPS (step S71). Then, the prediction mode setting section 92 sets the prediction mode indicated by the decoded prediction mode parameter in the sequence (step S73).

The processes of steps S74 to S90 are repeated for each picture or slice in the sequence.

The up-sampling section 91 first up-samples the image of the base layer acquired from the common memory 7 according to a resolution ratio between the base layer and the enhancement layer (step S74).

Further, the process is to be branched depending on the prediction mode set by the prediction mode setting section 92 (steps S76 and S78). For example, when the set prediction mode is the adaptive parameter mode, the lossless decoding section 62 decodes the differences between the values of the gain and the offset and the previous values thereof from the PPS or the slice header (step S80). Then, the parameter calculation section 93 calculates the gain and the offset to be used for the latest picture or slice by adding the decoded differences of the gain and the offset respectively to the previous values of the gain and the offset (step S82).

When the set prediction mode is the adaptive parameter mode or the fixed parameter mode, the color gamut conversion section 94 calculates the predicted pixel value of each pixel by multiplying the pixel value of the base layer after the up-sampling by the adaptively calculated or fixed gain and further adding the offset according to equations (4) to (6) (step S84).

When the set prediction mode is the bit shift mode, the color gamut conversion section 94 calculates the predicted pixel value of each pixel by shifting the pixel value of the base layer after the up-sampling to the left by a predetermined bit shift amount according to equations (1) to (3) (step S86).

When all of the predicted pixel values in the slice to be processed are calculated, the color gamut conversion section 94 stores the image of the base layer after the color gamut conversion, i.e., the predicted image which is the result of the color gamut prediction, in the frame memory 69 (step S88).

Thereafter, when there is a subsequent unprocessed picture or slice in the sequence, the process returns to step S74 and the up-sampling and the color gamut conversion are repeated on the subsequent picture or slice (step S90). When the color gamut conversion on all of the pictures or all of the slices in the sequence ends, it is further determined whether there is a subsequent sequence (step S92). When there is the subsequent sequence, the process returns to step S71 and the above-described processes are repeated on the subsequent sequence.

(3) Third Example

Figure 31:
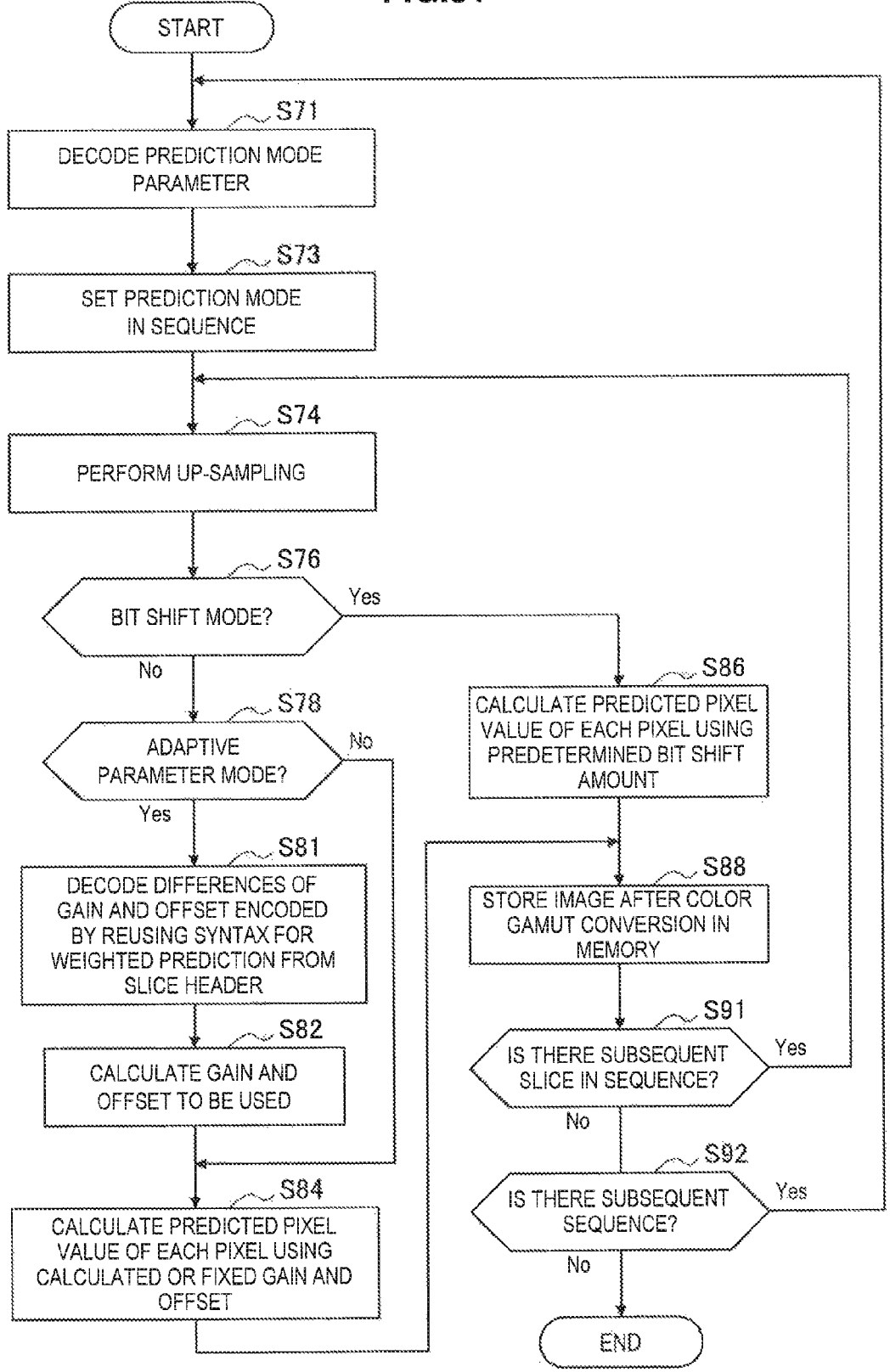
FIG. 31 is a flow chart showing a third example of the flow of a color gamut prediction process in a decoding process for an enhancement layer.

FIG. 31 is a flow chart showing a third example of the flow of a color gamut prediction process in the decoding process for the enhancement layer.

Referring to FIG. 31, the lossless decoding section 62 first decodes the prediction mode parameter indicating the prediction mode to be set for the color gamut prediction from the SPS (step S71). Then, the prediction mode setting section 92 sets the prediction mode indicated by the decoded prediction mode parameter in the sequence (step S73).

The processes of steps S74 to S91 are repeated for each slice in the sequence.

The up-sampling section 91 first up-samples the image of the base layer acquired from the common memory 7 according to a resolution ratio between the base layer and the enhancement layer (step S74).

Further, the process is branched depending on the prediction mode set by the prediction mode setting section 92 (steps S76 and S78). For example, when the set prediction mode is the adaptive parameter mode, the lossless decoding section 62 decodes the differences between the values of the gain and the offset encoded by reusing the syntax of the weighted-prediction associated parameters and the previous values from the slice header (step S81). Then, the parameter calculation section 93 calculates the gain and the offset to be used for the latest slice by adding the decoded differences of the gain and the offset to the previous values of the gain and the offset respectively (step S82).

When the set prediction mode is the adaptive parameter mode or the fixed parameter mode, the color gamut conversion section 94 calculates the predicted pixel value of each pixel by multiplying the pixel value of the base layer after the up-sampling by the adaptively calculated or fixed gain and further adding the offset according to equations (4) to (6) (step S84). According to the bit shift control flag which can be decoded from the encoded stream, the calculation of the predicted pixel value herein may include the bit shift for the inter layer prediction. Further, the bit shift may be included in the filter calculation of the up-sampling in step S74.

When the set prediction mode is the bit shift mode, the color gamut conversion section 94 calculates the predicted pixel value of each pixel by shifting the pixel value of the base layer after the up-sampling to the left by a predetermined bit shift amount according to equations (1) to (3) (step S86).

When all of the predicted pixel values in the slice to be processed are calculated, the color gamut conversion section 94 stores the image of the base layer after the color gamut conversion, i.e., the predicted image which is the result of the color gamut prediction, in the frame memory 69 (step S88).

Thereafter, when there is a subsequent unprocessed slice in the sequence, the process returns to step S74 and the up-sampling and the color gamut conversion are repeated on the subsequent slice (step S91). When the color gamut conversion on all of the slices in the sequence ends, it is further determined whether there is a subsequent sequence (step S92). When there is the subsequent sequence, the process returns to step S71 and the above-described processes are repeated on the subsequent sequence.

(4) Fourth Example

Figure 32:
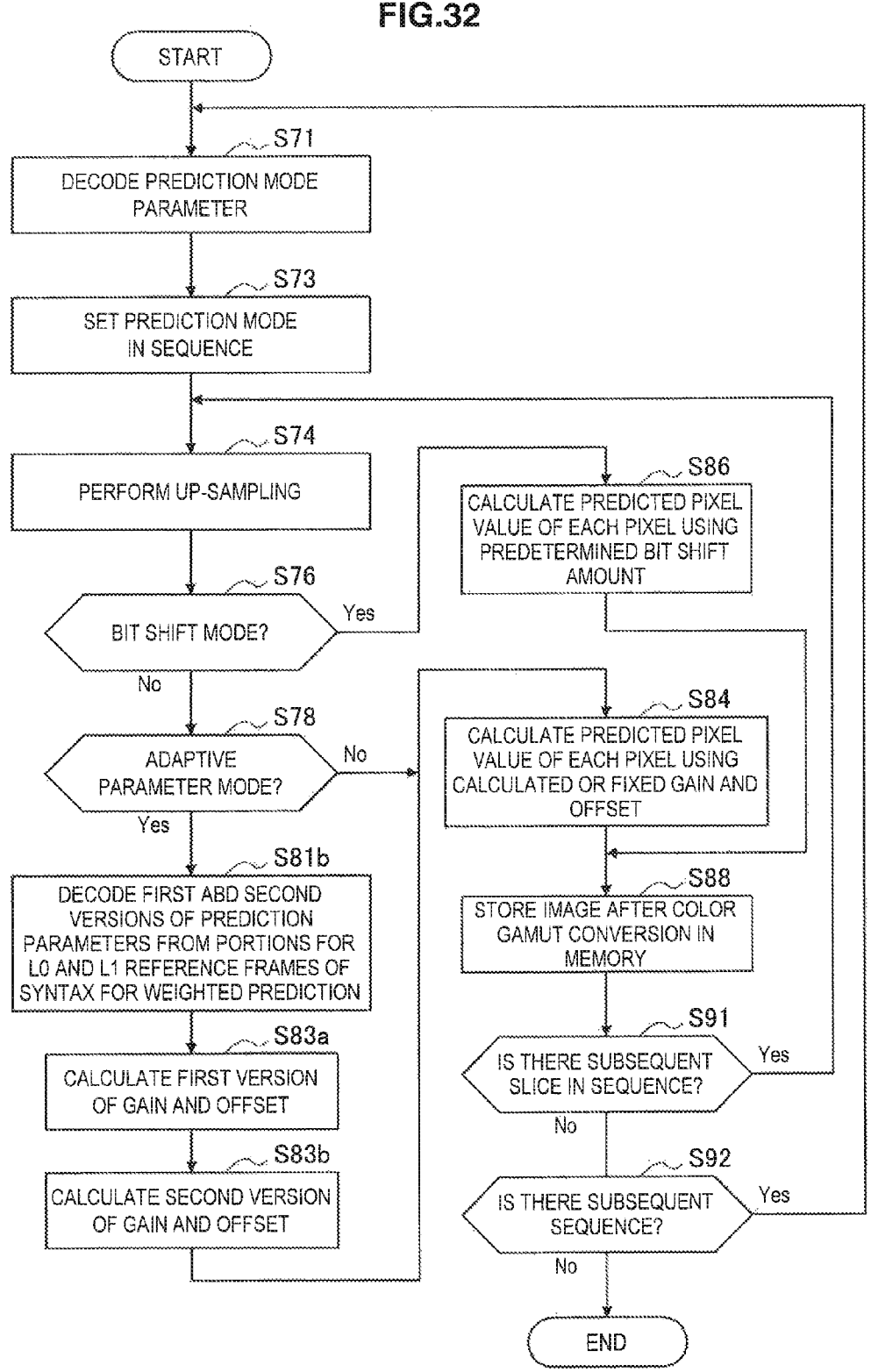
FIG. 32 is a flow chart showing a fourth example of the flow of a color gamut prediction process in a decoding process for an enhancement layer.

FIG. 32 is a flow chart showing a fourth example of the flow of a color gamut prediction process in the decoding process for the enhancement layer.

Referring to FIG. 32, the lossless decoding section 62 first decodes the prediction mode parameter indicating the prediction mode to be set for the color gamut prediction from the SPS (step S71). Then, the prediction mode setting section 92 sets the prediction mode indicated by the decoded prediction mode parameter in the sequence (step S73).

The processes of steps S74 to S91 are repeated for each slice in the sequence.

The up-sampling section 91 first up-samples the image of the base layer acquired from the common memory 7 according to a resolution ratio between the base layer and the enhancement layer (step S74).

Further, the process is branched depending on the prediction mode set by the prediction mode setting section 92 (steps S76 and S78). For example, when the set prediction mode is the adaptive parameter mode, the lossless decoding section 62 decodes the differences of the first and second versions of the prediction parameters from the portion of the L0 reference frame and the portion of the L1 reference frame of the syntax of the weighted-prediction associated parameters (step S81*b*). Then, the parameter calculation section 93 calculates the first version of the prediction parameters to be used for the latest slice by adding the decoded differences of the gain and the offset to the previous values of the gain and the offset in regard to the first version (step S83*a*). Likewise, the parameter calculation section 93 calculates the second version of the prediction parameters to be used for the latest slice by adding the decoded differences of the gain and the offset to the previous values of the gain and the offset in regard to the second version (step S83*b*). The first and second versions may each include an optimum value set to be used for the first and second bands in the range of the pixel values. Instead, the first and second versions may each include an optimum value set to be used for the first and second image regions.

The flow of the subsequent processes may be the same as that of the third example described with reference to FIG. 31 excluding the fact that the version of the prediction parameters can be switched according to the band to which the pixel value belongs or the image region to which the pixel belongs in step S84. In step S81*b*, the lossless decoding section 62 may additionally decode the boundary information specifying the boundary value between the bands for the switching the version of the prediction parameters or the region boundary between the image regions from, for example, the slice header or the extension of the slice header.

(5) Modification Example of Processing Order

The flow charts of FIGS. 29 to 32 show the examples in which the color gamut conversion is performed after the up-sampling is performed. However, as described with reference to FIGS. 25A and 25B, in a modification example, when the space resolution (image size) of the enhancement layer is higher than the space resolution of the base layer, the color gamut prediction section 90 may predict the image of the enhancement layer by converting the color gamut of the image of the base layer and then up-sampling the converted image. According to the processing order, since the bit depth and the number of pixels to be converted through the color gamut conversion are reduced compared to the case of the known processing order, the processing cost of the inter layer prediction is further suppressed.

6. EXAMPLE APPLICATION

[6-1. Application to Various Products]

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

(1) First Application Example

Figure 33:
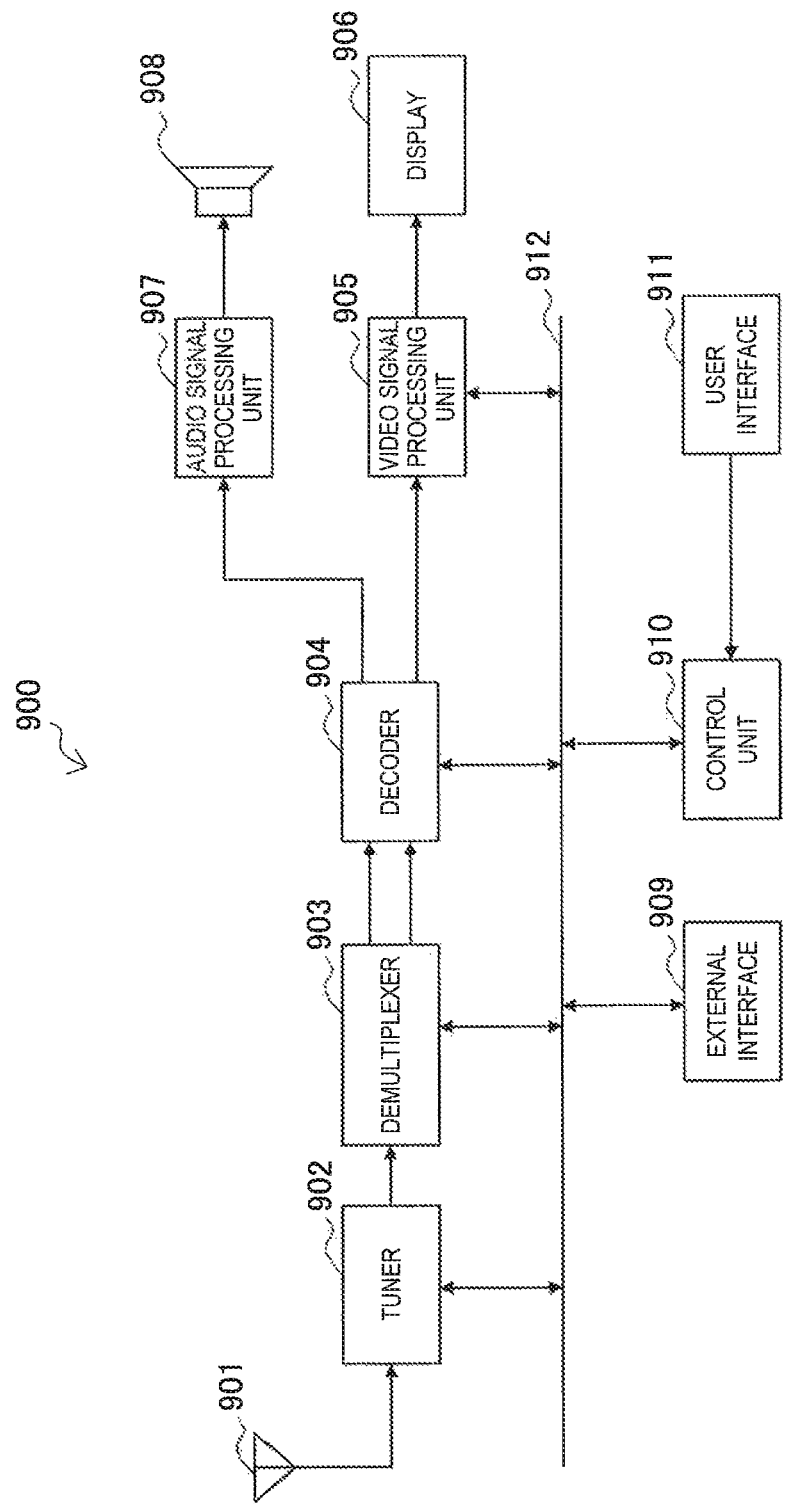
FIG. 33 is a block diagram showing an example of a schematic configuration of a television.

FIG. 33 is a diagram illustrating an example of a schematic configuration of a television device applying the aforementioned embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an OELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a CPU and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

The decoder 904 in the television device 900 configured in the aforementioned manner has a function of the image decoding device 60 according to the aforementioned embodiment. Thus, when the television device 900 performs the color gamut prediction on the layers of which the color gamuts are mutually different, the increase in the encoding amount can be suppressed while the high prediction precision is achieved.

(2) Second Application Example

Figure 34:
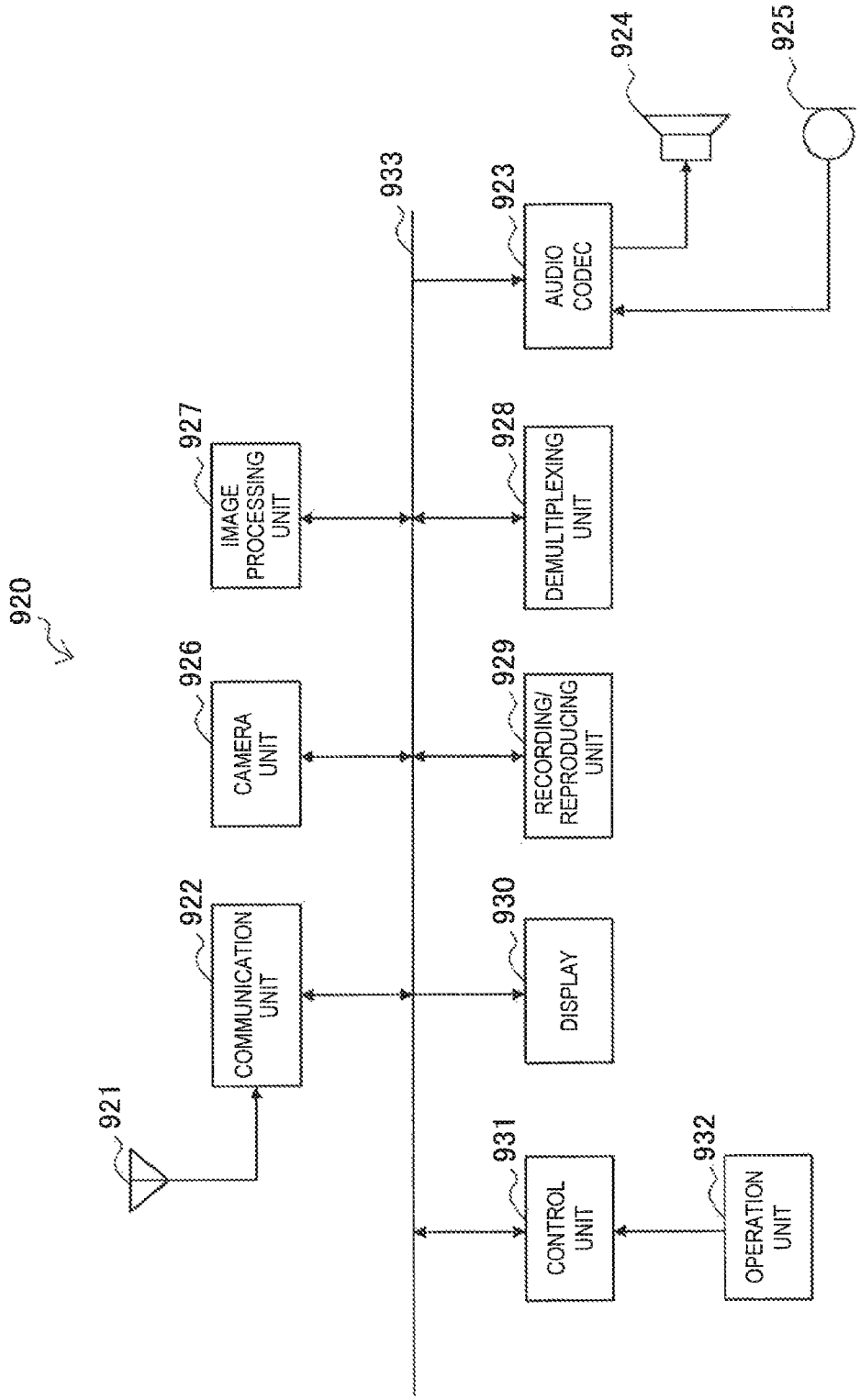
FIG. 34 is a block diagram showing an example of a schematic configuration of a mobile phone.

FIG. 34 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the recording/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The image processing unit 927 in the mobile telephone 920 configured in the aforementioned manner has a function of the image encoding device 10 and the image decoding device 60 according to the aforementioned embodiment. Thus, when the mobile telephone 920 performs the color gamut prediction on the layers of which the color gamuts are mutually different, the increase in the encoding amount can be suppressed while the high prediction precision is achieved.

(3) Third Application Example

Figure 35:
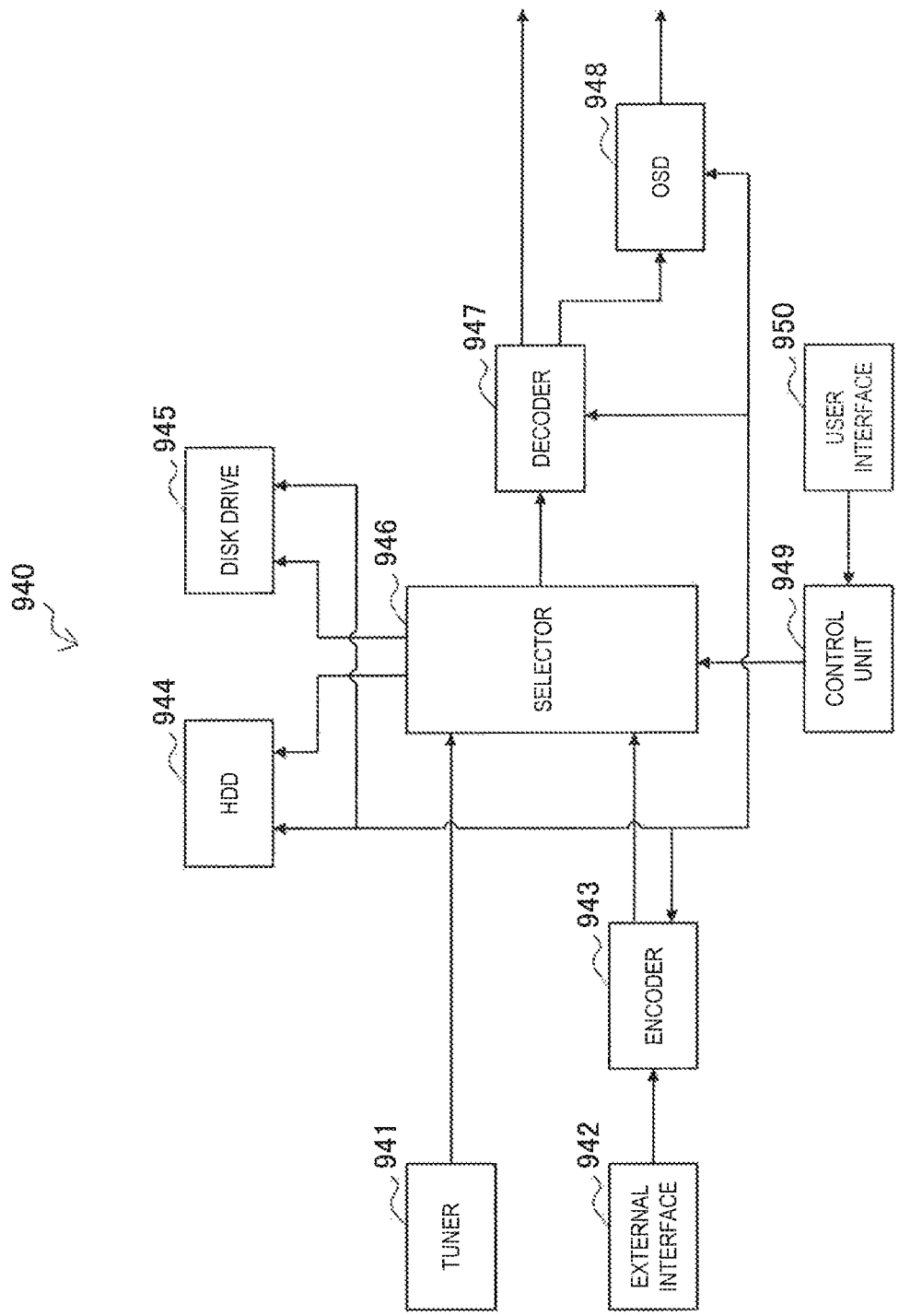
FIG. 35 is a block diagram showing an example of a schematic configuration of a recording/reproduction device.

FIG. 35 is a diagram illustrating an example of a schematic configuration of a recording/reproducing device applying the aforementioned embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 in the recording/reproducing device 940 configured in the aforementioned manner has a function of the image encoding device 10 according to the aforementioned embodiment. On the other hand, the decoder 947 has a function of the image decoding device 60 according to the aforementioned embodiment Thus, when the recording/reproducing device 940 performs the color gamut prediction on the layers of which the color gamuts are mutually different, the increase in the encoding amount can be suppressed while the high prediction precision is achieved.

(4) Fourth Application Example

Figure 36:
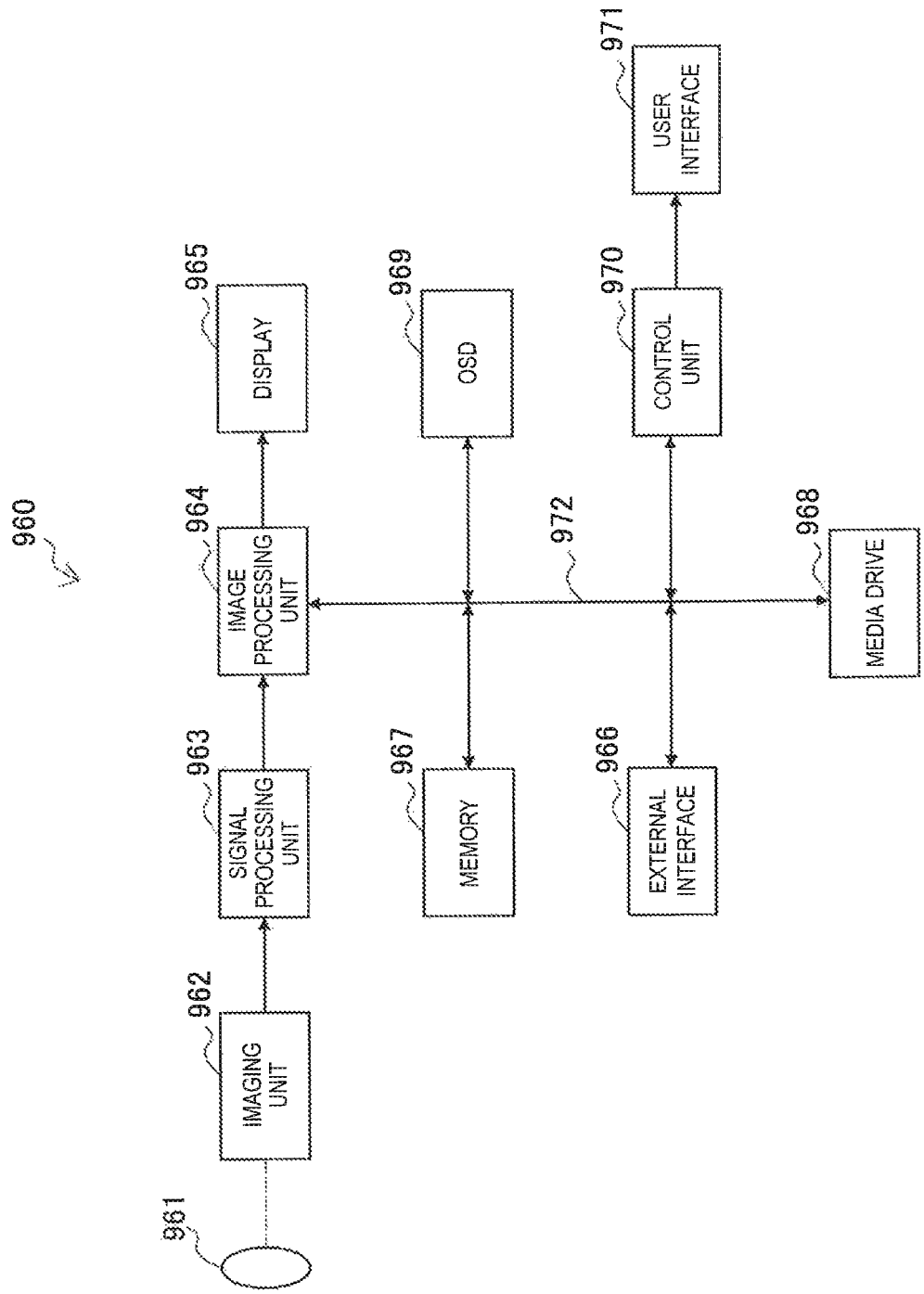
FIG. 36 is a block diagram showing an example of a schematic configuration of an image capturing device.

FIG. 36 shows an example of a schematic configuration of an image capturing device applying the aforementioned embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 in the imaging device 960 configured in the aforementioned manner has a function of the image encoding device 10 and the image decoding device 60 according to the aforementioned embodiment. Thus, when the imaging device 960 performs the color gamut prediction on the layers of which the color gamuts are mutually different, the increase in the encoding amount can be suppressed while the high prediction precision is achieved.

[6-2. Various Uses of Scalable Video Coding]

Advantages of scalable video coding described above can be enjoyed in various uses. Three examples of use will be described below.

(1) First Example

Figure 37:
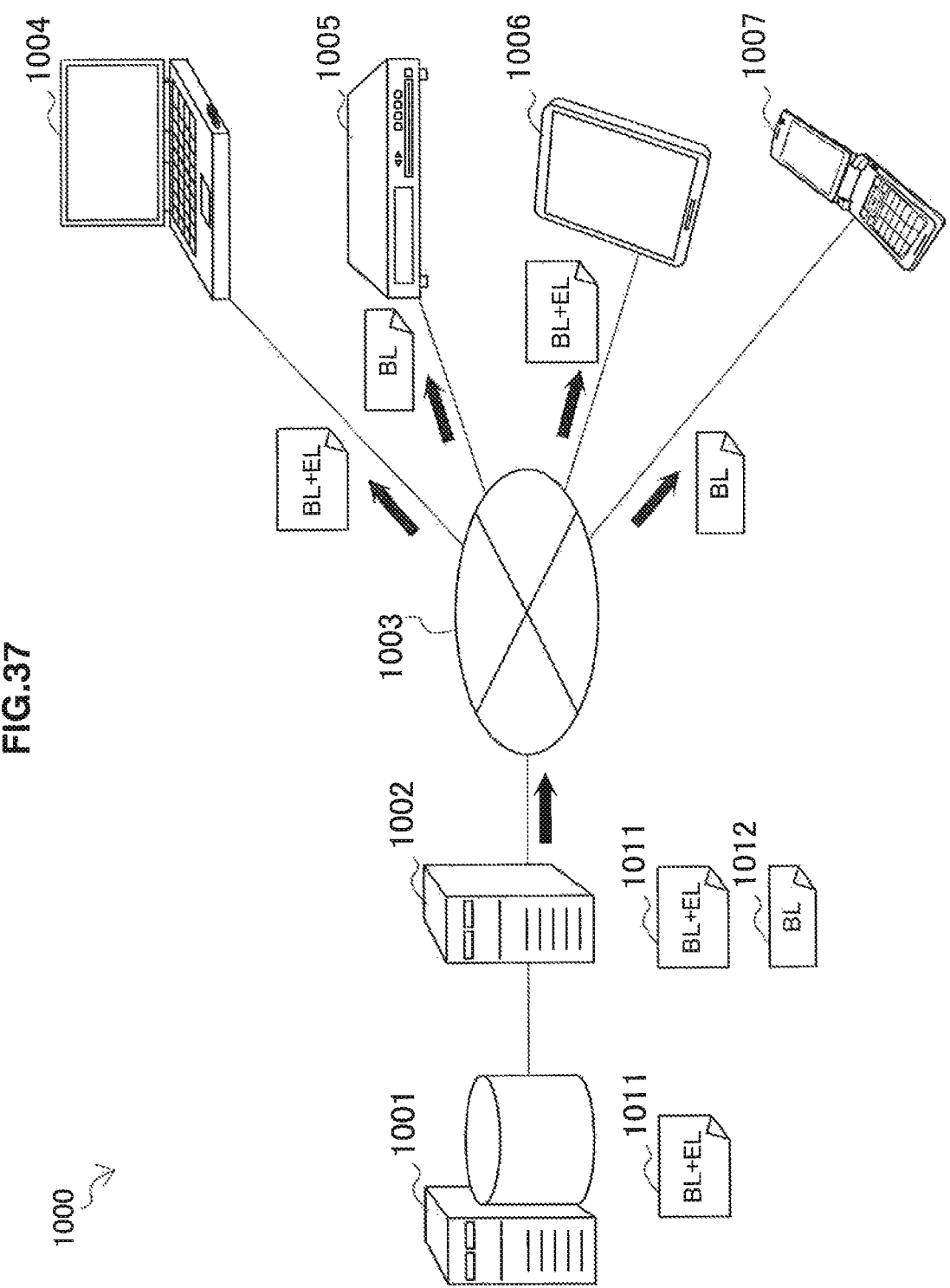
FIG. 37 is an explanatory view illustrating a first example of use of the scalable video coding.

In the first example, scalable video coding is used for selective transmission of data. Referring to FIG. 37, a data transmission system 1000 includes a stream storage device 1001 and a delivery server 1002. The delivery server 1002 is connected to some terminal devices via a network 1003. The network 1003 may be a wire network or a wireless network or a combination thereof. FIG. 37 shows a PC (Personal Computer) 1004, an AV device 1005, a tablet device 1006, and a mobile phone 1007 as examples of the terminal devices.

The stream storage device 1001 stores, for example, stream data 1011 including a multiplexed stream generated by the image encoding device 10. The multiplexed stream includes an encoded stream of the base layer (BL) and an encoded stream of an enhancement layer (EL). The delivery server 1002 reads the stream data 1011 stored in the stream storage device 1001 and delivers at least a portion of the read stream data 1011 to the PC 1004, the AV device 1005, the tablet device 1006, and the mobile phone 1007 via the network 1003.

When a stream is delivered to a terminal device, the delivery server 1002 selects the stream to be delivered based on some condition such as capabilities of a terminal device or the communication environment. For example, the delivery server 1002 may avoid a delay in a terminal device or an occurrence of overflow or overload of a processor by not delivering an encoded stream having high image quality exceeding image quality that can be handled by the terminal device. The delivery server 1002 may also avoid occupation of communication bands of the network 1003 by not delivering an encoded stream having high image quality. On the other hand, when there is no risk to be avoided or it is considered to be appropriate based on a user's contract or some condition, the delivery server 1002 may deliver an entire multiplexed stream to a terminal device.

In the example of FIG. 37, the delivery server 1002 reads the stream data 1011 from the stream storage device 1001. Then, the delivery server 1002 delivers the stream data 1011 directly to the PC 1004 having high processing capabilities. Because the AV device 1005 has low processing capabilities, the delivery server 1002 generates stream data 1012 containing only an encoded stream of the base layer extracted from the stream data 1011 and delivers the stream data 1012 to the AV device 1005. The delivery server 1002 delivers the stream data 1011 directly to the tablet device 1006 capable of communication at a high communication rate. Because the mobile phone 1007 can communicate at a low communication rate, the delivery server 1002 delivers the stream data 1012 containing only an encoded stream of the base layer to the mobile phone 1007.

By using the multiplexed stream in this manner, the amount of traffic to be transmitted can adaptively be adjusted. The code amount of the stream data 1011 is reduced when compared with a case when each layer is individually encoded and thus, even if the whole stream data 1011 is delivered, the load on the network 1003 can be lessened. Further, memory resources of the stream storage device 1001 are saved.

Hardware performance of the terminal devices is different from device to device. In addition, capabilities of applications run on the terminal devices are diverse. Further, communication capacities of the network 1003 are varied. Capacities available for data transmission may change every moment due to other traffic. Thus, before starting delivery of stream data, the delivery server 1002 may acquire terminal information about hardware performance and application capabilities of terminal devices and network information about communication capacities of the network 1003 through signaling with the delivery destination terminal device. Then, the delivery server 1002 can select the stream to be delivered based on the acquired information.

Incidentally, the layer to be decoded may be extracted by the terminal device. For example, the PC 1004 may display a base layer image extracted and decoded from a received multiplexed stream on the screen thereof. After generating the stream data 1012 by extracting an encoded stream of the base layer from a received multiplexed stream, the PC 1004 may cause a storage medium to store the stream data 1012 or transfer the stream data to another device.

The configuration of the data transmission system 1000 shown in FIG. 37 is only an example. The data transmission system 1000 may include any numbers of the stream storage device 1001, the delivery server 1002, the network 1003, and terminal devices.

(2) Second Example

Figure 38:
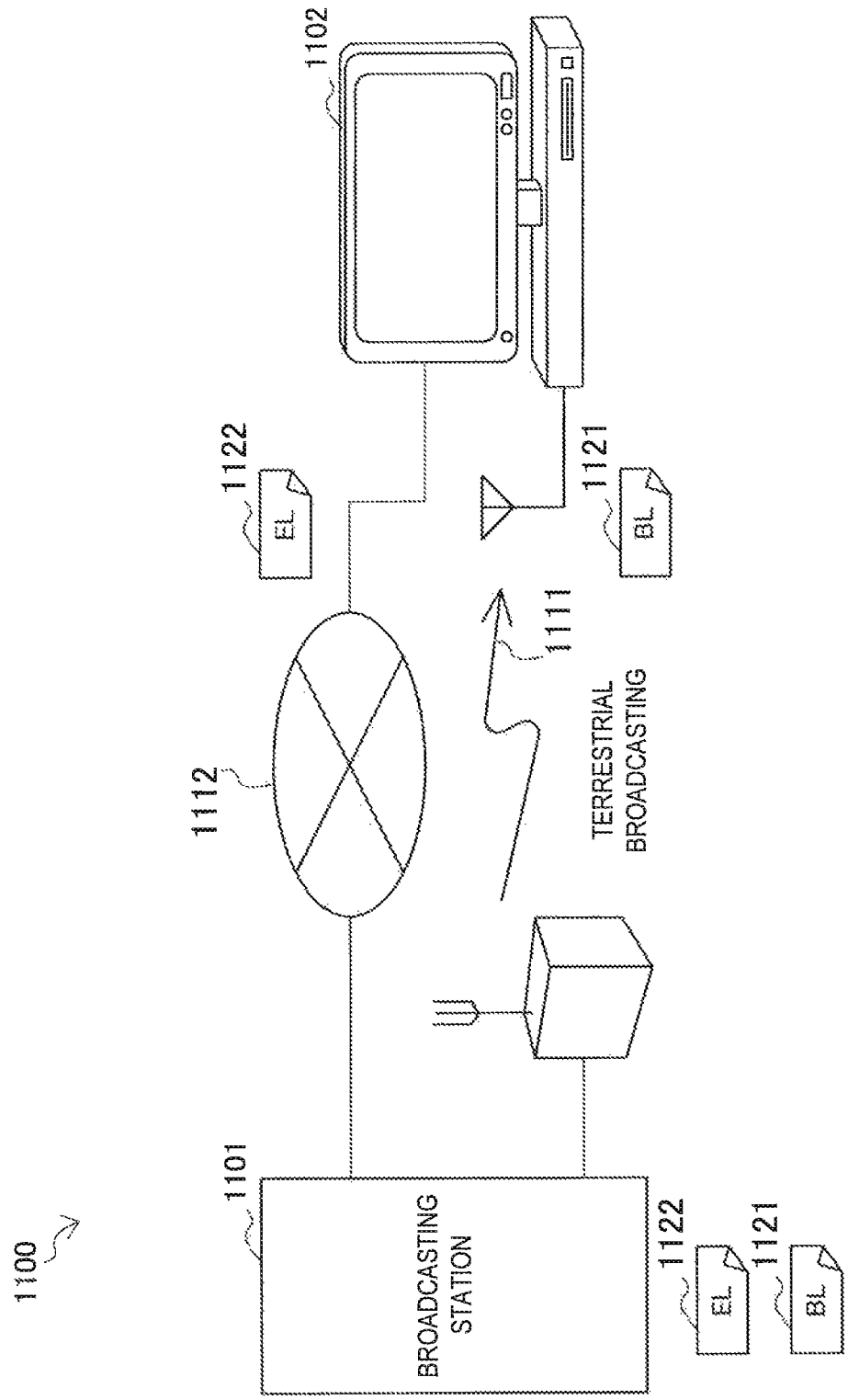
FIG. 38 is an explanatory view illustrating a second example of use of the scalable video coding.

In the second example, scalable video coding is used for transmission of data via a plurality of communication channels. Referring to FIG. 38, a data transmission system 1100 includes a broadcasting station 1101 and a terminal device 1102. The broadcasting station 1101 broadcasts an encoded stream 1121 of the base layer on a terrestrial channel 1111. The broadcasting station 1101 also broadcasts an encoded stream 1122 of an enhancement layer to the terminal device 1102 via a network 1112.

The terminal device 1102 has a receiving function to receive terrestrial broadcasting broadcast by the broadcasting station 1101 and receives the encoded stream 1121 of the base layer via the terrestrial channel 1111. The terminal device 1102 also has a communication function to communicate with the broadcasting station 1101 and receives the encoded stream 1122 of an enhancement layer via the network 1112.

After receiving the encoded stream 1121 of the base layer, for example, in response to user's instructions, the terminal device 1102 may decode a base layer image from the received encoded stream 1121 and display the base layer image on the screen. Alternatively, the terminal device 1102 may cause a storage medium to store the decoded base layer image or transfer the base layer image to another device.

After receiving the encoded stream 1122 of an enhancement layer via the network 1112, for example, in response to user's instructions, the terminal device 1102 may generate a multiplexed stream by multiplexing the encoded stream 1121 of the base layer and the encoded stream 1122 of an enhancement layer. The terminal device 1102 may also decode an enhancement image from the encoded stream 1122 of an enhancement layer to display the enhancement image on the screen. Alternatively, the terminal device 1102 may cause a storage medium to store the decoded enhancement layer image or transfer the enhancement layer image to another device.

As described above, an encoded stream of each layer contained in a multiplexed stream can be transmitted via a different communication channel for each layer. Accordingly, a communication delay or an occurrence of overflow can be reduced by distributing loads on individual channels.

The communication channel to be used for transmission may dynamically be selected in accordance with some condition. For example, the encoded stream 1121 of the base layer whose data amount is relatively large may be transmitted via a communication channel having a wider bandwidth and the encoded stream 1122 of an enhancement layer whose data amount is relatively small may be transmitted via a communication channel having a narrower bandwidth. The communication channel on which the encoded stream 1122 of a specific layer is transmitted may be switched in accordance with the bandwidth of the communication channel. Accordingly, the load on individual channels can be lessened more effectively.

The configuration of the data transmission system 1100 shown in FIG. 38 is only an example. The data transmission system 1100 may include any numbers of communication channels and terminal devices. The configuration of the system described here may also be applied to other uses than broadcasting.

(3) Third Example

Figure 39:
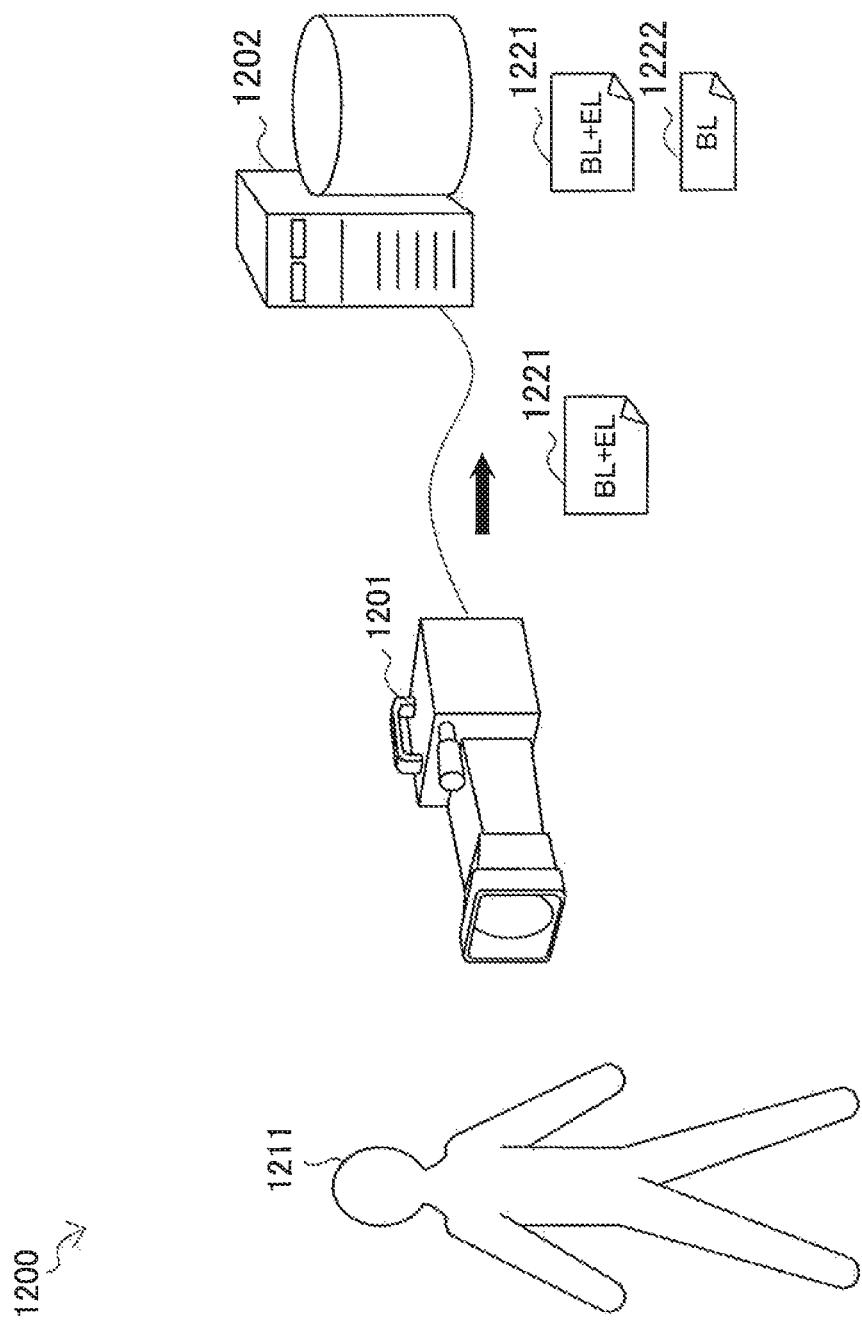
FIG. 39 is an explanatory view illustrating a third example of use of the scalable video coding.

In the third example, scalable video coding is used for storage of video. Referring to FIG. 39, a data transmission system 1200 includes an imaging device 1201 and a stream storage device 1202. The imaging device 1201 scalable-encodes image data generated by a subject 1211 being imaged to generate a multiplexed stream 1221. The multiplexed stream 1221 includes an encoded stream of the base layer and an encoded stream of an enhancement layer. Then, the imaging device 1201 supplies the multiplexed stream 1221 to the stream storage device 1202.

The stream storage device 1202 stores the multiplexed stream 1221 supplied from the imaging device 1201 in different image quality for each mode. For example, the stream storage device 1202 extracts the encoded stream 1222 of the base layer from the multiplexed stream 1221 in normal mode and stores the extracted encoded stream 1222 of the base layer. In high quality mode, by contrast, the stream storage device 1202 stores the multiplexed stream 1221 as it is. Accordingly, the stream storage device 1202 can store a high-quality stream with a large amount 26 of data only when recording of video in high quality is desired. Therefore, memory resources can be saved while the influence of image degradation on users is curbed.

For example, the imaging device 1201 is assumed to be a surveillance camera. When no surveillance object (for example, no intruder) appears in a captured image, the normal mode is selected. In this case, the captured image is likely to be unimportant and priority is given to the reduction of the amount of data so that the video is recorded in low image quality (that is, only the encoded stream 1222 of the base layer is stored). In contract, when a surveillance object (for example, the subject 1211 as an intruder) appears in a captured image, the high-quality mode is selected. In this case, the captured image is likely to be important and priority is given to high image quality so that the video is recorded in high image quality (that is, the multiplexed stream 1221 is stored).

In the example of FIG. 39, the mode is selected by the stream storage device 1202 based on, for example, an image analysis result. However, the present embodiment is not limited to such an example and the imaging device 1201 may select the mode. In the latter case, imaging device 1201 may supply the encoded stream 1222 of the base layer to the stream storage device 1202 in normal mode and the multiplexed stream 1221 to the stream storage device 1202 in high-quality mode.

Selection criteria for selecting the mode may be any criteria. For example, the mode may be switched in accordance with the loudness of voice acquired through a microphone or the waveform of voice. The mode may also be switched periodically. Also, the mode may be switched in response to user's instructions. Further, the number of selectable modes may be any number as long as the number of hierarchized layers is not exceeded.

The configuration of the data transmission system 1200 shown in FIG. 39 is only an example. The data transmission system 1200 may include any number of the imaging device 1201. The configuration of the system described here may also be applied to other uses than the surveillance camera.

6-3. Others (1) Application to the Multi-View Codec

Figure 40:
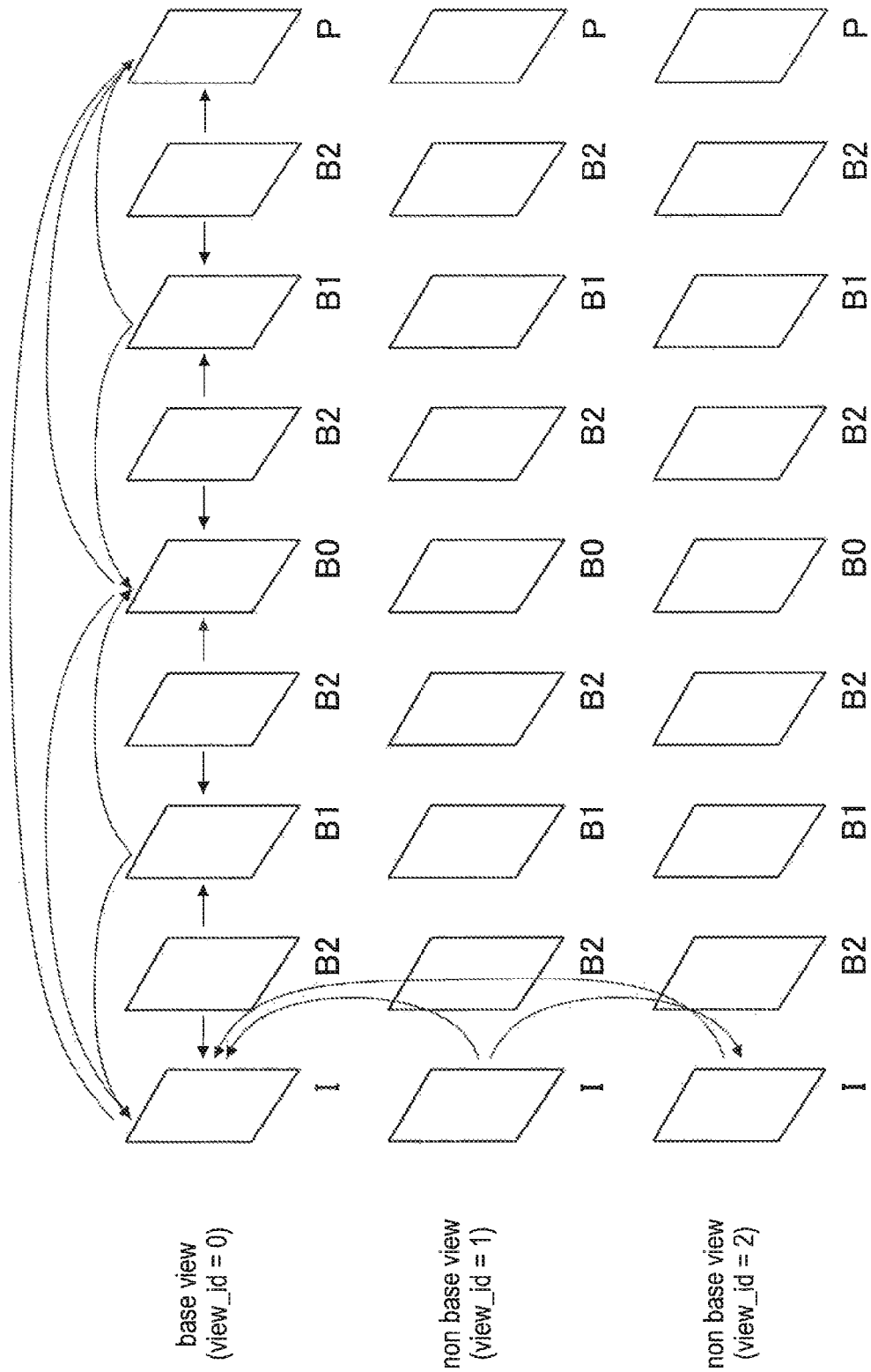
FIG. 40 is an explanatory view illustrating a multi-view codec.

The multi-view codec is a kind of multi-layer codec and is an image encoding system to encode and decode so-called multi-view video. FIG. 40 is an explanatory view illustrating a multi-view codec. Referring to FIG. 40, sequences of three view frames captured from three viewpoints are shown. A view ID (view_id) is attached to each view. Among a plurality of these views, one view is specified as the base view. Views other than the base view are called non-base views. In the example of FIG. 23, the view whose view ID is "0" is the base view and two views whose view ID is "1" or "2" are non-base views. When these views are hierarchically encoded, each view may correspond to a layer. As indicated by arrows in FIG. 40, an image of a non-base view is encoded and decoded by referring to an image of the base view (an image of the other non-base view may also be referred to).

Figure 41:
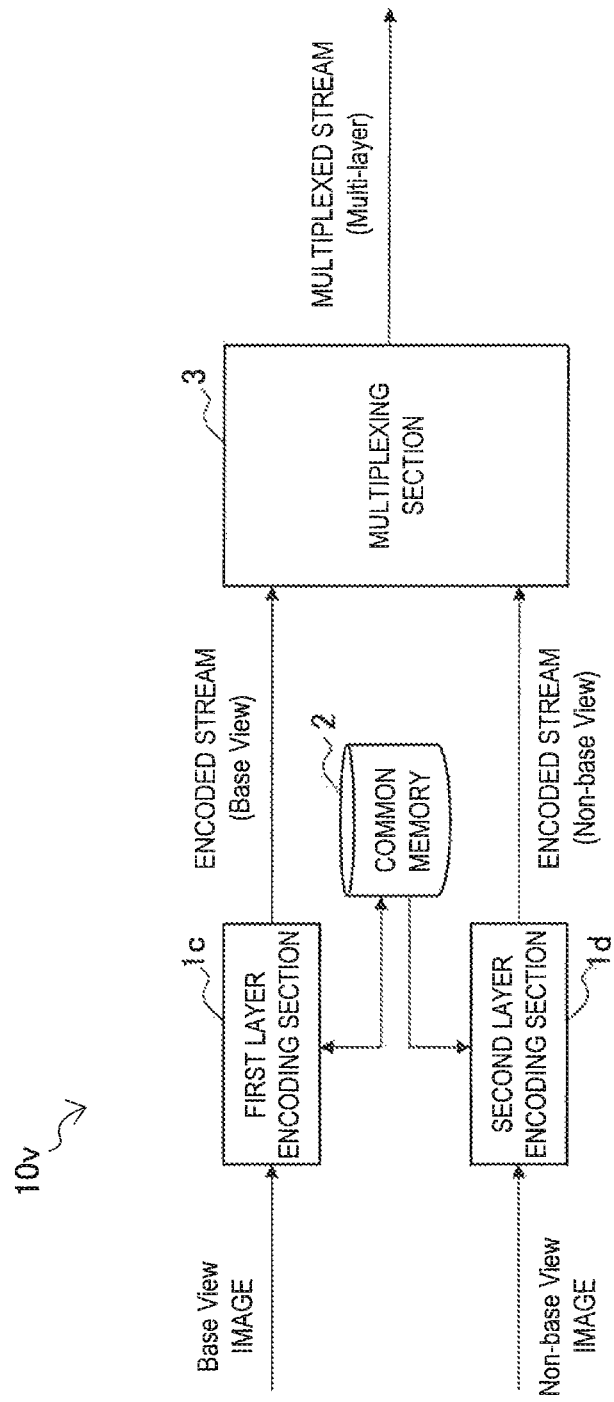
FIG. 41 is a block diagram showing a schematic configuration of the image encoding device for multi-view codec.

FIG. 41 is a block diagram showing a schematic configuration of an image encoding device 10$v$ supporting the multi-view codec. Referring to FIG. 41, the image encoding device 10$v$ includes a first layer encoding section 1$c$, a second layer encoding section 1$d$, the common memory 2, and the multiplexing section 3.

The function of the first layer encoding section 1$c$ is the same as that of the BL encoding section 1$a$ described using FIG. 4 except that, instead of a base layer image, a base view image is received as input. The first layer encoding section 1$c$ encodes the base view image to generate an encoded stream of a first layer. The function of the second layer encoding section 1$d$ is the same as that of the EL encoding section 1$b$ described using FIG. 4 except that, instead of an enhancement layer image, a non-base view image is received as input. The second layer encoding section 1$d$ encodes the non-base view image to generate an encoded stream of a second layer. The common memory 2 stores information commonly used between layers. The multiplexing section 3 multiplexes an encoded stream of the first layer generated by the first layer encoding section 1$c$ and an encoded stream of the second layer generated by the second layer encoding section 1$d$ to generate a multilayer multiplexed stream.

Figure 42:
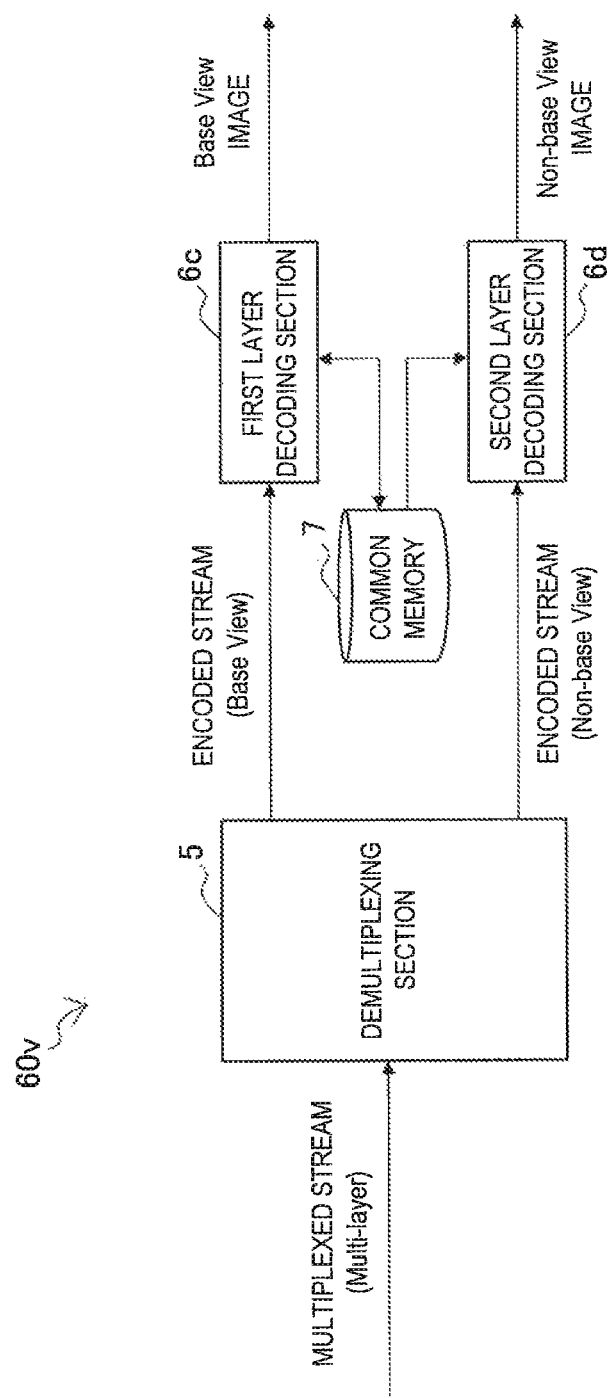
FIG. 42 is a block diagram showing a schematic configuration of the image decoding device for multi-view codec.

FIG. 42 is a block diagram showing a schematic configuration of an image decoding device 60$v$ supporting the multi-view codec. Referring to FIG. 42, the image decoding device 60$v$ includes the demultiplexing section 5, a first layer decoding section 6$c$, a second layer decoding section 6$d$, and the common memory 7.

The demultiplexing section 5 demultiplexes a multilayer multiplexed stream into an encoded stream of the first layer and an encoded stream of the second layer. The function of the first layer decoding section 6$c$ is the same as that of the BL decoding section 6$a$ described using FIG. 5 except that an encoded stream in which, instead of a base layer image, a base view image is encoded is received as input. The first layer decoding section 6$c$ decodes a base view image from an encoded stream of the first layer. The function of the second layer decoding section 6$d$ is the same as that of the EL decoding section 6$b$ described using FIG. 5 except that an encoded stream in which, instead of an enhancement layer image, a non-base view image is encoded is received as input. The second layer decoding section 6d decodes a non-base view image from an encoded stream of the second layer. The common memory 7 stores information commonly used between layers.

When multi-view image data is encoded or decoded and a color gamut is different between views, conversion of the color gamut between the views may be controlled according to the technology in the present disclosure. Thus, as in the case of the scalable video coding, an increase in the encoding amount can also be suppressed in the multi-view codec, while high prediction precision of the color gamut prediction can be achieved.

(2) Application to Streaming Technology

Technology in the present disclosure may also be applied to a streaming protocol. In MPEG-DASH (Dynamic Adaptive Streaming over HTTP), for example, a plurality of encoded streams having mutually different parameters such as the resolution is prepared by a stream server in advance. Then, the streaming server dynamically selects appropriate data for streaming from the plurality of encoded streams and delivers the selected data. In such a streaming protocol, the prediction of the color gamut between the encoded streams may be controlled according to the technology in the present disclosure.

7. CONCLUSION

The embodiments of the technology in the present disclosure have been described in detail above with reference to FIGS. 1 to 42. In the above-described embodiments, a difference from a previous value of a prediction parameter used when an image of a second layer (for example, an enhancement layer) having a different color gamut from a first layer (for example, a base layer) is predicted from an image of the first layer is decoded from an encoded stream. The prediction parameter is calculated using the decoded difference and the image of the second layer is predicted using the calculated prediction parameter. Even when an optimum prediction parameter is dynamically changed for prediction (conversion) of the color gamut, a change in the parameter value is considered to be small for each frame. Accordingly, compared to a method of encoding a prediction parameter value itself, an increase in an encoding amount can be suppressed while high prediction precision is achieved in color gamut scalability by the method of encoding and decoding the above-described difference.

In the above-described embodiments, the prediction parameter used to predict the color gamut includes a gain and an offset by which a pixel value of each color component of the first layer is multiplied. Optimum values of the gain and the offset are not considerably changed for each frame. Accordingly, applying a method of encoding and decoding the above-described difference to the gain and the offset is beneficial. The present disclosure is not limited to the example, but the difference of only one of the gain and the offset may be encoded and decoded. The difference may be calculated for only one of the denominator and the numerator corresponding to the gain or the difference may be calculated for both of the denominator and the numerator.

In the above-described embodiments, when the prediction mode parameter indicates the adaptive parameter mode, the image of the second layer is predicted using the prediction parameter calculated using the difference. Accordingly, the technology in the present disclosure can be applied not only to a case in which only the adaptive parameter mode is used but also to a case in which the prediction mode is selected from candidates of a plurality of prediction modes including the bit shift mode and the fixed parameter mode.

In an embodiment, even when the prediction mode is different between the previous frame and the latest frame, a prediction parameter value corresponding to a bit shift amount or a fixed prediction parameter value can be used as a basis of the difference. Accordingly, the difference of the prediction parameter can be encoded in all of the frames other than the beginning frame while an optimum prediction mode is selected for each frame.

In an embodiment, the prediction mode parameter can be encoded and decoded for each sequence. In this case, since the prediction mode is not changed in one sequence, complexity of difference calculation can be alleviated. As a result, it is easy to mount a device. Further, it is possible to reduce an encoding amount for the prediction mode parameter.

In an embodiment, the difference of the prediction parameter can be decoded for each slice. When a different color gamut is used for each partial region of an image, an optimum color gamut can be predicted for each partial region, and thus the encoding efficiency can be improved.

In an embodiment, the difference of the prediction parameter is decoded from the header having the syntax common to the weighted-prediction associated parameter. In this case, redundancy of the syntax is reduced, and thus it is easy to ensure compatibility when an encoder and a decoder are mounted and the version is upgraded. In a modification example, two versions of the prediction parameter for the color gamut prediction can be encoded and decoded utilizing both of a portion of the L0 reference frame and a portion of the L1 reference frame of the syntax of the weighted-prediction associated parameter. In this case, since a color gamut prediction model with more flexibility and high prediction precision can be used, the encoding efficiency of the color gamut scalability can be improved.

In an embodiment, a control parameter indicating whether bit shift at the time of the inter layer prediction is performed simultaneously with color gamut conversion can be encoded and decoded. In this case, a timing at which the bit shift is performed (for example, simultaneously with up-sampling or simultaneously with the color gamut conversion) is adaptively switched, and a processing cost of the inter layer prediction can be suppressed. In a modification example, the color gamut conversion can be performed before the up-sampling is performed. In this case, since the number of pixels to be subjected to the color gamut conversion is smaller, the processing cost of the color gamut conversion can be further reduced.

The terms "CU," "PU," and "TU" described in the present specification refer to logical units including a syntax associated with an individual block in HEVC. When only individual blocks which are parts of an image are focused on, the blocks may be referred to with the terms "coding block (CB)," "prediction block (PB)," and "transform block (TB)." A CB is formed by hierarchically dividing a coding tree block (CTB) in a quad-tree shape. The one entire quad-tree corresponds to the CTB and a logical unit corresponding to the CTB is referred to as a coding tree unit (CTU). The CTB and the CB in HEVC have a similar role to a macro block in H.264/AVC in that the CTB and the CB are processing units of an encoding process. However, the CTB and the CB are different from the macro block in that the sizes of the CTB and the CB are not fixed (the size of the macro block is normally 16×16 pixels). The size of the CTB is selected from a size of 16×16 pixels, a size of 32×32 pixels, and a size of 64×64 pixels and is designated by a parameter in an encoded stream. The size of the CB can be changed according to a division depth of the CTB.

Mainly described herein is the example where the various pieces of information such as the information related to control of color gamut prediction are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Additionally, the present technology may also be configured as below.

(1)

An image processing apparatus including a decoding section configured to decode a difference from a previous value of a prediction parameter used when an image of a second layer having a different color gamut from a first layer is predicted from an image of the first layer, and a prediction section configured to predict the image of the second layer from the image of the first layer using the prediction parameter calculated using the difference decoded by the decoding section.

(2)

The image processing apparatus according to (1), wherein the prediction parameter includes a gain and an offset by which a pixel value of the first layer is multiplied.

(3)

The image processing apparatus according to (1) or (2), wherein the decoding section further decodes a prediction mode parameter indicating a prediction mode. The prediction section predicts the image of the second layer using the prediction parameter when the prediction mode parameter indicates an adaptive parameter mode.

(4)

The image processing apparatus according to (3), wherein the decoding section decodes the difference of the prediction parameter for each slice.

(5)

The image processing apparatus according to (3) or (4), wherein, when a latest prediction mode parameter indicates the adaptive parameter mode and the previous prediction mode parameter indicates a bit shift mode, the prediction section calculates the latest prediction parameter by adding the difference decoded by the decoding section to a prediction parameter value corresponding to a bit shift amount.

(6)

The image processing apparatus according to any one of (3) to (5), wherein, when a latest prediction mode parameter indicates the adaptive parameter mode and the previous prediction mode parameter indicates a fixed parameter mode, the prediction section calculates the latest prediction parameter by adding the difference decoded by the decoding section to a fixed prediction parameter value defined in advance.

(7)

The image processing apparatus according to (3) or (4), wherein the decoding section decodes the prediction mode parameter for each sequence.

(8)

The image processing apparatus according to any one of (1) to (7), wherein the decoding section decodes the difference from a header having a syntax common to a weighted-prediction associated parameter.

(9)

The image processing apparatus according to (8), wherein the decoding section does not decode the weighted-prediction associated parameter in the second layer and the weighted-prediction associated parameter of the first layer is reused in the second layer.

(10)

The image processing apparatus according to (8) or (9), wherein a first version of the prediction parameter is calculated using a difference decoded from a portion for an L0 reference frame of the syntax common to the weighted-prediction associated parameter, wherein a second version of the prediction parameter is calculated using a difference decoded from a portion for an L1 reference frame of the syntax common to the weighted-prediction associated parameter, and wherein the prediction section selectively uses the first version of the prediction parameter and the second version of the prediction parameter to predict the image of the second layer.

(11)

The image processing apparatus according to (10), wherein the prediction section selects a version to be used between the first version of the prediction parameter and the second version of the prediction parameter according to a band to which a pixel value belongs.

(12)

The image processing apparatus according to (11), wherein the decoding section further decodes boundary information specifying a boundary value for switching to the version to be used.

(13)

The image processing apparatus according to (10), wherein the prediction section selects a version to be used between the first version of the prediction parameter and the second version of the prediction parameter according to an image region to which a pixel belongs.

(14)

The image processing apparatus according to (13), wherein the decoding section further decodes boundary information specifying a region boundary for switching to the version to be used.

(15)

The image processing apparatus according to any one of (1) to (14), wherein the decoding section further decodes a control parameter indicating whether bit shift at a time of the prediction of the image of the second layer is performed simultaneously with color gamut conversion when a bit depth of the second layer is deeper than a bit depth of the first layer, and wherein the prediction section performs the bit shift simultaneously not with up-sampling but with the color gamut conversion when the control parameter indicates that the bit shift at the time of the prediction of the image of the second layer is performed simultaneously with the color gamut conversion.

(16)

The image processing apparatus according to (15), wherein the decoding section decodes the control parameter separately for a luminance component and a color difference component.

(17)

The image processing apparatus according to any one of (1) to (16), wherein, when a space resolution of the second layer is higher than a space resolution of the first layer, the prediction section converts the color gamut of the image of the first layer using the prediction parameter, and then predicts the image of the second layer by up-sampling the converted image.

(18)

An image processing method including:

decoding a difference from a previous value of a prediction parameter used when an image of a second layer having a different color gamut from a first layer is predicted from an image of the first layer; and predicting the image of the second layer from the image of the first layer using the prediction parameter calculated using the decoded difference.

(19)

An image processing apparatus including:

a prediction section configured to predict an image of a second layer from an image of a first layer referred to when the image of the second layer having a different color gamut from the first layer is decoded; and an encoding section configured to encode a difference from a previous value of a prediction parameter used by the prediction section.

(20)

The image processing apparatus according to (19), wherein the prediction parameter includes a gain and an offset by which a pixel value of the first layer is multiplied.

(21)

The image processing apparatus according to (19) or (20), wherein, when the image of the second layer is predicted based on the difference, the encoding section further encodes a prediction mode parameter indicating an adaptive parameter mode as a prediction mode.

(22)

The image processing apparatus according to (21), wherein the encoding section encodes the difference of the prediction parameter for each slice.

(23)

The image processing apparatus according to (21) or (22), wherein, when a latest prediction mode parameter indicates the adaptive parameter mode and the previous prediction mode parameter indicates a bit shift mode, the encoding section encodes the difference calculated by subtracting a parameter value corresponding to a bit shift amount from a latest value of the prediction parameter.

(24)

The image processing apparatus according to any one of (21) to (23), wherein, when a latest prediction mode parameter indicates the adaptive parameter mode and the previous prediction mode parameter indicates a fixed parameter mode, the encoding section encodes the difference calculated by subtracting a fixed parameter value defined in advance from a latest value of the prediction parameter.

(25)

The image processing apparatus according to (21) or (22), wherein the encoding section encodes the prediction mode parameter for each sequence.

(26)

The image processing apparatus according to any one of (19) to (25), wherein the encoding section encodes the difference in a header having a syntax common to a weighted-prediction associated parameter.

(27)

The image processing apparatus according to (26), wherein the encoding section does not encode the weighted-prediction associated parameter in the second layer and the weighted-prediction associated parameter of the first layer is reused in the second layer.

(28)

The image processing apparatus according to (26) or (27), wherein the prediction section selectively uses a first version of the prediction parameter and a second version of the prediction parameter to predict the image of the second layer, and wherein the encoding section encodes the difference calculated in the first version of the prediction parameter to a portion for an L0 reference frame of the syntax common to the weighted-prediction associated parameter, and encodes the difference calculated in the second version of the prediction parameter to a portion for an L1 reference frame of the syntax common to the weighted-prediction associated parameter.

(29)

The image processing apparatus according to claim 28, wherein the prediction section selects a version to be used between the first version of the prediction parameter and the second version of the prediction parameter according to a band to which a pixel value belongs.

(30)

The image processing apparatus according to (29), wherein the encoding section further encodes boundary information specifying a boundary value for switching to the version to be used.

(31)

The image processing apparatus according to (28), wherein the prediction section selects a version to be used between the first version of the prediction parameter and the second version of the prediction parameter according to an image region to which a pixel belongs.

(32)

The image processing apparatus according to (31), wherein the encoding section further encodes boundary information specifying a region boundary for switching to the version to be used.

(33)

The image processing apparatus according to any one of (19) to (32), wherein the encoding section further encodes a control parameter indicating whether bit shift at a time of the prediction of the image of the second layer is performed simultaneously with color gamut conversion when a bit depth of the second layer is deeper than a bit depth of the first layer.

(34)

The image processing apparatus according to (33), wherein the encoding section encodes the control parameter separately for a luminance component and a color difference component.

(35)

The image processing apparatus according to any one of (19) to (34), wherein, when a space resolution of the second layer is higher than a space resolution of the first layer, the prediction section converts the color gamut of the image of the first layer using the prediction parameter, and then predicts the image of the second layer by up-sampling the converted image.

(36)

An image processing method including:
predicting an image of a second layer from an image of a first layer referred to when the image of the second layer having a different color gamut from the first layer is decoded; and
encoding a difference from a previous value of a prediction parameter used to predict the image of the second layer.

REFERENCE SIGNS LIST 10, 10v image encoding device (image processing apparatus)
16 lossless encoding section
40 color gamut prediction section
60, 60v image decoding device (image processing apparatus)
62 lossless decoding section
90 color gamut prediction section

The invention claimed is:

1. An image processing apparatus comprising:
a decoding section configured to decode a difference from a previous value of a prediction parameter used when an image of a second layer having a different color gamut from a first layer is predicted from an image of the first layer; and
a prediction section configured to predict the image of the second layer from the image of the first layer using a current value of the prediction parameter calculated using the difference decoded by the decoding section,
wherein the decoding section further decodes a control parameter indicating whether bit shift at a time of the prediction of the image of the second layer is performed simultaneously with color gamut conversion when a bit depth of the second layer is deeper than a bit depth of the first layer, and
wherein the decoding section and the prediction section are each implemented via at least one processor.

2. The image processing apparatus according to claim 1, wherein the prediction parameter includes a gain and an offset by which a pixel value of the first layer is multiplied.

3. The image processing apparatus according to claim 1, wherein the decoding section decodes the difference of the prediction parameter for each slice.

4. The image processing apparatus according to claim 1, wherein the decoding section decodes the difference from a header having a syntax common to a weighted-prediction associated parameter.

5. The image processing apparatus according to claim 4, wherein a first version of the prediction parameter is calculated using a difference decoded from a portion for an L0 reference frame of the syntax common to the weighted-prediction associated parameter, wherein a second version of the prediction parameter is calculated using a difference decoded from a portion for an L1 reference frame of the syntax common to the weighted-prediction associated parameter, and
wherein the prediction section selectively uses the first version of the prediction parameter and the second version of the prediction parameter to predict the image of the second layer.

6. The image processing apparatus according to claim 5, wherein the prediction section selects a version to be used between the first version of the prediction parameter and the second version of the prediction parameter according to a band to which a pixel value belongs.

7. The image processing apparatus according to claim 5, wherein the prediction section selects a version to be used between the first version of the prediction parameter and the second version of the prediction parameter according to an image region to which a pixel belongs.

8. The image processing apparatus according to claim 1, wherein the prediction section performs the bit shift simultaneously not with up-sampling but with the color gamut conversion when the control parameter indicates that the bit shift at the time of the prediction of the image of the second layer is performed simultaneously with the color gamut conversion.

9. The image processing apparatus according to claim 1, wherein, when a space resolution of the second layer is higher than a space resolution of the first layer, the prediction section converts the color gamut of the image of the first layer using the prediction parameter, and then predicts the image of the second layer by up-sampling the converted image.

10. The image processing apparatus according to claim 1, wherein the prediction parameter includes a gain and an offset of each color component by which a pixel value of the first layer is multiplied.

11. An image processing method comprising:
decoding a difference from a previous value of a prediction parameter used when an image of a second layer having a different color gamut from a first layer is predicted from an image of the first layer;
predicting the image of the second layer from the image of the first layer using a current value of the prediction parameter calculated using the decoded difference; and
decoding, when a bit depth of the second layer is deeper than a bit depth of the first layer, a control parameter indicating whether bit shift at a time of the prediction of the image of the second layer is performed simultaneously with color gamut conversion.

12. The image processing method according to claim 11, wherein the bit shift is performed simultaneously not with up-sampling but with the color gamut conversion when the control parameter indicates that the bit shift at the time of the prediction of the image of the second layer is performed simultaneously with the color gamut conversion.

13. An image processing apparatus comprising:
a prediction section configured to predict, using a current value of a prediction parameter, an image of a second layer from an image of a first layer referred to when the image of the second layer having a different color gamut from the first layer is decoded; and
an encoding section configured to encode a difference from a previous value of the prediction parameter,
wherein the encoding section further encodes a control parameter indicating whether bit shift at a time of the prediction of the image of the second layer is performed simultaneously with color gamut conversion when a bit depth of the second layer is deeper than a bit depth of the first layer, and wherein the prediction section and the encoding section are each implemented via at least one processor.

14. The image processing apparatus according to claim 13, wherein the prediction parameter includes a gain and an offset by which a pixel value of the first layer is multiplied.

15. The image processing apparatus according to claim 13, wherein the encoding section encodes the difference of the prediction parameter for each slice.

16. The image processing apparatus according to claim 13, wherein the encoding section encodes the difference in a header having a syntax common to a weighted-prediction associated parameter.

17. The image processing apparatus according to claim 16, wherein the prediction section selectively uses a first version of the prediction parameter and a second version of the prediction parameter to predict the image of the second layer, and wherein the encoding section encodes the difference calculated in the first version of the prediction parameter to a portion for an L0 reference frame of the syntax common to the weighted-prediction associated parameter, and encodes the difference calculated in the second version of the prediction parameter to a portion for an L1 reference frame of the syntax common to the weighted-prediction associated parameter.

18. The image processing apparatus according to claim 17, wherein the prediction section selects a version to be used between the first version of the prediction parameter and the second version of the prediction parameter according to a band to which a pixel value belongs.

19. The image processing apparatus according to claim 17, wherein the prediction section selects a version to be used between the first version of the prediction parameter and the second version of the prediction parameter according to an image region to which a pixel belongs.

20. The image processing apparatus according to claim 13, wherein, when a space resolution of the second layer is higher than a space resolution of the first layer, the prediction section converts the color gamut of the image of the first layer using the prediction parameter, and then predicts the image of the second layer by up-sampling the converted image.

21. An image processing method comprising:

predicting, using a current value of a prediction parameter, an image of a second layer from an image of a first layer referred to when the image of the second layer having a different color gamut from the first layer is decoded;

encoding a difference from a previous value of the prediction parameter; and encoding, when a bit depth of the second layer is deeper than a bit depth of the first layer, a control parameter indicating whether bit shift at a time of the prediction of the image of the second layer is performed simultaneously with color gamut conversion.

* * * * *